United States Patent
Huang

(10) Patent No.: US 6,311,130 B1
(45) Date of Patent: Oct. 30, 2001

(54) COMPUTER IMPLEMENTED EMPIRICAL MODE DECOMPOSITION METHOD, APPARATUS, AND ARTICLE OF MANUFACTURE FOR TWO-DIMENSIONAL SIGNALS

(75) Inventor: Norden E. Huang, Bethesda, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/150,671

(22) Filed: Sep. 10, 1998

Related U.S. Application Data

(63) Continuation-in-part of application No. 09/082,523, filed on May 21, 1998, which is a continuation-in-part of application No. 08/872,586, filed on Jun. 10, 1997, now Pat. No. 5,983,162.
(60) Provisional application No. 60/023,411, filed on Aug. 14, 1996, and provisional application No. 60/023,822, filed on Aug. 12, 1996.

(51) Int. Cl.[7] .................................................... G06F 19/00
(52) U.S. Cl. .................................. 702/2; 702/15; 702/16
(58) Field of Search .................................. 702/4, 15, 16, 702/17, 76, 78; 324/76.19, 76.24; 708/401

(56) References Cited

U.S. PATENT DOCUMENTS

| | | | |
|---|---|---|---|
| 4,853,903 | * | 8/1989 | Linvill, Jr. et al. ..................... 702/17 |
| 4,860,265 | * | 8/1989 | Laster et al. ........................... 702/17 |

* cited by examiner

*Primary Examiner*—Donald E. McElheny, Jr.

(57) ABSTRACT

A computer implemented method of processing two-dimensional physical signals includes five basic components and the associated presentation techniques of the results. The first component decomposes the two-dimensional signal into one-dimensional profiles. The second component is a computer implemented Empirical Mode Decomposition that extracts a collection of Intrinsic Mode Functions (IMF's) from each profile based on local extrema and/or curvature extrema. The decomposition is based on the direct extraction of the energy associated with various intrinsic time scales in the profiles. In the third component, the IMF's of each profile are then subjected to a Hilbert Transform. The fourth component collates the Hilbert transformed IMF's of the profiles to form a two-dimensional Hilbert Spectrum. A fifth component manipulates the IMF's by, for example, filtering the two-dimensional signal by reconstructing the two-dimensional signal from selected IMF(s).

92 Claims, 50 Drawing Sheets

(18 of 50 Drawing Sheet(s) Filed in Color)

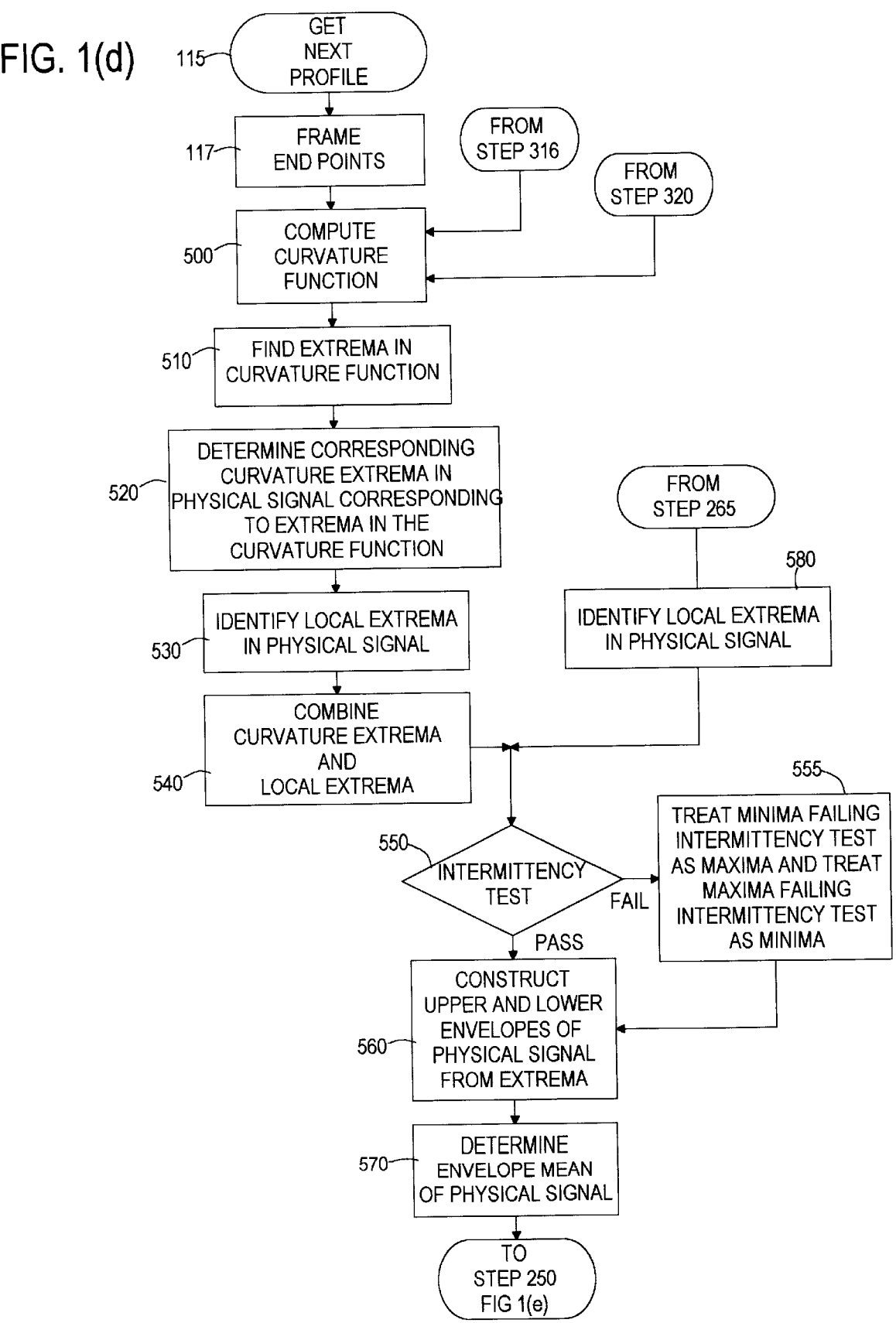

EMD-IMF without intermittency option

EMD-IMF without intermittency option

Curvature-sifting results on x

Local Extrema-sift results on the Lab. Propellor Axial Velocity

Curvature-sift results on the Lab. Propellor axial velocity
with intermittency test Mode-4 decomposed with curvature-sift algorithm Mode-4 decomposed with curvature-sift algorithm Mode-8 to 12 of the 3th column of the downstream data Wavelet Spectrum for Laboratory Wind Data Hilbert Spectrum for Laboratory Wind Data : 15x15 Smoothed FIG. 16 Original image of w406a189.pic
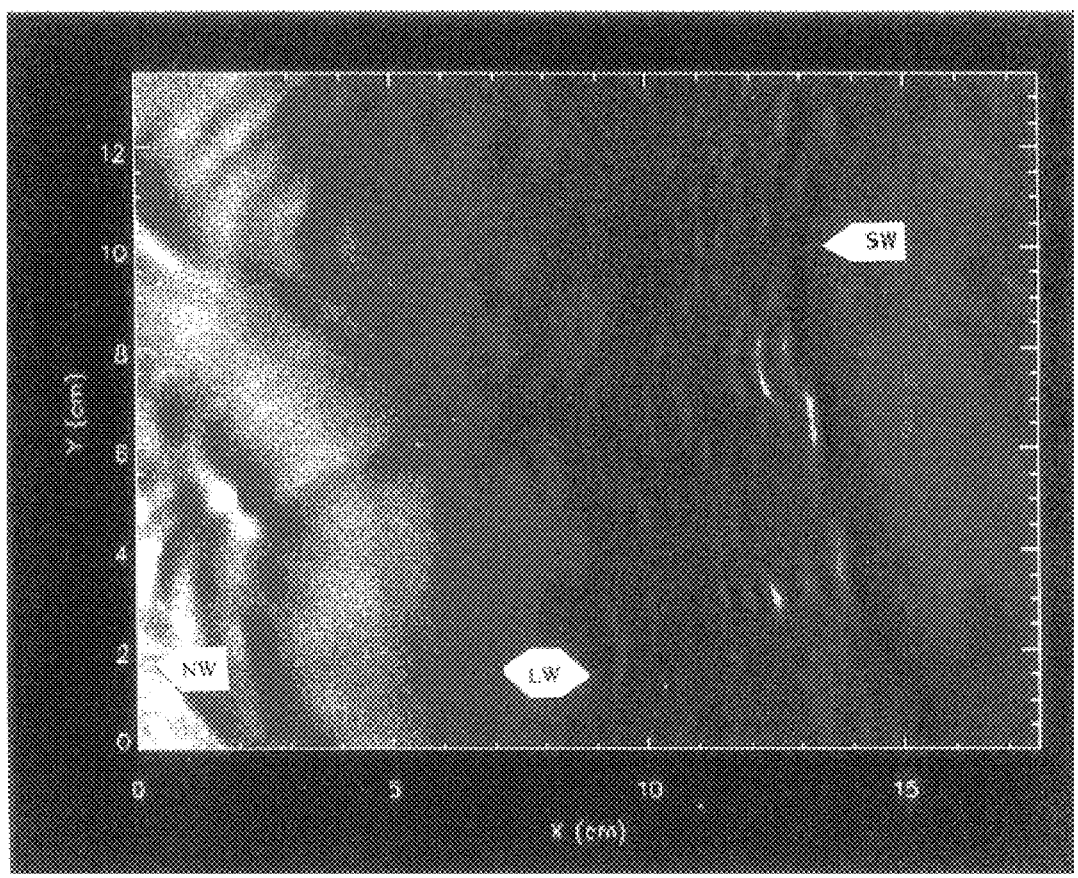

FIG. 17        The First 2 Sift-Components of w406a189.pic
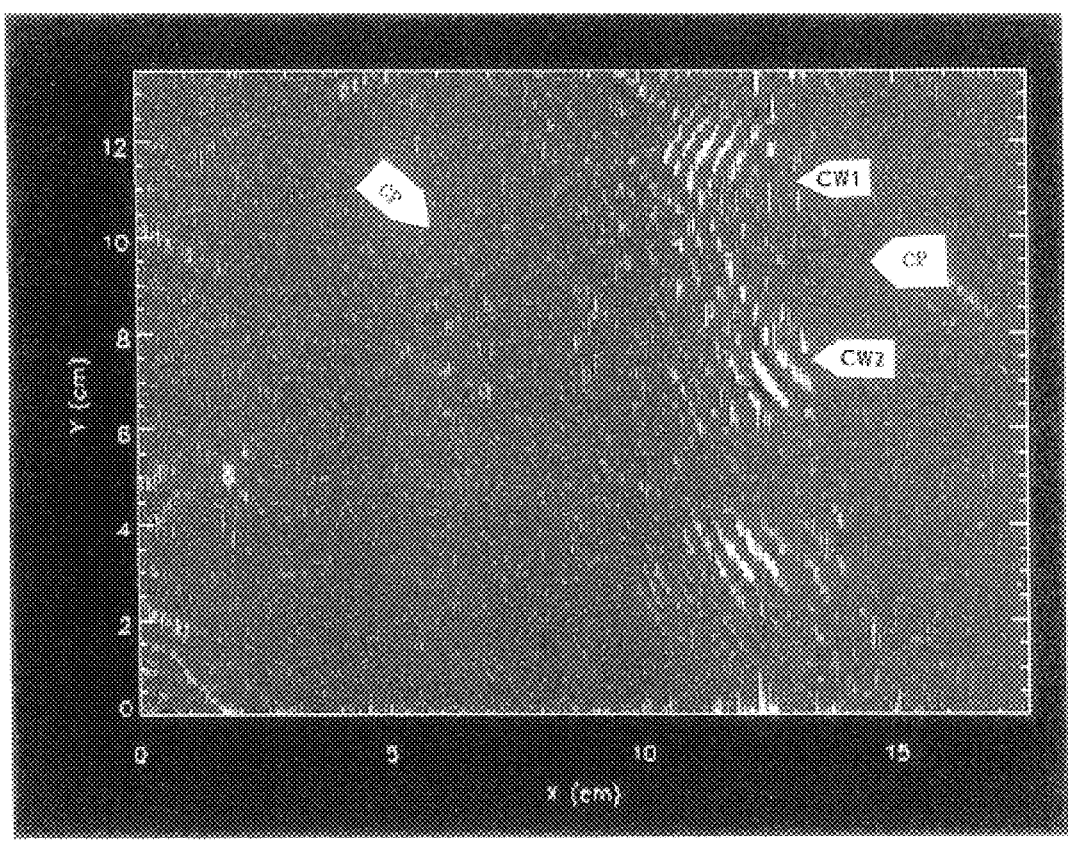

FIG. 18    The first 2 and the last 2 sift-components of w406a189.pic
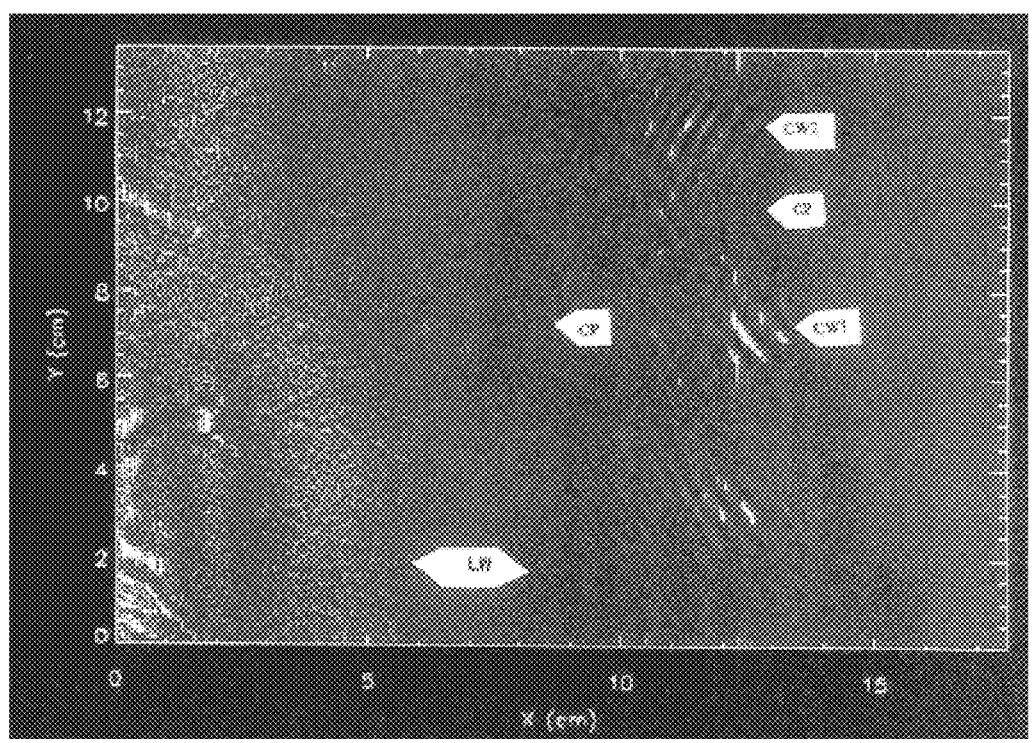

FIG. 19(a)   Hilbert Spectrum of w406a189.pic, isosurface of 11%
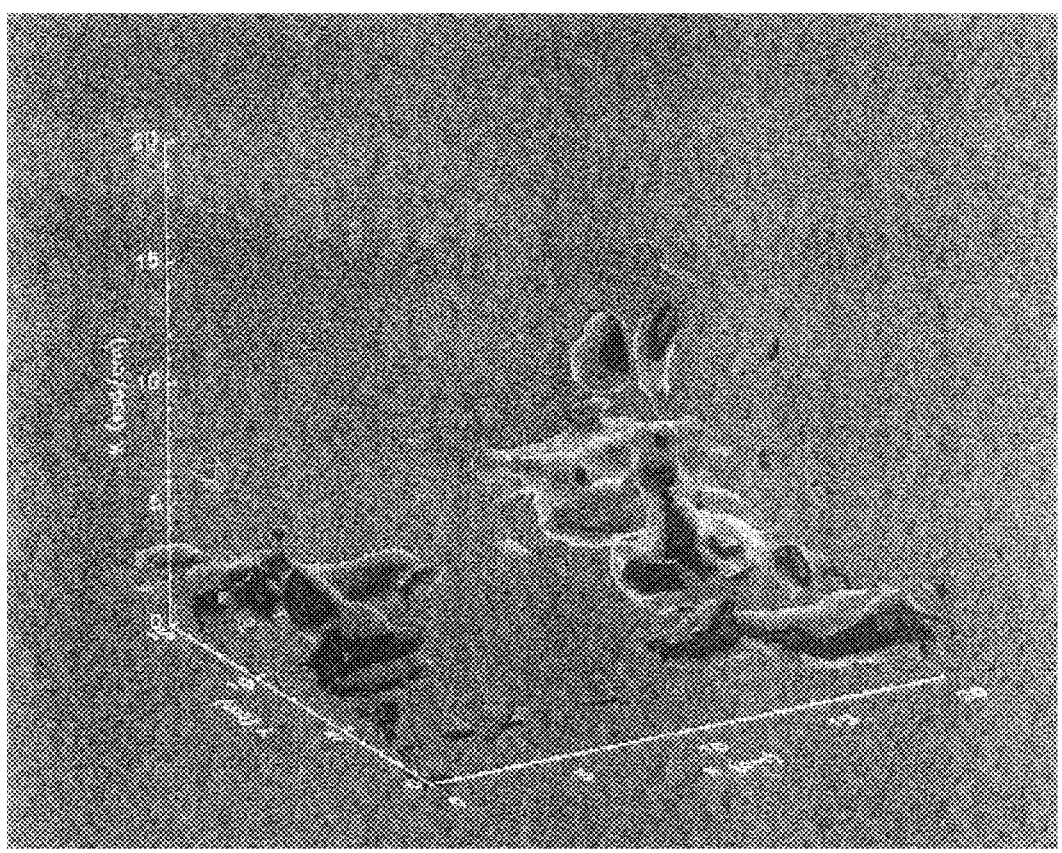

FIG. 19(b)   Hilbert Spectrum of w406a189.pic, isosurface of 6%
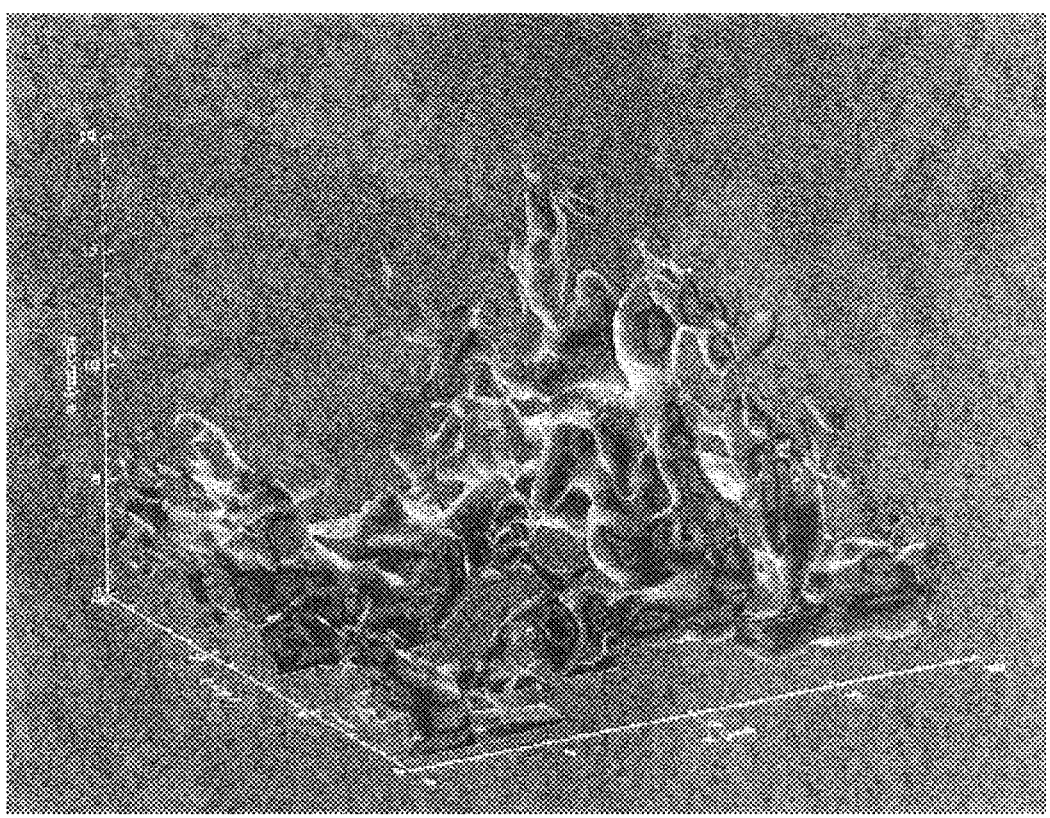

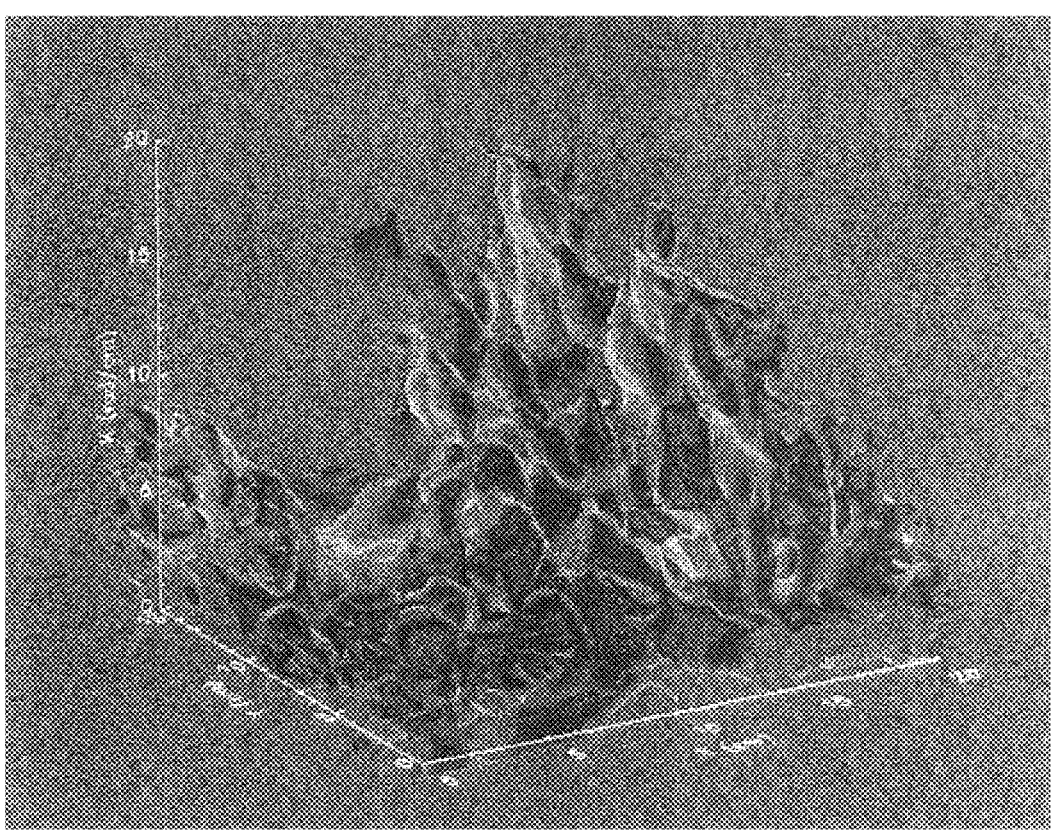
FIG. 19(c)   Hilbert Spectrum of w406a189.pic, isosurface of 3%

FIG. 21          Two sin waves propagating in different directions

FIG. 22      Hilbert Spectrum of the two sine waves

FIG. 24  Short waves intermittently riding on the long waves

FIG. 25  Hilbert Spectrum of Intermittent Waves

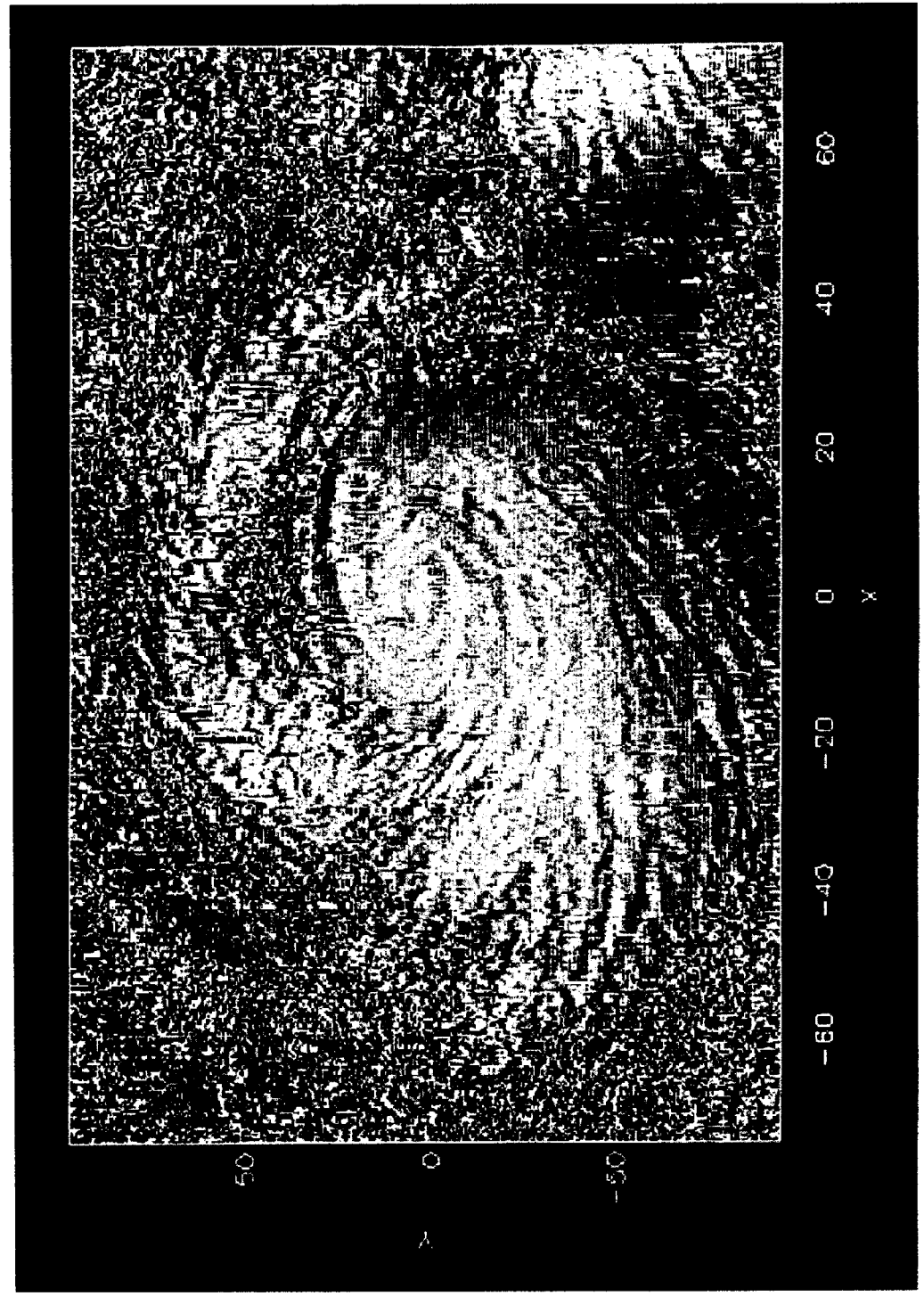
FIG. 28 The first 3 and the last 2 components of the Hurricane Data

COMPUTER IMPLEMENTED EMPIRICAL MODE DECOMPOSITION METHOD, APPARATUS, AND ARTICLE OF MANUFACTURE FOR TWO-DIMENSIONAL SIGNALS

CROSS REFERENCES TO RELATED APPLICATIONS

This application is a CIP to parent application Ser. No. 09/082,523 filed on May 21, 1998 which itself is a CIP of grandparent application Ser. No. 08/872,586 filed on Jun. 10, 1997, U.S. Pat. No. 5,983,162, which itself claims priority under 35 U.S.C. §119(e) to U.S. Provisional applications Ser. No. 60/023,411 filed on Aug. 14, 1996 and Ser. No. 60/023,822 filed on Aug. 12, 1996.

ORIGIN OF INVENTION

The invention disclosed herein was made by an employee of the United States Government, and may be manufactured and used by or for the Government for governmental purposes without the payment of any royalties thereon or therefor.

COLOR DRAWING NOTIFICATION

The file of this patent contains at least one drawing executed in color. Copies of this patent with color drawing (s) will be provided by the Patent and Trademark Office upon request and payment of the necessary fee.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

This invention generally relates to a computer implemented physical signal processing method, apparatus and article of manufacture. More particularly, this invention relates to a computer implemented method and apparatus for processing two-dimensional nonlinear, nonstationary physical signals.

2. Description of Related Art

Analyzing physical signals is a difficult problem confronting many industries. These industries have harnessed various computer implemented methods to process data taken from physical phenomena such as earthquakes, ocean waves, tsunamis, ocean surface elevation and wind. Unfortunately, previous methods have not yielded results which are physically meaningful.

Among the difficulties is that representing physical processes with physical signals may present one or more of the following problems:

(a) The total data span is too short;

(b) The data are nonstationary; and (c) The data represent nonlinear processes.

Although problems (a)–(c) are separate issues, the first two problems are related because a data section shorter than the longest time scale of a stationary process can appear to be nonstationary. Because many physical events are transient, the data representative of those events are nonstationary. For example, a transient event such as an earthquake will produce nonstationary data when measured. Nevertheless, the nonstationary character of such data is ignored or the effects assumed to be negligible. This assumption may lead to inaccurate results and incorrect interpretation of the underlying physics as explained below.

A variety of techniques have been applied to nonlinear, nonstationary physical signals. For example, many computer implemented methods apply Fourier spectral analysis to examine the energy-frequency distribution of such signals.

Although the Fourier transform that is applied by these computer implemented methods is valid under extremely general conditions, there are some crucial restrictions: the system must be linear, and the data must be strictly periodic or stationary. If these conditions are not met, then the resulting spectrum will not make sense physically.

A common technique for meeting the linearity condition is to approximate the physical phenomena with at least one linear system. Although linear approximation is an adequate solution for some applications, many physical phenomena are highly nonlinear and do not admit a reasonably accurate linear approximation.

Furthermore, imperfect probes/sensors and numerical schemes may contaminate data representative of the phenomenon. For example, the interactions of imperfect probes with a perfect linear system can make the final data nonlinear.

Many recorded physical signals are of finite duration, nonstationary, and nonlinear because they are derived from physical processes that are nonlinear either intrinsically or through interactions with imperfect probes or numerical schemes. Under these conditions, computer implemented methods which apples Fourier spectral analysis are of limited use. For lack of alternatives, however, such methods still apply Fourier spectral analysis to process such data.

Moreover, the indiscriminate use of Fourier spectral analysis in these methods and the adoption of the stationary and linear assumptions may give misleading results some of which are described below.

First, the Fourier spectrum defines uniform harmonic components globally. Therefore, the Fourier spectrum needs many additional harmonic components to simulate nonstationary data that are nonuniform globally. As a result, energy is spread over a wide frequency range.

For example, using a delta function to represent the flash of light from a lightning bolt will give a phase-locked wide white Fourier spectrum. Here, many Fourier components are added to simulate the nonstationary nature of the data in the time domain, but their existence diverts energy to a much wider frequency domain. Constrained by the conservation of energy principle, these spurious harmonics and the wide frequency spectrum cannot faithfully represent the true energy density of the lighting in the frequency and time space.

More seriously, the Fourier representation also requires the existence of negative light intensity so that the components can cancel out one another to give the final delta function representative of the lightning. Thus, the Fourier components might make mathematical sense, but they often do not make physical sense when applied.

Although no physical process can be represented exactly by a delta function, some physical data such as the near field strong earthquake energy signals are of extremely short duration. Such earthquake energy signals almost approach a delta function, and they always give artificially wide Fourier spectra.

Second, Fourier spectral analysis uses a linear superposition of trigonometric functions to represent the data. Therefore, additional harmonic components are required to simulate deformed wave profiles. Such deformations, as will be shown later, are the direct consequence of nonlinear effects. Whenever the form of the data deviates from a pure sine or cosine function, the Fourier spectrum will contain harmonics.

Furthermore, both nonstationarity and nonlinearity can induce spurious harmonic components that cause unwanted energy spreading and artificial frequency smearing in the Fourier spectrum. The consequence is incorrect interpretation of physical phenomenon due to the misleading energy-frequency distribution for nonlinear and nonstationary data representing the physical phenomenon.

According to the above background, the state of the art does not provide a useful computer implemented tool for analyzing nonlinear, nonstationary physical signals. Geophysical signals provide a good example of a class of signals in which this invention is applicable. Grandparent application Ser. No. 08/872,586 filed on Jun. 10, 1997, U.S. Pat. No. 5,983,162, illustrates several types of nonlinear, nonstationary geophysical signals which are very difficult to analyze with traditional computer implemented techniques including earthquake signals, water wave signals, tsunami signals, ocean altitude and ocean circulation signals.

This application extends the techniques of the parent and grandparent applications to the processing of two-dimensional signals. Two-dimensional signals such as images of physical phenomena are an increasing subject of various processing techniques. In fact, the above-described prior art techniques such as Fourier analysis are routinely applied to process two-dimensional signals.

Many two-dimensional signals are nonlinear and/or nonstationary. Therefore, like the one-dimensional data processing techniques described above, the conventional processing techniques are simply inadequate to process such two-dimensional data.

Moreover, two-dimensional data analysis methods are utilized to separate the various scales contained in the data. For example, in image processing, scale separation is a necessary step toward an objective. analysis of the information contents. However, many images contain inhomogeneous scales which cannot be satisfactorily separated, analyzed or processed by conventional image processing methods.

SUMMARY OF THE INVENTION

The invention employs a computer implemented Empirical Mode Decomposition method which decomposes two-dimensional physical signals representative of a physical phenomenon into components. These components are designated as Intrinsic Mode Functions (IMF's) and are indicative of intrinsic oscillatory modes in the physical phenomenon.

Contrary to almost all the previous methods, this new computer implemented method is intuitive, direct, a posteriori, and adaptive, with the basis of the decomposition based on and derived from the two-dimensional physical signal. The bases so derived have no close analytic expressions, and they can only be numerically approximated in a specially programmed computer by utilizing the inventive methods disclosed herein.

More specifically, the general method of the invention includes five main components or steps to process the two-dimensional physical signal without suffering the problems associated with conventional computer implemented Fourier analysis. These problems include inaccurate interpretation of the underlying physics caused in part by energy spreading and frequency smearing in the Fourier spectrum.

This first component is to decompose the two-dimensional signal into one-dimensional profiles. If the two-dimensional signal is an image, then it is convenient to decompose the image into scanning lines wherein each scanning line corresponds to a profile.

The second component is to process each of the profiles with the Empirical Mode Decomposition (EMD) method. The EMD method extracts a number of Intrinsic Mode Function (IMF) components from each of the profiles. In this way, the profiles will be expanded by using a basis that is adaptively derived from the profile itself.

The third component of the general inventive method is to apply the Hilbert Transform to the decomposed IMF's of each profile and construct an energy-frequency-time distribution, designated as the Hilbert Spectrum, from which occurrence of physical events at corresponding times (time localities) will be preserved. There is also no close analytic form for the Hilbert Spectrum. As explained below, the invention avoids this problem by storing numerical approximations in the specially programmed computer.

The fourth component is collating the Hilbert Spectra of the profiles into a 2D Hilbert Spectrum. This 2D Hilbert Spectrum can then be manipulated to generated a visual display that an operator can analyze.

The fifth component is manipulation of the IMF's. Various types of filters may be constructed according to the invention by selecting desired IMF's, summing the selected IMF's of each profile and then collating the summed results to form the filtered 2D signal. By selecting appropriate IMF's, low pass filters, high pass filters and band pass filters may be constructed. Furthermore, various other types of manipulation may be performed on the IMF's such as multiplication, subtraction, etc.

Furthermore, a computer implementing the invention, e.g., via executing a program in software, to decompose physical signals into intrinsic mode functions with EMD and generate a Hilbert spectrum is also disclosed. Because of the lack of close form analytic expression of either the basis functions and the final Hilbert spectrum; computer implementation of the inventive methods is an important part of the overall method.

Still further, the invention may take the form of an article of manufacture. More specifically, the article of manufacture may be a computer-usable medium, including a computer-readable program code embodied therein wherein the computer-readable code causes a computer to execute the inventive methods.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Furthermore, all the mathematic expressions are used as a short hand to express the inventive ideas clearly and are not limitative of the claimed invention.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 1(d) is a high-level flowchart describing the curvature extrema Sifting Process;

FIG. 16 shows a water surface wave pattern, which is an example of a two-dimensional physical signal which may be processed by the invention;

FIG. 17 shows a high pass filtered version of the water surface wave pattern of FIG. 16 using the first two IMF's;

FIG. 18 shows a band pass version of the water surface wave pattern of FIG. 16 using the first two and the last two IMF's;

FIG. 19(a) shows the EMD Hilbert Spectrum of the water surface wave pattern, isosurface 11%;

FIG. 19(b) shows the EMD Hilbert Spectrum of the water surface wave pattern, isosurface 6%;

FIG. 19(c) shows the EMD Hilbert Spectrum of the water surface wave pattern, isosurface 3%;

FIG. 28 is a band pass filtered version of Hurricane Gilbert created by the invention from the first three and last two IMF's.

DETAILED DESCRIPTION OF PREFERRED EMBODIMENTS

Figure 1A:
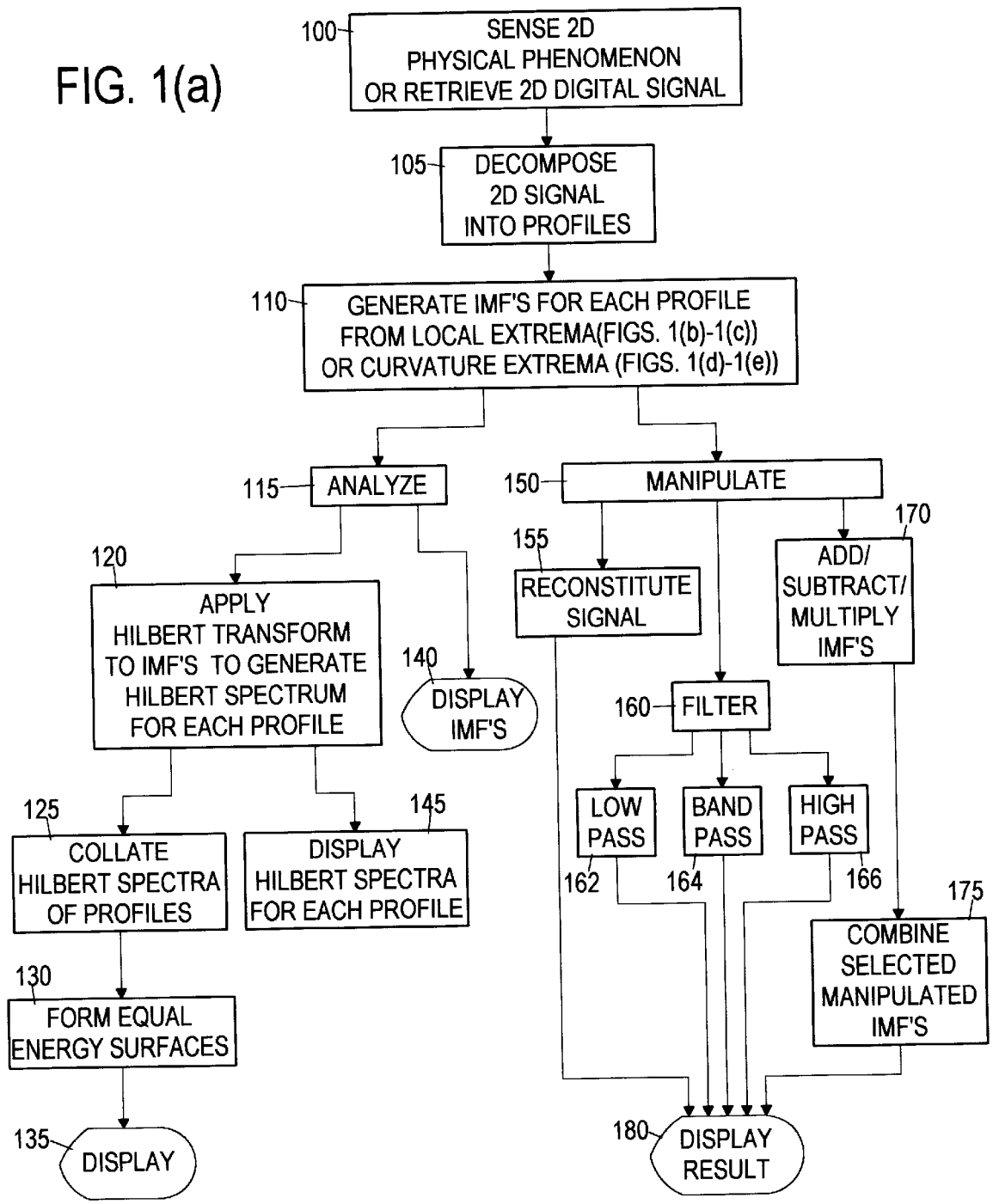
FIG. 1(a) is a high-level flowchart describing the overall inventive methods of processing two-dimensional physical signals.

This invention extends one-dimensional Empirical Mode Decomposition to two-dimensional signals. Before describing the computer implemented Empirical Mode Decomposition that generates intrinsic mode functions for two-dimensional signals, the definition and physical meaning of intrinsic mode functions will be discussed.

Intrinsic Mode Functions

An Intrinsic Mode Function (IMF) is a function that satisfies the following two conditions:

(a) in the whole data set, the number of extrema and the number of zero-crossings must either be equal or differ at most by one, and (b) at any point, the mean value of upper envelope defined by the maxima and the lower envelope defined by the minima is zero.

The first condition shares some similarity to the traditional narrow band requirements for a stationary Gaussian process. The second condition is a totally new idea. Conceptually, the second condition modifies the classical global requirement to a local one. Furthermore, the second condition has the desirable result that the instantaneous frequency will not have unwanted fluctuations induced by asymmetric wave forms. Mathematically, the second condition should ideally be 'the local mean of the data being zero.' For nonstationary data, the 'local mean' requires a 'local time scale' to compute the mean, which is impossible to define. Fortunately, the local time scale need not be defined to fulfil the second condition, as will be discussed below.

To apply these concepts to physical data, the invention utilizes the local mean of the signal envelopes to force the local symmetry.

In the local extrema Sifting Process, the signal envelopes are defined by the local maxima and the local minima. This is an approximation which avoids the definition of a local averaging time scale. With the physical approach and the approximation adopted here, the inventive method does not always guarantee a perfect instantaneous frequency under all conditions. Nevertheless, it can be shown that, even under the worst conditions, the instantaneous frequency so defined is still consistent with the physics of the system being studied and represents the system being studied much more accurately than previous techniques based on Fourier analysis.

The term "intrinsic mode function (IMF)" is adopted because it represents the oscillation mode embedded in the data. With this definition, the IMF in each cycle, defined by the zero-crossings, involves only one mode of oscillation. In other words, each IMF represents only one group of oscillation modes or time scales and no riding waves are allowed in an IMF.

Before presenting the inventive EMD method for decomposing the data into IMF's, a qualitative assessment of the intrinsic oscillatory modes may be roughly determined by simply examining the data by eye. From this examination, one can immediately identify the different scales directly in two ways: the time lapse between the successive alternations of local maxima and minima and the time lapse between the successive zero-crossings reveals the different scales. The interlaced local extrema and zero-crossings give us complicated data: one undulation is riding on top of another, and they, in turn, are riding on still other undulations, and so on. Each of these undulations defines a characteristic scale or oscillation mode that is intrinsic to the data: hence, the term "intrinsic mode function" is adopted.

To reduce the data into the needed IMF'S, the invention utilizes a computer implemented Empirical Mode Decomposition Method which is described below.

Empirical Mode Decomposition (EMD): The Sifting Process

First, the Empirical Mode Decomposition method which deals with both nonstationary and nonlinear data will be discussed. Then, the physical meaning of this decomposition will be presented.

The essence of the EMD method is to identify empirically the intrinsic oscillatory modes by their characteristic time scales in the data, and then decompose the data accordingly. The decomposition is based on the following assumptions:

a. the signal has at least two extrema: one maximum and one minimum, and b. the characteristic time scale is defined by the time lapse between the extrema.

In other words, the invention adopts the time lapse between successive extrema as the definition of the time scale for the intrinsic oscillatory mode because it gives a much finer resolution of the oscillatory modes and because it can be applied to data with non-zero mean (either all positive or all negative values, without zero-crossings). A systematic way to extract the intrinsic mode functions is the computer implemented Empirical Mode Decomposition method or Sifting Process which is described below.

Overview of Two-Dimensional Signal Processing

The term "two-dimensional signal" is used herein to denote the measurement of a physical quantity across two-dimensions. For example, two-dimensional signals include two-dimensional images generated by a digital camera 443 that measures luminance across two-dimensions.

FIG. 1(a) illustrates the overall inventive method of processing two-dimensional signals including the generation of intrinsic mode functions (the Sifting Process) in step 110. As explained below, the Sifting Process of step 110 may either be the local extrema Sifting Process illustrated in FIGS. 1(b) and 1(c) or the curvature extrema Sifting Process illustrated in FIGS. 1(d)–(e).

To begin the processing illustrated in FIG. 1(a), the two-dimensional physical activity, process or phenomenon is sensed by an appropriate sensor in step 100. For example an image of a physical phenomenon may be sensed by a digital camera 443 to generate a two-dimensional digital signal.

Then, step 105 decomposes the two-dimensional digital signal into one-dimensional profiles. The profiles are preferably mutually parallel. In other words, the two-dimensional signal is separated into a series of one-dimensional signals. For example, each of the one-dimensional profiles may be one of the parallel scanning lines of a two-dimensional image.

If the two-dimensional signal is an image then it is convenient to form each profile from a line (horizontal or vertical) of the image. As an alternative, the profiles may be generated by decomposing the two-dimensional signal into diagonal lines.

Once the two-dimensional signal is decomposed into profiles (step 105), a one-dimensional EMD may be utilized in step 110 to sift the profiles and extract intrinsic mode functions for each profile. In other words, each profile is individually processed by a one-dimensional EMD to extract IMF's for that profile. By sequentially processing each profile, a collection of IMF's may be generated for the two-dimensional signal.

More particularly, the Sifting Process (either the local extrema or curvature extrema Sifting Processes further described below in relation to FIGS. 1(b)–(c) and 1(d)–(e), respectively) is applied in step 110 to sift each of the profiles with the Empirical Mode Decomposition method and thereby extract the intrinsic mode function(s). In other words, Empirical Mode Decomposition is applied in step 110 to each profile to extract each profile's intrinsic mode function(s).

The intrinsic mode functions for each of the profiles can then be analyzed in step 115 or manipulated in step 150.

Local Extrema Sifting Process

Before continuing with the main flow in FIG. 1(a), the details of the local extrema Sifting Process will be explained with reference to the high level flowchart in FIGS. 1(b), 1(c) and the series of graphs showing illustrative results of the local extrema Sifting Process in FIGS. 3(a)–(f).

Figure 1B:
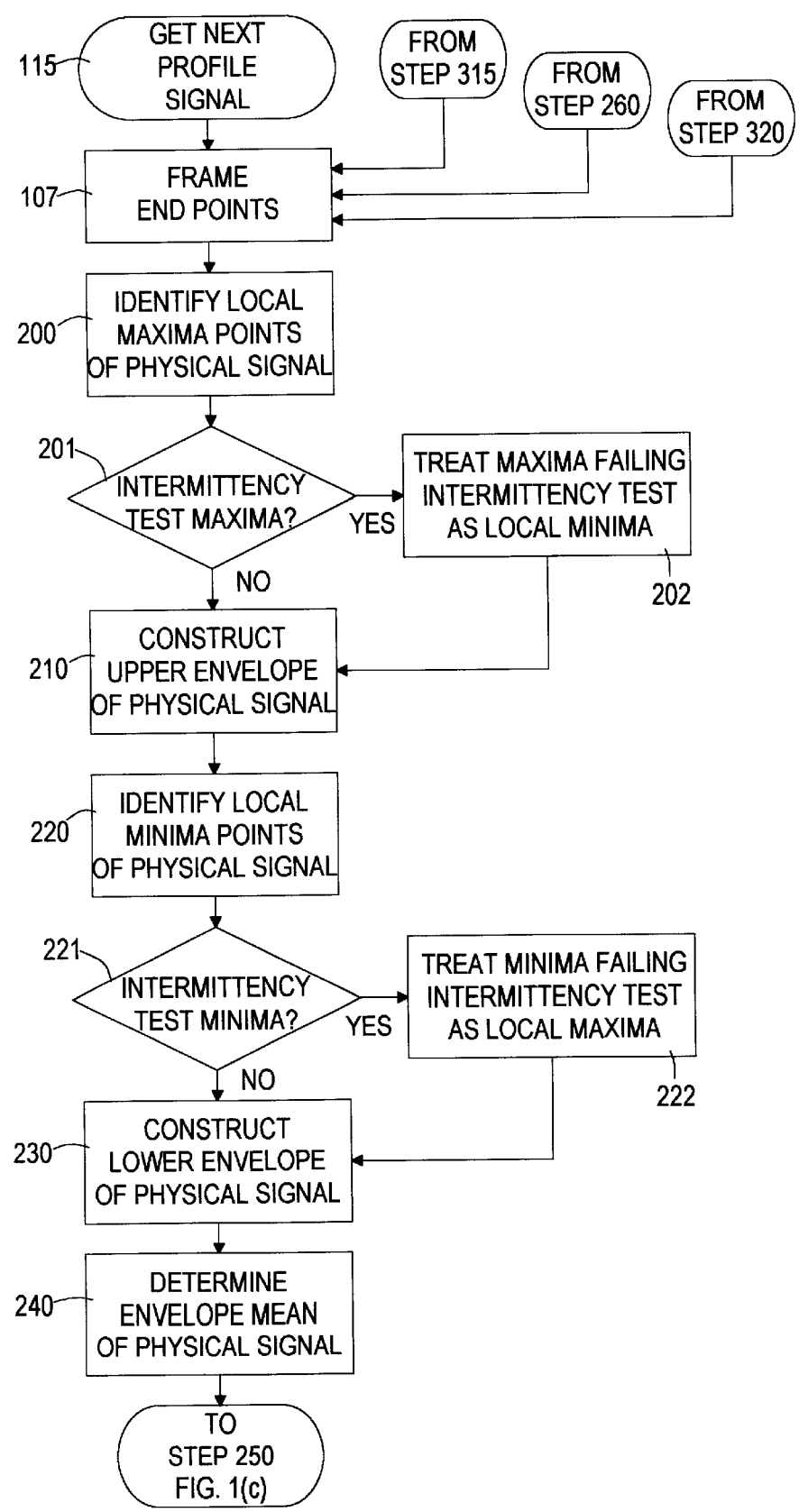
FIG. 1(b) is a high-level flowchart describing the local extrema Sifting Process.

As shown in FIG. 1(b), the current profile signal is first windowed by framing the end points in step 117.

Then, the local extrema Sifting Process begins at step 200 by identifying local maximum values of the digitized, framed signal (profile) from step 117.

Figure 3A:
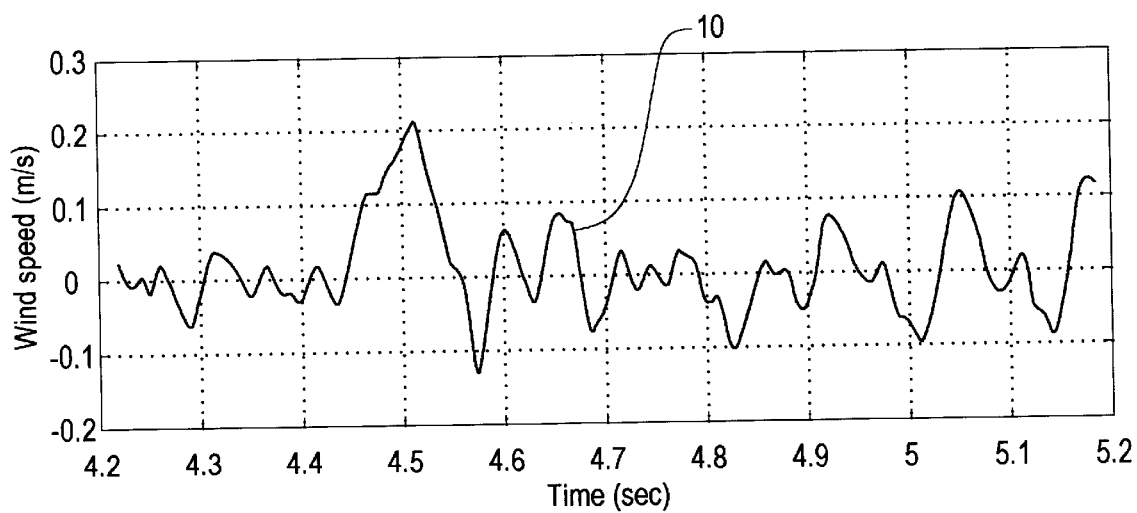
FIG. 3(a) shows wind speed data in the form of a graph plotting wind speed as a function of time for explaining the computer implemented Empirical Mode Decomposition method of the invention using local extrema.

FIG. 3(a) shows a typical physical signal 10 which, in this example, represents wind speed spanning a time interval of one second. Because the Sifting Process for one-dimensional physical signals and profiles from a two-dimensional is identical, the terms physical signal and profile are considered interchangeable. Furthermore, FIGS. 3(a)–(m) and 4(a)–(e), 5(a)–(b), 6(a)–(c), etc illustrate one-dimensional signals instead of profiles for ease of explanation.

Before construction of the signal envelopes in steps 210 and 230, optional intermittency tests (201,221) may be introduced to alleviate the alias associated with intermittence in the data that can cause mode mixing.

Optional intermittency test 201 checks the distance between successive maxima to see if this distance is within a pre-assigned value (n) times the shortest distance between waves. If no, then an intermittency exists and the method proceeds to step 202. If yes, then there is no intermittency and the upper envelope is constructed in step 210 as further described below.

Similarly, optional intermittency test 221 checks the distance between successive minima to see if this distance is within a pre-assigned value n times the shortest distance between waves. If no, then an intermittency exists and the method proceeds to step 222. If yes, then there is no intermittency and the upper envelope is constructed in step 230 as further described below.

Figure 3B:
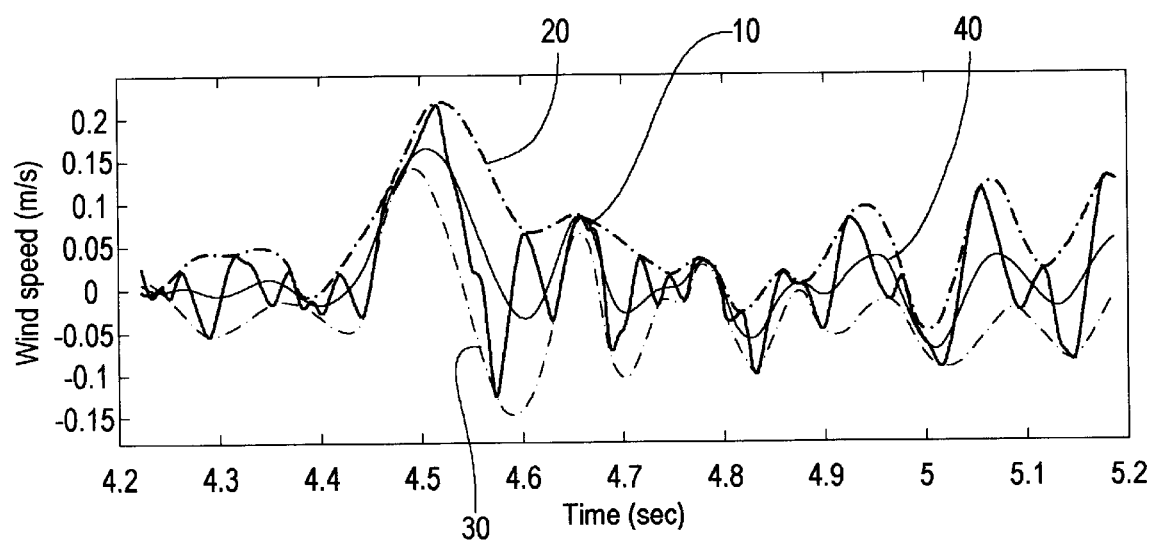
FIG. 3(b) is a graph illustrating the upper envelope, lower envelope, envelope mean and original wind speed data which are utilized to explain the computer implemented Empirical Mode Decomposition method of the invention using local extrema.
Figure 3C:
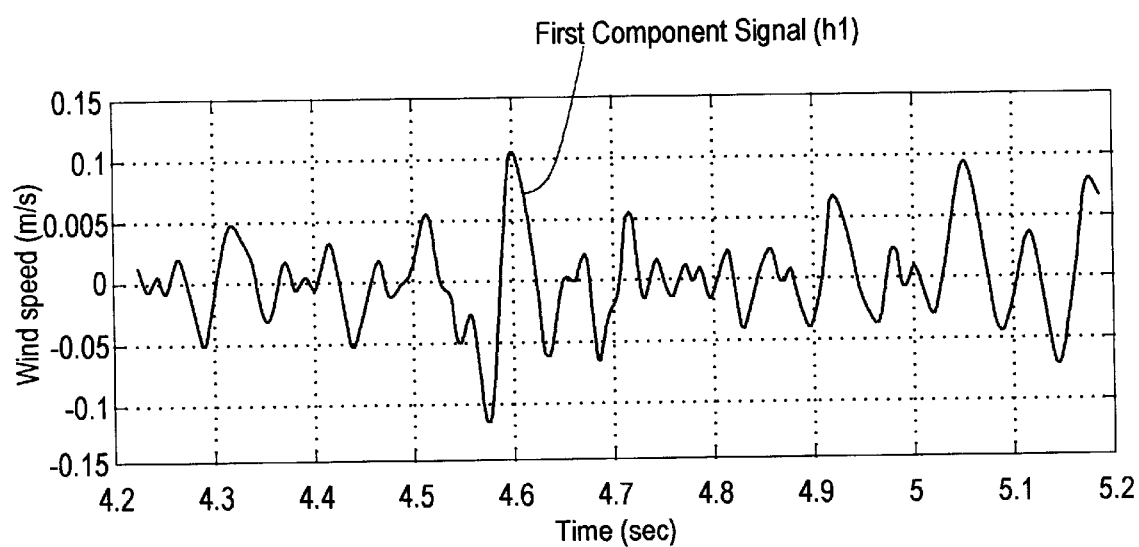
FIGS. 3(c)–(e) are graphs of the first, second and third component signals h1, h11, h21, respectively which are generated by the local extrema Sifting Process of the invention.
Figure 3D:
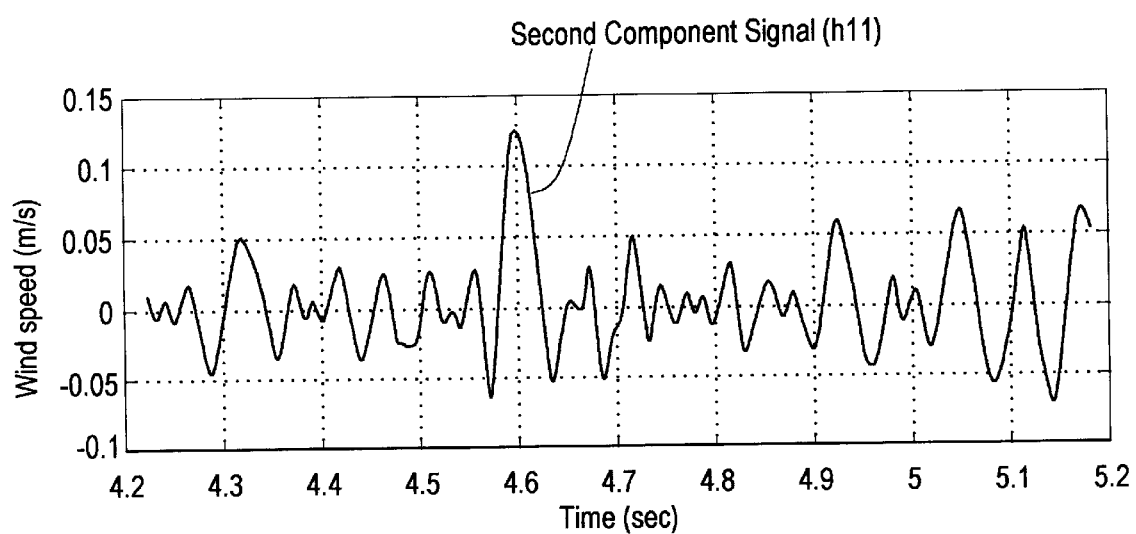
Figure 3E:
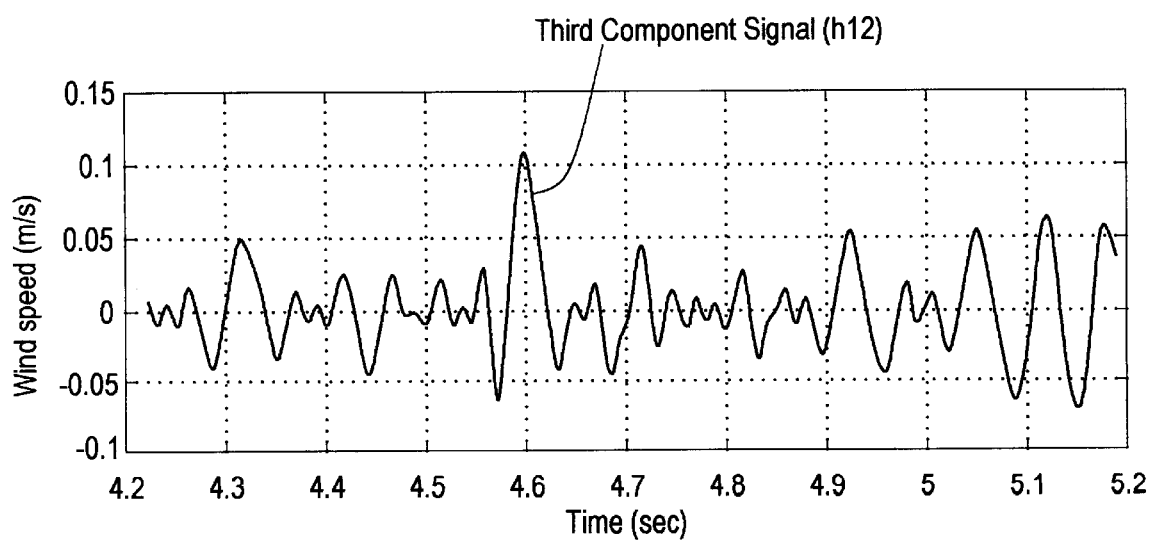
Figure 3F:
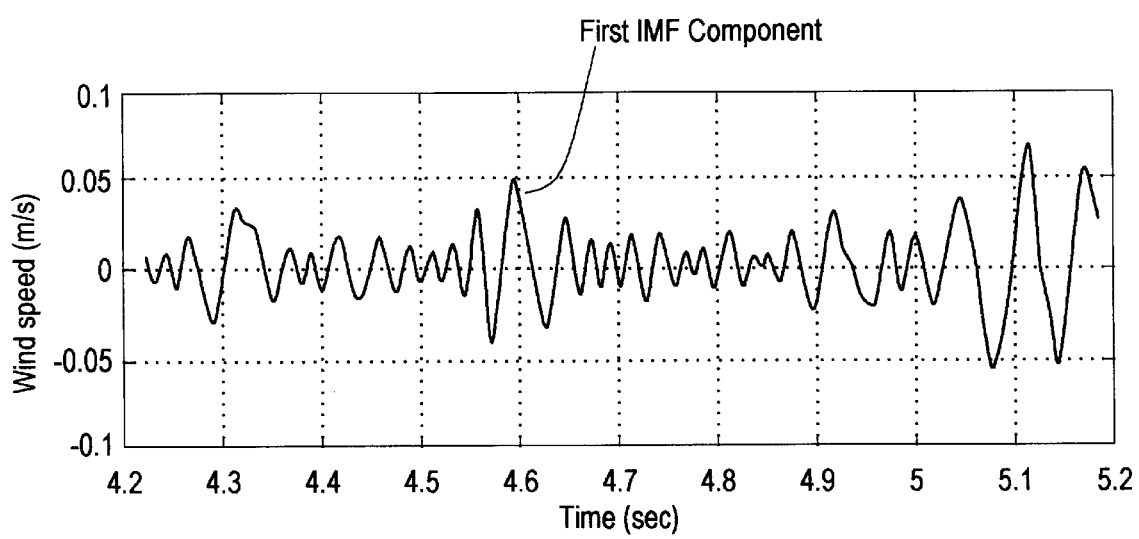
FIG. 3(f) is a graph of the first intrinsic mode function component which is generated by the local extrema Sifting Process of the invention.
Figure 3G:
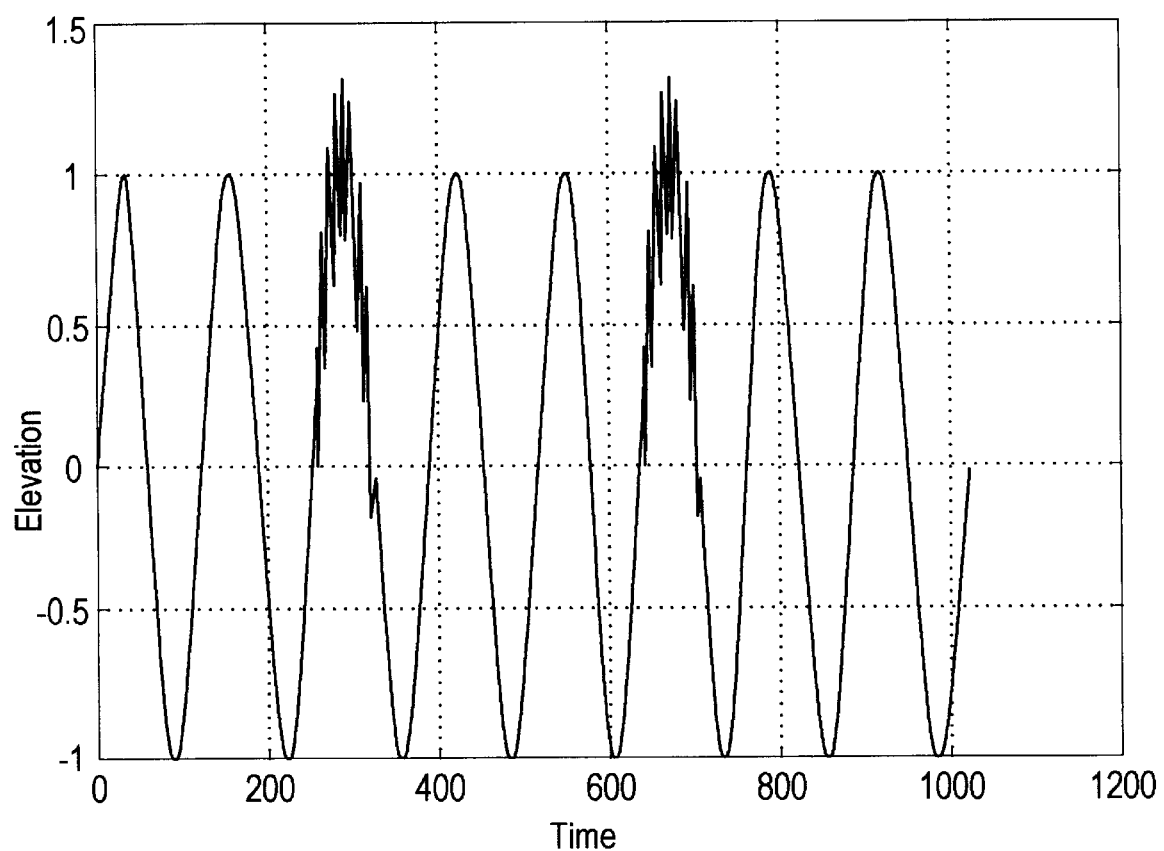
FIG. 3(g) is a graph of data with intermittence for illustrating an optional intermittency test of the invention.
Figure 3H:
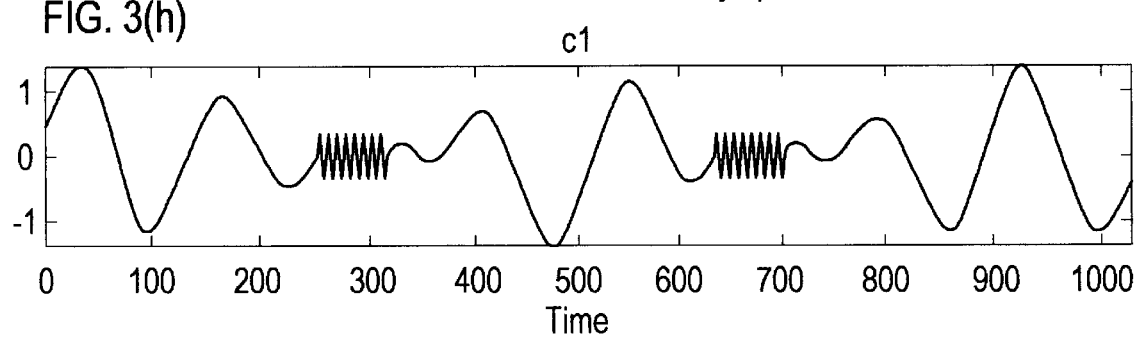
FIGS. 3(h)–(j) are graphs of the first, second, and third intrinsic mode functions when the local extrema Sifting Process is applied to the data of FIG. 3(g) without applying the intermittency test option.
Figure 3I:
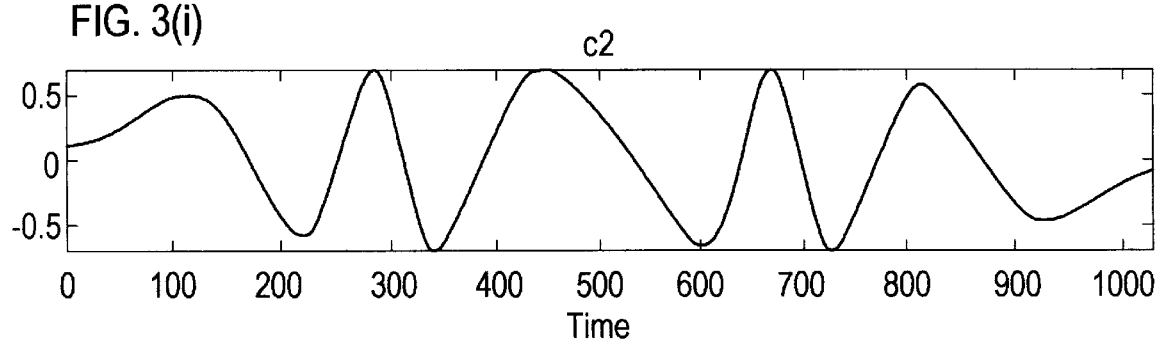
Figure 3J:
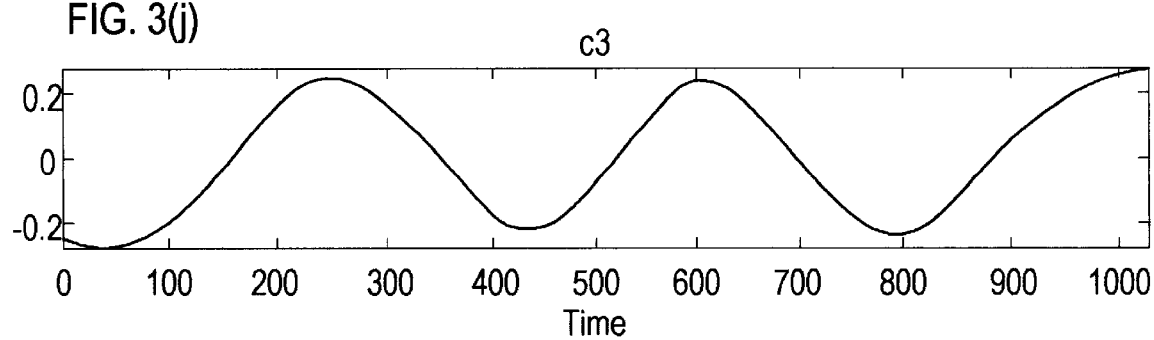
Figure 3K:
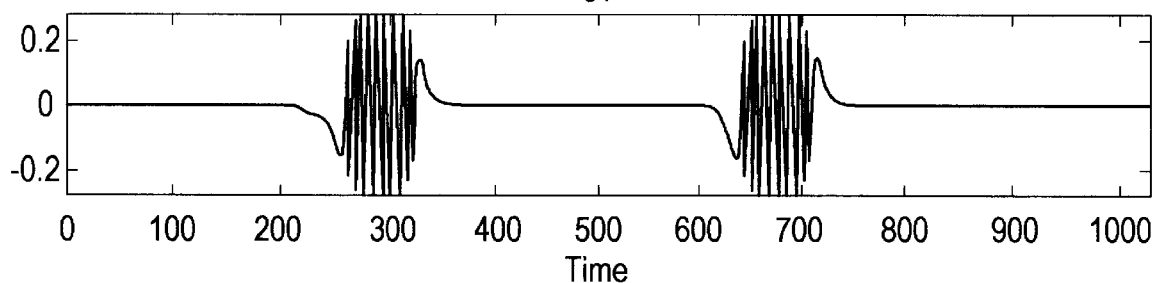
FIGS. 3(k)–(m) are graphs of the first, second, and third intrinsic mode functions when the local extrema Sifting Process is applied to the data of FIG. 3(g) which applies the intermittency test option.
Figure 3L:
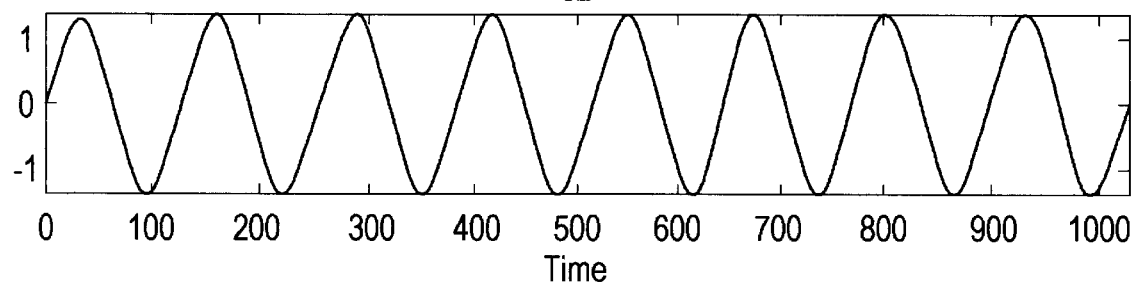
Figure 3M:
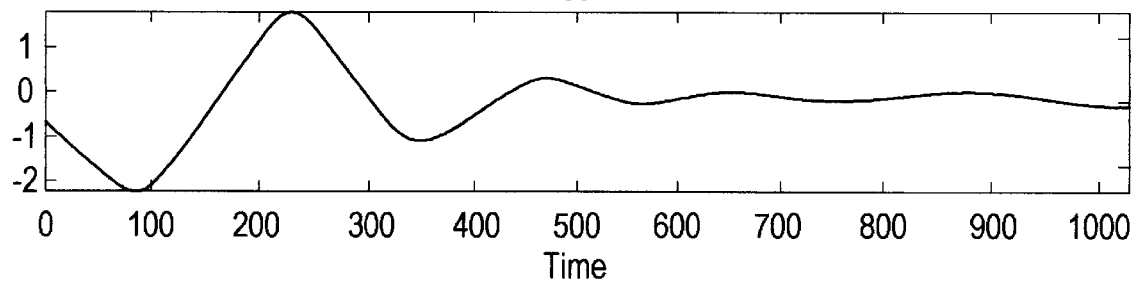

An example of such intermittency is given in FIG. 3(g), in which small scale waves appear only intermittently. By strictly applying of the local extrema Sifting Process (without the intermittency tests), the invention extracts the IMF's shown in FIGS. 3(b)–(j), in which two drastically different time scales are present in the first IMF component (FIG. 3(h)). This mixing of modes breaks up the main wave train with small, intermittent oscillations In contrast, if intermittency tests (201,222) are employed (which utilize a preassigned value of n-times the shortest distance between waves), the invention extracts the IMF's shown in FIGS. 3(k)–(m), in which the modes are clearly and physically separated. The effective step to eliminate the mode mixing is achieved by treating the local extrema which failed the intermittency test as local maxima and minima (steps 202 and 212), respectively. Therefore, the upper and lower envelope will be identical to the original data reference line.

The intermittency tests (201,221) and the further steps (202,222) are optional. By selecting an artificially large n value utilized in steps 201 and 221 to test for intermittency, the test will be effectively passed. Otherwise, the intermittency test can be bypassed at the initial selection of the program.

Then, the method constructs an upper envelope 20 of the physical signal 10 in step 210. The upper envelope 20 is shown in FIG. 3(b) using a dot-dashed line. This upper envelope 20 is preferably constructed with a cubic spline that is fitted to the local maxima.

Next, the local minimum values of the physical signal 10 are identified in step 220. To complete the envelope, a lower envelope 30 is constructed from the local minimum values in step 230. The lower envelope 30 is also shown in FIG. 3(b) using a dot-dash line. Like the upper envelope 20, the lower envelope 30 is preferably constructed with a cubic spline that is fitted to the local minima.

The upper and lower envelopes 20, 30 should encompass all the data within the physical signal 10. From the upper and lower envelopes 20, 30, an envelope mean 40 is the determined in step 240. The envelope mean 40 is the mean value of the upper and lower envelopes 20, 30. As can be seen in FIG. 3(b), the envelope mean 40 bisects the physical signal 10 quite well.

Then, the method generates the first component signal $h_1$ in step 250 by subtracting the envelope mean 40 from the physical signal 10. This computer implemented step may also be expressed as:

$$X(t) - m_1 = h_1 \qquad (1)$$

Where the envelope mean 40 is $m_1$ and the physical signal is X(t).

FIG. 3(c) shows the first component signal $h_1$. Ideally, the first component signal $h_1$ should be an IMF, for the construction of $h_1$ described above seems to have made $h_1$ satisfy all the requirements of an IMF. In reality, however, a gentle hump that resides on a slope region of the data can become an extremum when the reference coordinate is changed from the original rectangular coordinate to a curvilinear coordinate. For example, the imperfection of the envelopes 20, 30 can be seen by observing the overshoots and undershoots at the 4.6 and 4.7 second points in FIG. 3(b).

An example of this amplification can be found in the gentle hump between the 4.5 and 4.6 second range in the data in FIG. 3(a). After the first round of sifting, the gentle hump becomes a local maximum at the same time location in the first component signal $h_1$ shown in FIG. 3(c). New extrema generated in this way actually recover the proper modes lost in the initial examination. Thus, the local extrema Sifting Process extracts important information from the signal which may be overlooked by traditional techniques. In fact, the Sifting Process can recover low amplitude riding waves, which may appear as gentle humps in the original signal, with repeated siftings.

Still another complication is that the envelope mean 40 may be different from the true local mean for nonlinear data. Consequently, some asymmetric wave forms can still exist no matter how many times the data are sifted. This must be accepted because, after all, the inventive method is an approximation as discussed before.

Other than these theoretical difficulties, on the practical side, serious problems of the spline fitting can occur near the ends, where the cubic spline fitting can have large swings. Left by themselves, the end swings can eventually propagate inward and corrupt the whole data span especially in the low frequency components. A numerical method has been devised to eliminate the end effects details of which will be given later. Even with these problems, the Sifting Process can still extract the essential scales from the data.

The Sifting Process serves two purposes: to eliminate riding waves and to make the wave profiles more symmetric. Toward these ends, the Sifting Process has to be repeated. Because only the first component signal $h_1$ has been generated so far, the decision step 260, which applies stopping criteria (such as testing successive component signals to see if they satisfy the definition of an IMF), is bypassed during the first iteration.

Thus, step 265 is performed which treats the component signal as the physical signal in the next recursion of the Sifting Process. The next recursion is then performed by executing steps 200–250. In step 250, the second component signal $h_{11}$ is generated by subtracting the envelope mean $m_{11}$ from the physical signal (in this iteration, the first component signal $h_1$ is treated as the physical signal). In more formal terms:

$$h_1 - m_{11} = h_{11} \quad (2)$$

FIG. 3(d) shows the second component signal $h_{11}$. Although the second sifting shows great improvement in the signal with respect to the first sifting, there is still a local maximum below the zero line. After a third sifting, the result (third component signal $h_{12}$) is shown in FIG. 3(e). Now all the local maxima are positive, and all the local minima are negative, but to ensure this configuration is stable, the local extrema Sifting Process should be further repeated. In general, the Sifting Process is repeated at least 3 more times and, in general, K times to produce $h_{1k}$. If no more new extrema are generated, then $h_{1k}$ is an IMF. In formal terms:

$$h_{1(k-1)} - m_{1k} = h_{1k}; \quad (3)$$

The resulting first IMF component is shown in FIG. 3(f) after 9 siftings. The first IMF component $C_1$ of the physical signal may be designated as such in step 270 and stored by step 275 in memory 415:

$$c_1 = h_{1k}; \quad (4)$$

As mentioned above, all these manipulations are carried out numerically in a computer 410. There is no explicit close form analytic expression for any of the computer implemented steps.

As described above, the process is indeed like sifting of the data by the computer 410 because it separates the finest (shortest time scale) local mode from the data first based only on the characteristic time scale. The Sifting Process, however, has two effects:

a. to eliminate riding waves, and b. to ensure the envelopes generated by maxima and minima are symmetric.

While the first condition is necessary for the instantaneous frequency to be meaningful (as discussed below), the second condition is also necessary in case the neighboring wave amplitudes have too large a disparity.

Unfortunately, the effects of the second condition, when carried to the extreme, could obliterate the physically meaningful amplitude fluctuations. Therefore, the Sifting Process should be applied with care, for carrying the process to an extreme could make the resulting IMF a pure frequency modulated signal of constant amplitude.

To guarantee that the IMF component retains enough physical sense of both amplitude and frequency modulations, a stopping criterion is employed to stop the generation of the next IMF component.

Figure 1C:
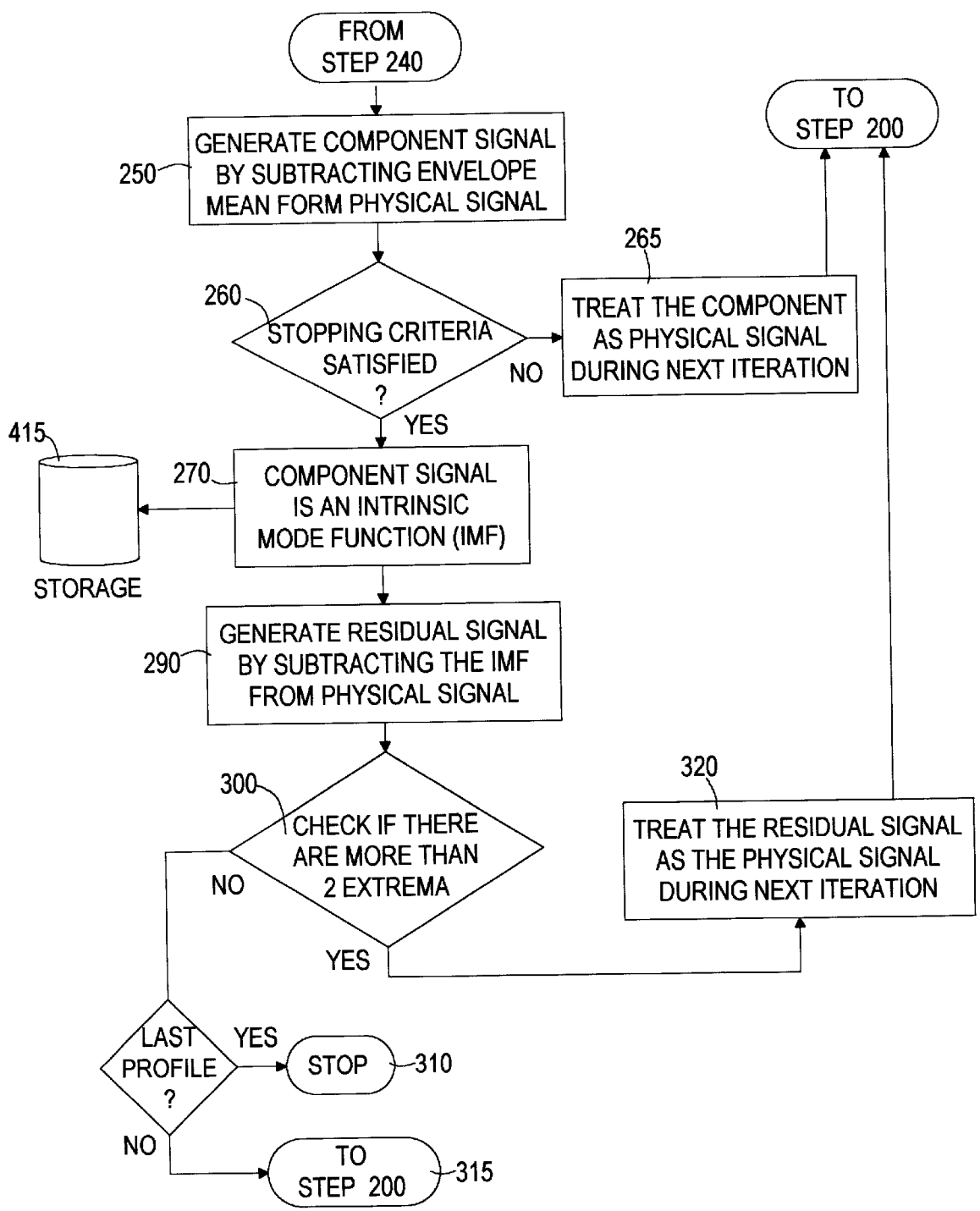
FIG. 1(c) is a continuation of the high-level flowchart in FIG. 1(b) describing the local extrema Sifting Process.

This stopping criterion is part of the computer implemented method and is shown as step 260 in FIG. 1(c). Step 260 is a decision step that decides whether the stopping criteria has been satisfied.

The preferred stopping criteria determines whether the number of zero crossings is equal to the number of extrema and whether successive siftings do not produce additional numbers of extrema. If these conditions are satisfied, then the stopping criteria has been satisfied and the flow passes to step 270.

An alternative stopping criteria determines whether three successive component signals satisfy the definition of IMF. If three successive component signals all satisfy the definition of IMF, then the Sifting Process has arrived at an IMF and should be stopped by proceeding to step 270. If not, step 260 starts another recursion of the Sifting Process by proceeding to step 265 as described above.

Alternatively, another stopping criteria could be used that determines whether successive component signals are substantially equal. If successive component signals are substantially equal, then the Sifting Process has arrived at an IMF and should be stopped by proceeding to step 270. If not, step 260 starts another iteration by proceeding to step 265 as described above.

Determining whether successive component signals are substantially equal in the alternative stopping criteria is preferably done by limiting the size of the standard deviation, sd, computed from the two consecutive sifting results as follows:

$$sd = \sum_{t=0}^{T}\left[\frac{|(h_{1(k-1)}(t) - h_{1k}(t))|^2}{h_{1(k-1)}^2(t)}\right] \quad (5)$$

A very rigorous and preferred value for sd is set between 0.2 and 0.3. Of course, if faster processing is desired, then a trade-off such as a less rigorous value for sd may be used.

Overall, the first IMF component $c_1$ should contain the finest scale or the shortest period component of the physical signal 10.

Before extracting the next IMF component, a test should be conducted to determine if the local extrema Sifting Process should stop. The stopping criteria is shown in Step 300. Step 300 determines whether the component signal has more than 2 extrema. If not, all of the IMF's have been extracted and the local extrema Sifting Process is stopped by proceeding to step 310. If so, then additional IMF's may be extracted by continuing the process in step 320.

Step 270 recognizes that an IMF component has been successfully generated by the Sifting Process by setting the component signal equal to an intrinsic mode function. More specifically, step 270 causes the computer 410 to store the component signal $h_{1k}$ as an intrinsic mode function in memory 415.

Then, the first IMF is separated from the physical signal in step 290 to generate a residual signal (r). In particular, a residual signal (r) is generated by subtracting the intrinsic mode function from the physical signal. In formal terms:

$$X(t) - c_1 = r_1 \quad (6)$$

Because the residue, $r_1$, still includes information of longer period components, it is treated as the new physical data and subjected to the same Sifting Process as described above. Step 320 performs this function by treating the residual signal as the physical signal in the next iteration of the recursive Sifting Process. Thereafter, the next iteration is performed beginning with the execution of step 200 as described above.

The Sifting Process is analogous to a mechanical sieve, except it is implemented here in specially programmed computer and applied to any digital data numerically rather than mechanically.

The Sifting Process is repeated for all the subsequent $r_j$'s. This iterative procedure may be expressed as:

$$r_1 - c_2 = r_2,$$
$$\ldots,$$
$$r_{n-1} - c_n = r_n. \quad (7)$$

Step 300 stops the local extrema Sifting Process for the current profile (physical signal) by proceeding to step 310 if the residual signal $r_n$ has more than 2 extrema or is monotonic. Otherwise, the method proceeds to step 320.

In other words, Step 310 stops the local extrema Sifting Process for the current profile if the residual signal $r_n$ is monotonically increasing or decreasing. This stopping criterion is based on the fact that an IMF cannot be extracted from a monotonic function. If $r_n$ is not monotonically increasing/decreasing, then a next iteration of the Sifting Process is performed for the current profile beginning with step 320.

Even for data with zero mean, the final residue still can be different from zero. For data with a trend, the final residue should be that trend.

In summary, the Sifting Process decomposes each of the profiles [the physical signal X(t)] into a series of intrinsic mode functions and a residue which may be expressed as:

$$X(t) = \sum_{i=1}^{n} c_i + r_n. \quad (8)$$

In other words, the invention extracts a series of IMF's by sifting the physical signal with a computer implemented Empirical Mode Decomposition method. This IMF series cannot be generated or derived by any analytic method. It can only be extracted by the invention through a specially programmed computer through the Sifting Process (local extrema or curvature extrema type).

A third level of iteration is also applied when processing two-dimensional signals as indicated in FIGS. 1(*b*)–(*c*). This third level of iteration sequentially processes each of the profiles that comprise the two-dimensional signal.

In other words, the local extrema Sifting Process is repeated for each of the profiles. This is indicated by decision step 305 which follows the test (step 300) that decides whether to end the current Sifting Process. If step 300 determines that the Sifting Process is complete and that an IMF has been generated for the current profile, then decision step 305 is executed.

Decision step 305 determines whether the last profile has been processed. If no, then the Sifting Process is repeated for the next profile as indicated (step 315) by the procession to step 200. If the last profile has been processed, then the Sifting Process is completed for the two-dimensional signal as indicated by stop step 310. In this way, the generation of IMF's for each profile is completed and the mainflow of the process may then proceed from step 110 to either analyze the IMF's in step 115 or manipulate the IMF's in step 150 as further described below.

Illustration of Local Extrema Sifting Process

To illustrate the Local Extrema Sifting Process, consider FIG. 13(*a*) which shows a physical signal representing wind data collected in a laboratory wind-wave tunnel with a high frequency response Pitot tube located 10 cm above the mean water level. The wind speed was recorded under the condition of an initial onset of water waves from a calm surface. Clearly, the physical signal is quite complicated with many local extrema but no zero-crossings such that the time series represents all positive numbers.

Although the mean can be treated as a zero reference, defining it is difficult, for the whole process is transient. This example illustrates the advantage of adopting the successive extrema for defining the time scale and the difficulties of dealing with nonstationary data. In fact, a physically meaningful mean for such data is impossible to define using standard methods, the EMD eliminates this difficulty.

FIG. 13(*b*) shows the wind speed signal of FIG. 13(*a*) on a different scale for comparison purposes. FIGS. 13(*c*)–(*k*) show all the IMF's obtained from repeatedly sifting the wind speed signal in FIG. 13(*b*). The efficiency of the invention is also apparent: the local extrema Sifting Process produces a total of 9 intrinsic mode function components while the Fourier transform needs components which number as many as half of the total number of points in a given window to represent the wind data with the same accuracy.

The separation of the wind speed data into locally non-overlapping time scale components is clear from FIGS. 13(*c*)–(*k*). In some components, such as $c_1$ and $c_3$, the signals are intermittent, then the neighboring components might include oscillations of the same scale, but signals of the same time scale would never occur at the same locations in two different IMF components.

The components of the EMD are usually physical, for the characteristic scales are physically meaningful.

Figure 14A:
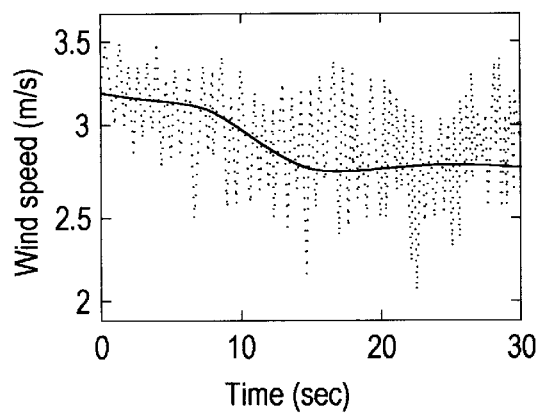
FIGS. 14(a)–(j) are a series of graphs illustrating the successive reconstruction of the original wind speed data from the intrinsic mode functions.

To further confirm the validity and completeness of the Sifting Process, the wind speed signal can be reconstructed from the IMF components. FIGS. 14(a)–(i) show this reconstruction process starting from the longest period IMF to the shortest period IMF in sequence. For example, FIG. 14(a) shows the wind speed signal and the longest period component, $c_9$, which is actually the residue trend, not an IMF.

By itself, the fitting of the trend is quite impressive, and it is very physical: the gradual decrease of the mean wind speed indicates the lack of drag from the calm surface initially and the increasing of drag after the generation of wind waves. As the mean wind speed deceases, the amplitude of the fluctuation increases, another indication of wind-waves interactions.

Figure 14B:
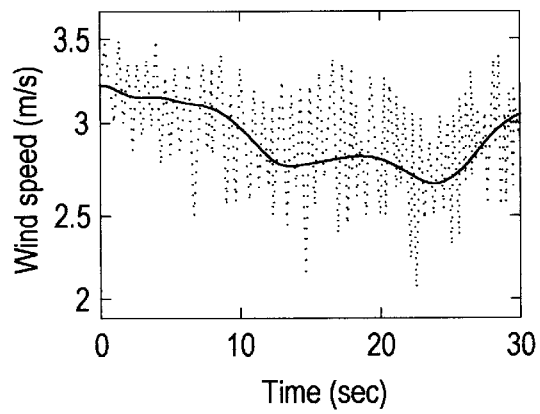
Figure 14C:
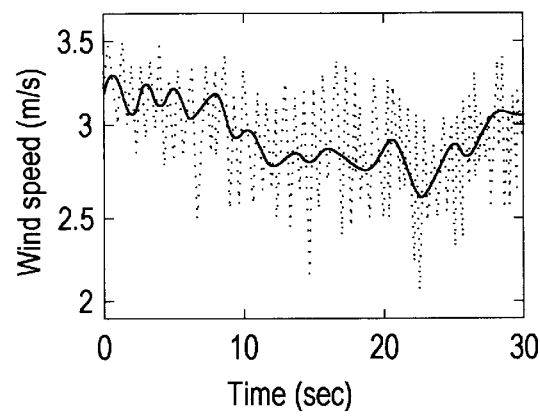
Figure 14D:
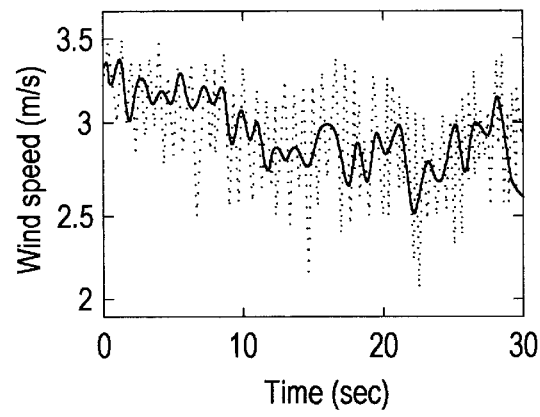
Figure 14E:
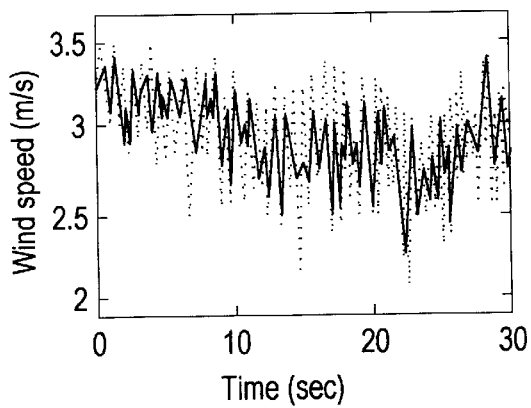
Figure 14F:
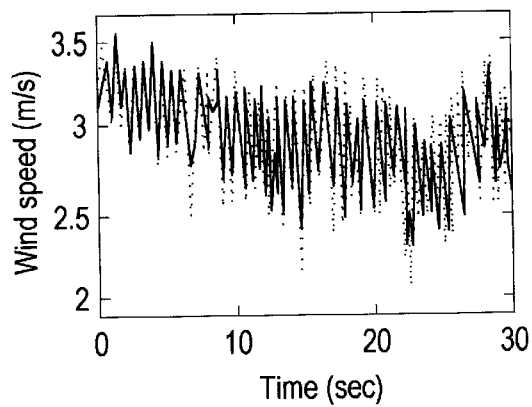
Figure 14G:
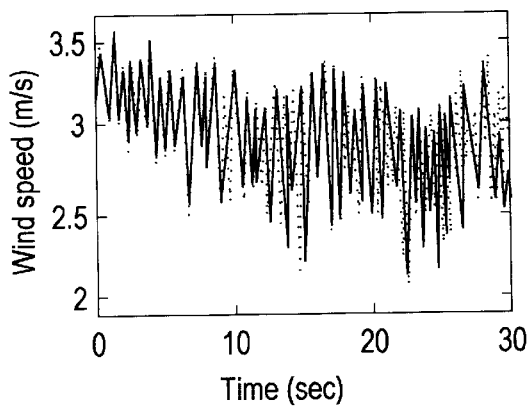
Figure 14H:
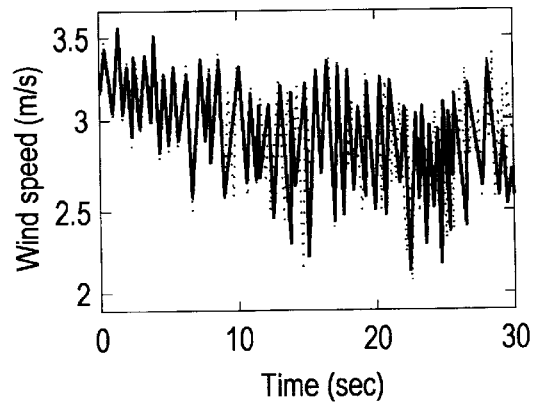
Figure 14I:
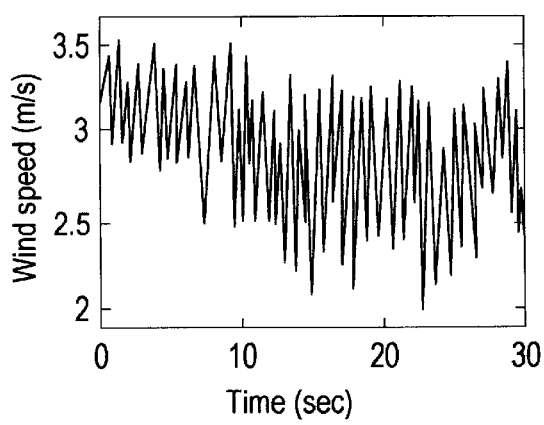
Figure 14J:
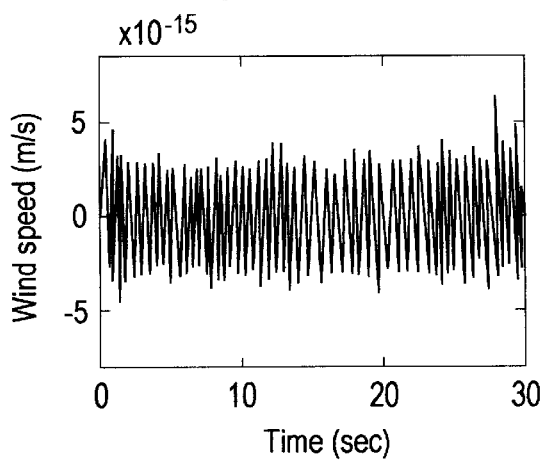

By adding the next longest period component, $c_8$, the trend of the sum, $c_9+c_8$, takes a remarkable turn, and the fitting to the wind speed signal looks greatly improved as shown in FIG. 14(b). Successively adding more components with increasing frequency results in the series of FIGS. 14(c)–(i). The gradual change from the monotonic trend to the final reconstruction is illustrative by itself. By the time the sum of IMF components reaches $c_3$ in FIG. 14(g), essentially all the energy contained in the wind speed signal is recovered. The components with the highest frequencies add little more energy, but they make the data look more complicated. In fact, the highest frequency component is probably not physical, for the digitizing rate of the Pitot tube is too slow to capture the high frequency variations. As a result, the data are jagged artificially by the digitizing steps at this frequency. The difference between the original data and the re-constituted set from the IMF's is given in FIG. 14(j). The magnitude of the difference is $10^{-15}$, which is the resolution limit of the computer 410.

Curvature Extrema Sifting Process

As indicated in FIG. 1(a), generating IMF's for each profile may be performed with either the local extrema Sifting Process shown in FIGS. 1(b)–(c) and described above or the curvature extrema Sifting Process shown in FIGS. 1(d)–(e) and described below.

The local extrema Sifting Process described above is, as the name implies, based on the local extrema of the physical signal. Although this local extrema Sifting Process is an excellent tool, it has difficulty analyzing a composite signal or profile having a weak signal component that cannot itself generate local extrema in the composite signal. This weak signal component physically represents a separate time scale in the physical signal, but often becomes a so-called "hidden scale" that could not be reliably found by the local extrema Sifting Process.

To permit resolving and analyzing such hidden scales, the improvements in this section apply a curvature extrema Sifting Process to amplify the hidden scales. The implementation of this procedure is based on the following discussion of the characteristic time scale.

When interpreting any set of physical data, the most relevant parameters are the time scale and the energy distribution with respect to the time scale. Until now no clear definition of the local time scale has been presented. In Fourier analysis, time scale is defined as the periods of continuous and constant amplitude trigonometric components. As discussed in the parent applications, such a definition only provides a global averaged meaning to the energy and time scale. As such, the Fourier definitions are totally divorced from the reality of time variations of either the amplitude or the frequency.

Statistical Definitions of the time scale have been made by Rice, S. O. [Mathematical Analysis of Random Noise. Bell Sys. Tech. J. 23, 282–310 (1944); Power Spectrum and Correlation Functions, Bell Sys. Tech. J. 23, 310–332 (1944); Mathematical Analysis of Random Noise, Bell Sys. Tech. J. 24, 46–108 (1945); Noise Through Nonlinear Devices, Bell Sys. Tech. J. 24, 109–156 (1945)]. In this series of papers, Rice computes the expected number of zero-crossings, and the extrema for any data under linear, stationary and normal distribution assumptions. Mathematically, the time scales are defined for any data $x(t)$, as follows: the locations of t for $x(t)=0$ is defined as the location of the zero-crossings. The time spacing betweens successive zero-crossings is the zero-crossing time scale. Furthermore, the locations of t for $$x(t)=0 \tag{9}$$

are defined as the locations of the extrema. The time spacing between successive extrema is the extrema time scale and is used in the local extrema Sifting Process as described above.

Under the linear, stationary and normal distribution assumptions, the expected number of zero crossings $N_0$ is given by:

$$N_0^2 = \frac{1}{\pi}\left(\frac{m_2}{m_0}\right) \tag{10}$$

and the expected number of extrema $N_e$ is given by:

$$N_e^2 = \frac{1}{\pi}\left(\frac{m_4}{m_2}\right) \tag{11}$$

in which $m_I$ is the I-th moment of the Fourier spectrum. Although Rice's definitions are rigorous, they only offer a global measure of the signal. Furthermore, the Rice definitions cannot be applied to nonlinear and/or nonstationary data.

Because of the limitations set forth in Rice's assumptions, his results have also created some paradoxes: in may data sets, the number of the expected extrema computed from the above formula becomes unbounded. This is because the Fourier power spectra usually have asymptotic power law forms. For example, if the spectrum has a −3 power law spectrum, the $m_2$ is unbounded. For white noise or a delta functions, the spectrum is white and the zero crossing is undefined. Because most data sets are assumed to be linear and stationary, the question arises as to why one cannot apply Rice's formula. For example, ocean wave data has an asymptotic frequency spectrum which has a power law between −4 and −5. Then, according to the above formula, the expected number of extrema $N_e$ is unbounded. Yet, one can certainly count the extrema without any difficulty.

This dilemma, however, has not alerted investigators to question Rice's formulae and the assumptions involved, but it has led most to reject any formula that involves moments higher than the 4th. Such an approach limited the past statistical measure of time scale to the computation of zero-crossings which is too crude to be of any real use.

The spacing of extrema does offer a measure of the time scale and can be used to measure wide band data with multiple riding waves. Refined as the extrema criterion is, it still lacks precision sometimes. By examining the data in closer detail, it can be found that the extrema spacing can miss some subtle time scale variations especially when a weak signal oscillation is overwhelmed by a larger oscillation.

To remedy this imprecision, the curvature extrema Sifting Process was invented. To account for the weak signal or hidden scale, this invention introduces another type of time scale based on the variation of curvature. In this regard, a conventional curvature function $$\frac{\ddot{x}}{(1+\dot{x})^{3/2}} \quad (12)$$

is utilized by the invention to introduce a curvature based time scale and curvature extrema Sifting Process. In terms of mechanics, this conventional curvature function is a measure of weighted acceleration: any change of sign in curvature in displacement time series indicates a change of sign in the force. As such, the curvature variation indeed has strong dynamic significance. As described above, the local extrema statistics has encountered difficulties already. If applied to the curvature function, the expected number of extrema in curvature would involve the 8th moment of the spectrum from the data. Fortunately, this difficulty is an artifact and the consequence of the linear and stationary assumptions invoked. One certainly can compute the curvature and its extrema, then count them. Consequently, the failure of the Rice model is another indication of the falsehood of the commonly invoked linearity and stationarity assumptions.

According to the invention, there are now three ways to measure the time spans: between successive zero-crossings, between successive extrema, and between successive curvature extrema. The last measure based on curvature extrema is newly introduced in the parent application and will be fully described in relation to the flowcharts of FIGS. 1(d)–(e) below.

The curvature extrema Sifting Process is based on the local extrema Sifting Process described in relation to FIGS. 1(b)–(c) above. The basic difference is the method of determining extrema for the Sifting Process.

More specifically, the curvature extrema Sifting Process begins in FIG. 1(d) with the digitized, current profile (physical signal) from step 115 (FIG. 1(a)). The frame end points step 117 described above may then be applied to the physical signal.

Then, step 500 computes the curvature function of the physical signal by applying the curvature equation above. Once the curvature function is computed, the invention finds extrema in the curvature function (step 510).

Step 520 then identifies corresponding curvature extrema corresponding to extrema values in the curvature function. Step 520 may be performed by recording the time at which each extrema in the curvature function occurs then finding corresponding data points in the physical data at those same time instances.

Step 530 then identifies local extrema in the physical data in a manner equivalent to steps 200 and 220 in the local extrema Sifting Process of FIG. 1(b).

The local extrema and the curvature extrema are then combined to form a total set of extrema in step 540.

The optional intermittency test (steps 550 and 555) may then be applied to the total set of extrema. This intermittency test is equivalent to the intermittency test described above (steps 201, 202, 221 and 222).

Then the upper and lower envelopes may be constructed in step 560 based on the total set of extrema. Furthermore, an envelope mean is calculated by step 570. These steps are essentially the same as the local extrema Sifting Process with the difference being the set of extrema utilized to construct the envelopes and envelope mean. Similarly, remainder of the curvature extrema Sifting Process is nearly identical to the local extrema Sifting Process as indicated by the like reference numerals applied in FIGS 1(e) and 1(c), respectively.

The steps that recursively and iteratively apply the curvature extrema Sifting Process differ from the local extrema Sifting Process. Namely, the recursion executed by step 265 loops back to step 580 (FIGS. 1(d)–(e)) in the curvature extrema Sifting Process which identifies the local extrema in the physical signal. Furthermore, the iteration executed by step 320 loops back to step 500, described above, which begins the identification of curvature extrema.

In this way, the invention utilizes (1) local extrema for the component signal that is generated at each recursion of the curvature extrema Sifting Process and which becomes the physical signal during the next recursion and (2) curvature extrema and local extrema for the residual signal that is generated at each iteration of the curvature extrema Sifting Process and which becomes the physical signal during the next iteration.

Figure 1E:
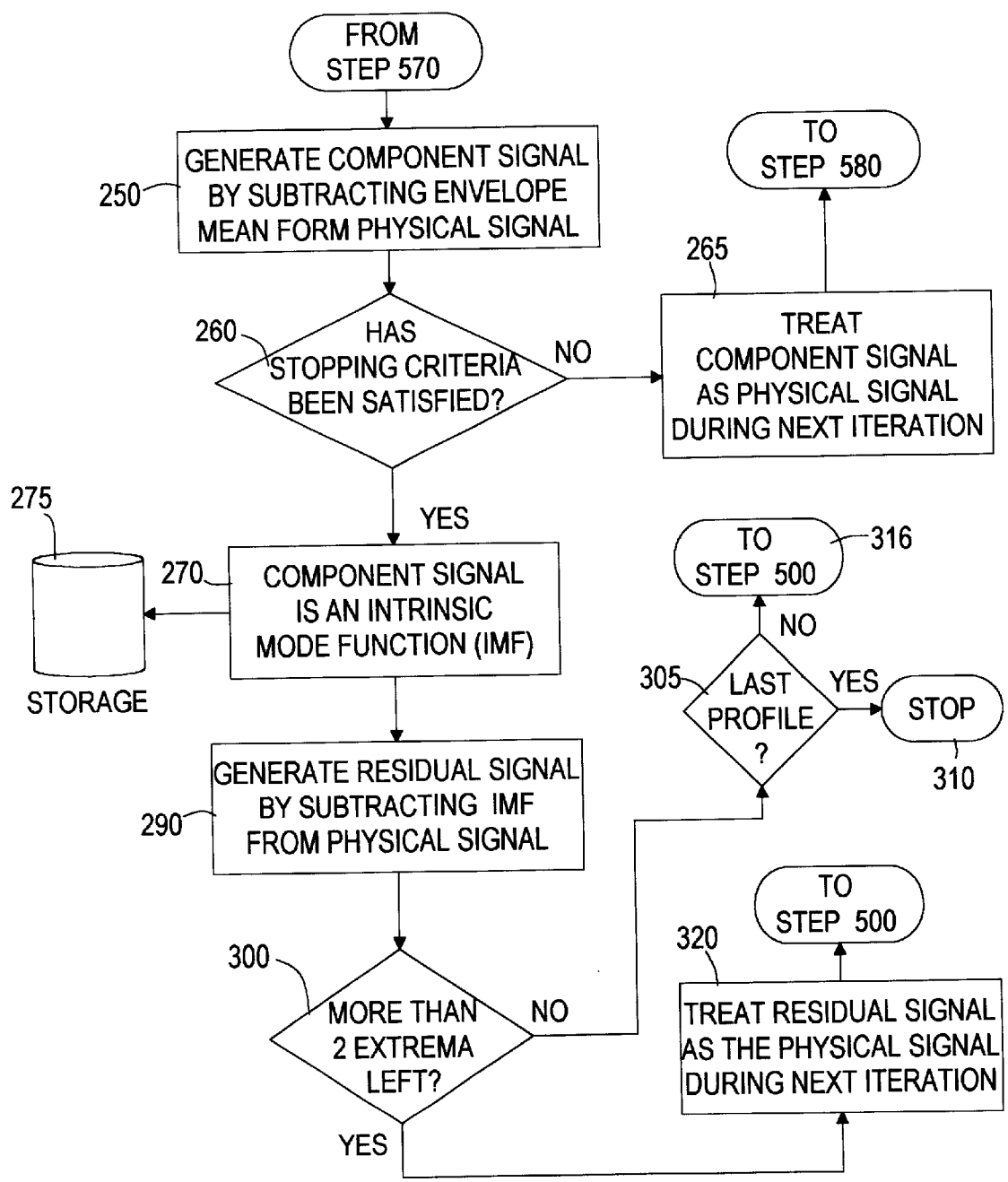
FIG. 1(e) is a continuation of the high-level flowchart in FIG. 1(d) describing the curvature extrema Sifting Process.

A third level of iteration is also applied when processing two-dimensional signals as indicated in FIGS. 1(d)–(e). This third level of iteration sequentially processes each of the profiles that comprise the two-dimensional signal.

In other words, the curvature extrema Sifting Process is repeated for each of the profiles. This is indicated by decision step 305 which follows the test for ending the current Sifting Process in step 300. If step 300 determines that an IMF has been generated for the current profile, then decision step 305 is executed.

Decision step 305 determines whether the last profile has been processed. If no, then the Sifting Process is repeated for the next profile as indicated (step 316) by the procession to step 500. If the last profile has been processed, then the Sifting Process is completed for the two-dimensional signal as indicated by stop step 640. In this way, the generation of IMF's for each profile is complete and the mainflow of the process may proceed from step 110 to either analyze the IMF's in step 115 or manipulate the IMF's in step 150.

Illustration of Curvature Extrema Sifting Process

Figure 4A:
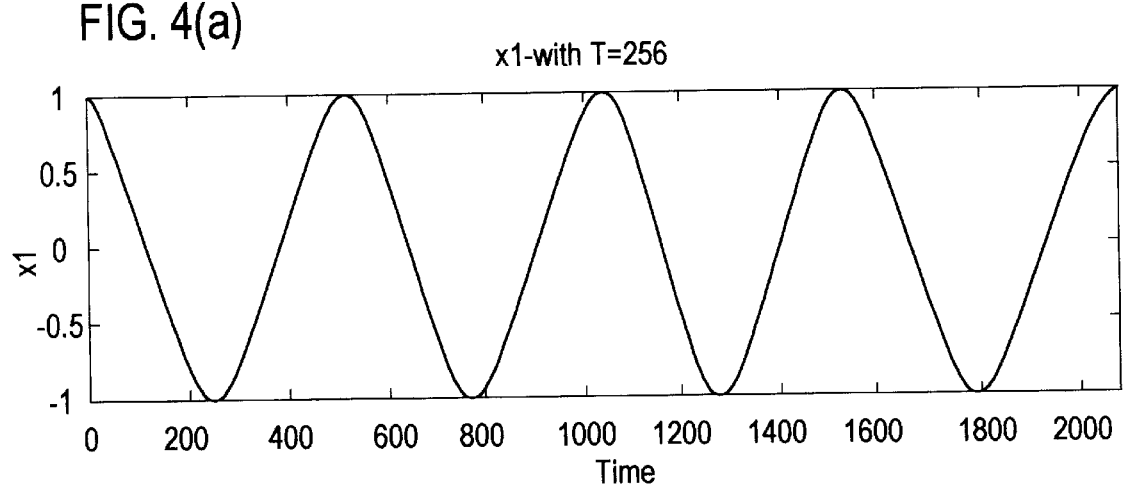
FIG. 4(a) is a graph of a first signal X1 which is for explaining the computer implemented Empirical Mode Decomposition method of the invention using curvature extrema.
Figure 4B:
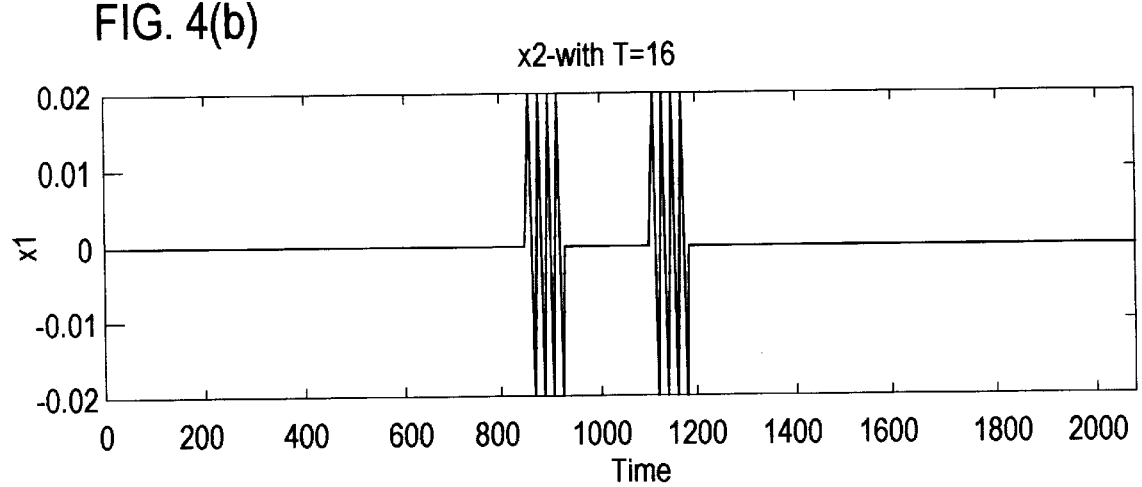
FIG. 4(b) is a graph of a second signal X2 which is for explaining the computer implemented Empirical Mode Decomposition method of the invention using curvature extrema.
Figure 4C:
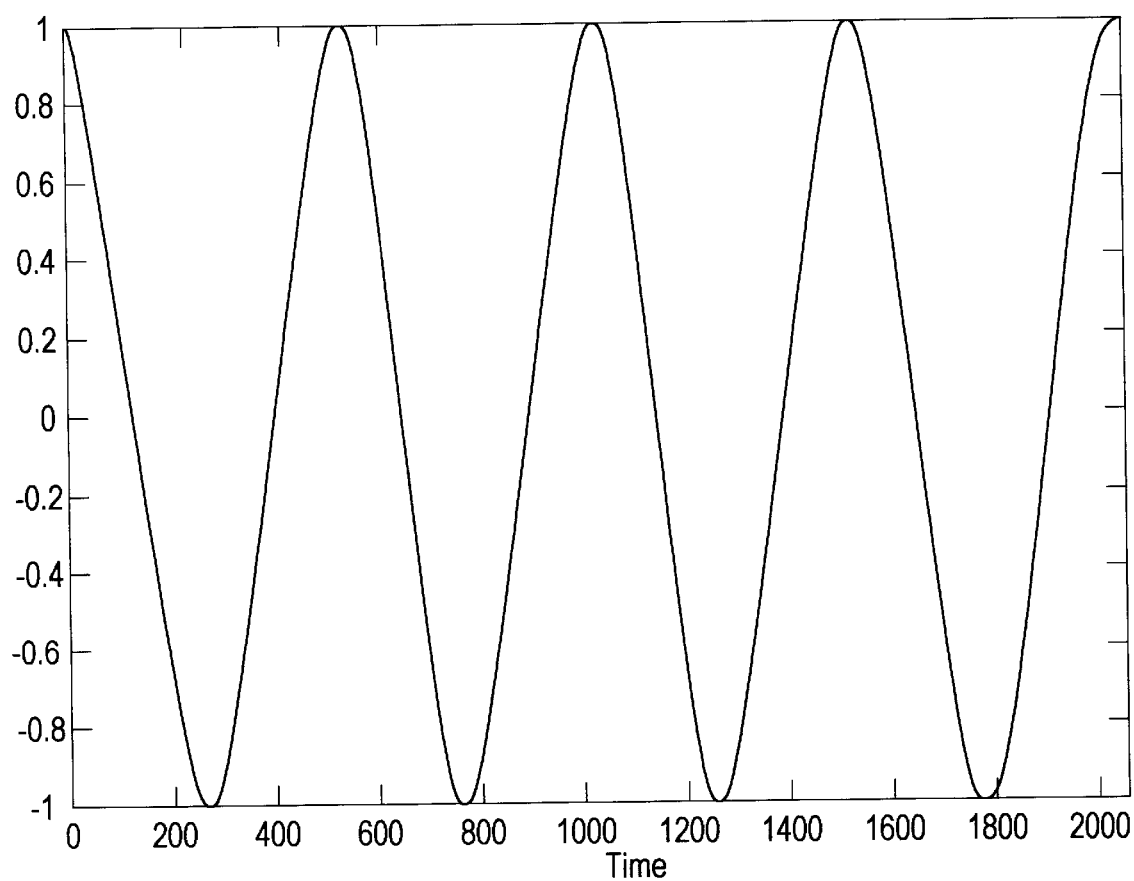
FIG. 4(c) is a graph of a signal X (the summation of signals X1 and X2) which is for explaining the computer implemented Empirical Mode Decomposition method of the invention using curvature extrema.

The first example is a mathematical model in which a low frequency strong signal X1 (FIG. 4(a)) is added to a high frequency weak signal X2 (FIG. 4(b)) having an amplitude of only 2% of strong signal X1 to generate a composite signal X (FIG. 4(c)).

Figure 4D:
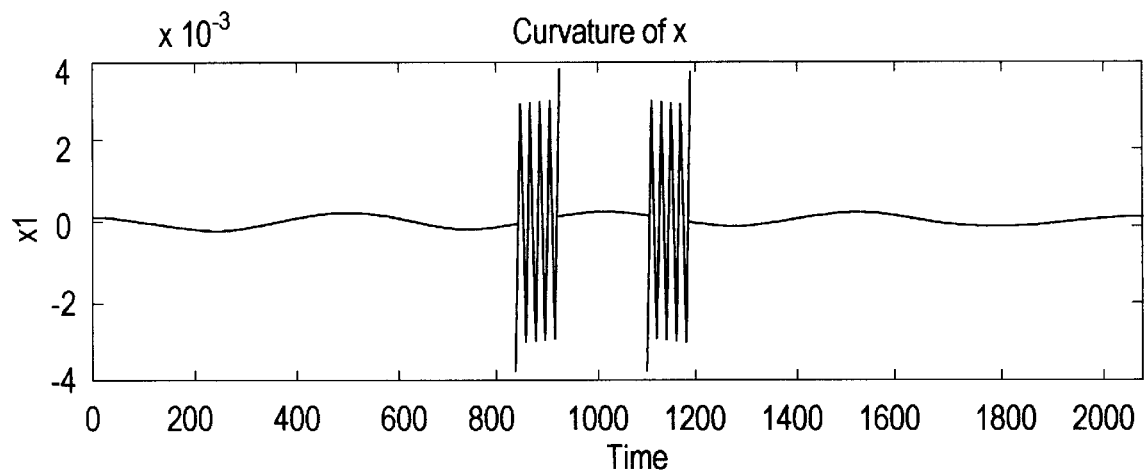
FIG. 4(d) is a graph of the curvature function derived from the signal X and illustrating extrema of the curvature function.
Figure 4E:
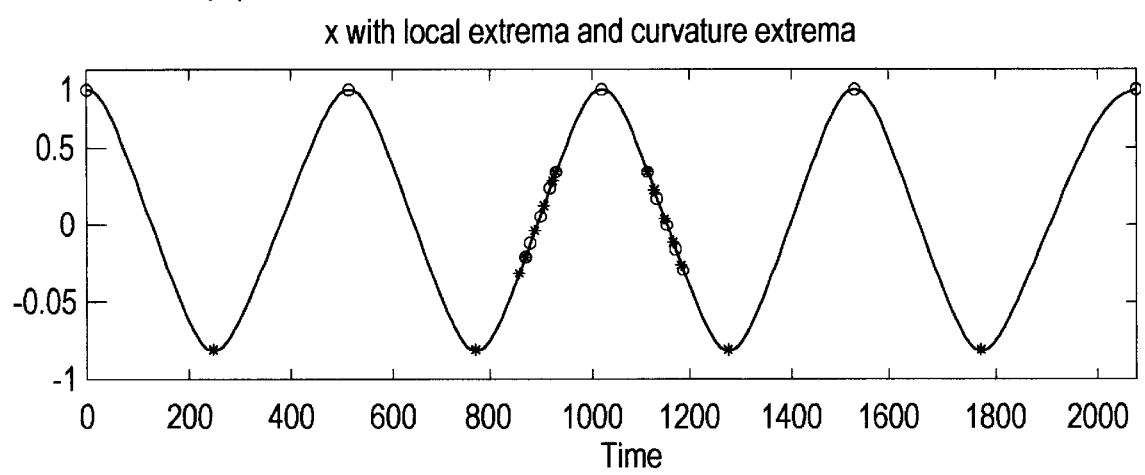
FIG. 4(e) is a graph of the signal X (the summation of signals X1 and X2) illustrating curvature extrema corresponding to the extrema of the curvature function and local extrema of the signal X.
Figure 5A:
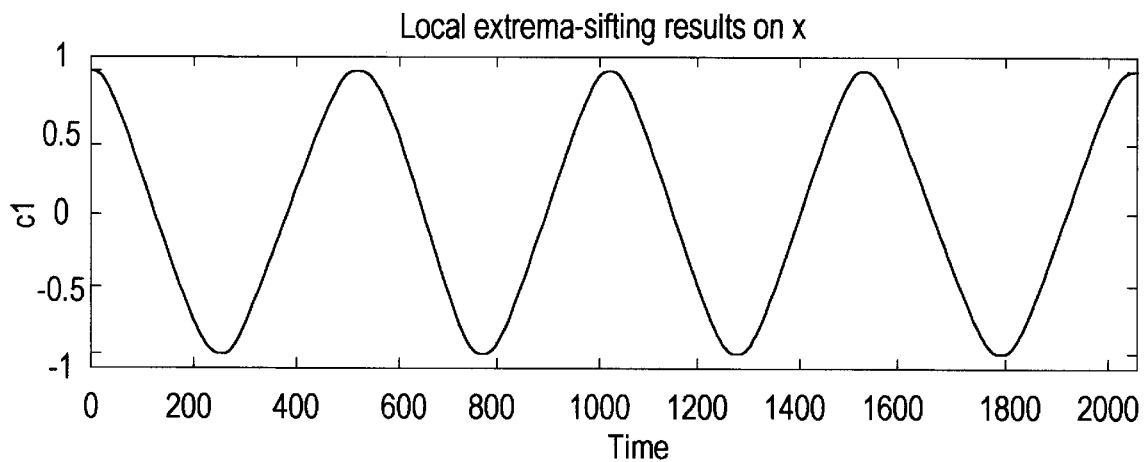
FIGS. 5(a)–(b) are graphs of the first and second intrinsic mode functions (c1 and c2, respectively) when the local extrema Sifting Process is applied to the signal X of FIG. 4(c)
Figure 5B:
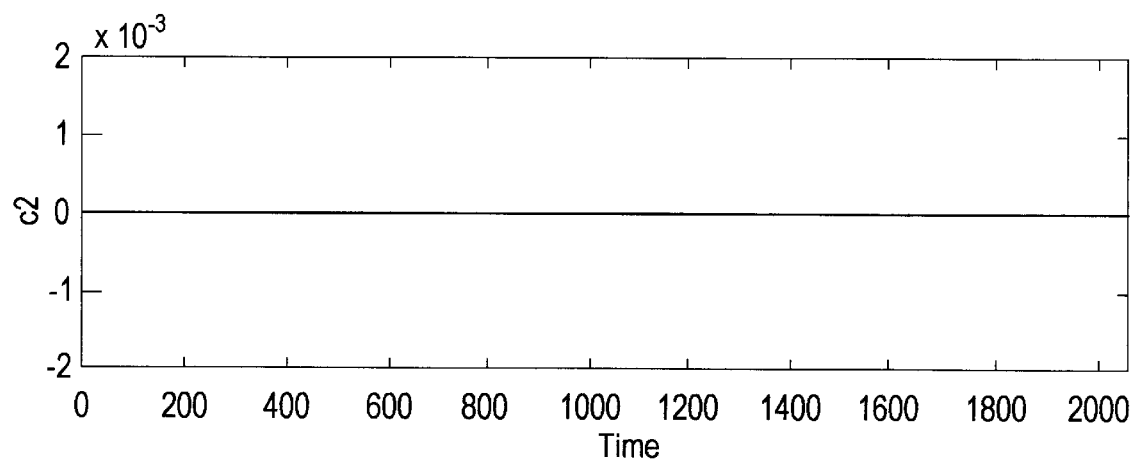

FIG. 4(d) illustrates the curvature function of composite signal X generated by step 500. FIG. 4(e) shows the composite signal X with both the local extrema and curvature extrema. From the total set of extrema, the upper and lower envelopes may be constructed in a manner similar to that shown in FIG. 3(b).

Because of the small amplitude of X2 relative to X1, the weak signal X2 cannot generate local extrema in the composite signal X (see FIG. 4(c)). Therefore, the local extrema Sifting Process only produces two Intrinsic Mode Functions c1 and c2 shown in FIGS. 5(a)–(b), respectively. Actually, there is only one IMF c1 which corresponds to the strong signal X1 and the second IMF c2 is essentially zero. Thus, the local extrema Sifting Process fails to resolve the second IMF corresponding to the weak signal X2.

Figure 6A:
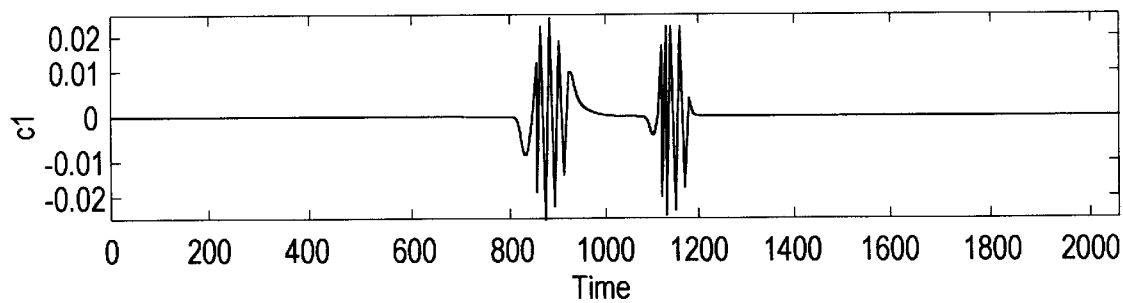
FIGS. 6(a)–(c) are graphs of the first, second, and third intrinsic mode functions (c1, c2, and c3 respectively) when the curvature extrema Sifting Process is applied to the signal X of FIG. 4(c) and illustrate the advantages of curvature extrema Sifting over local extrema Sifting.
Figure 6B:
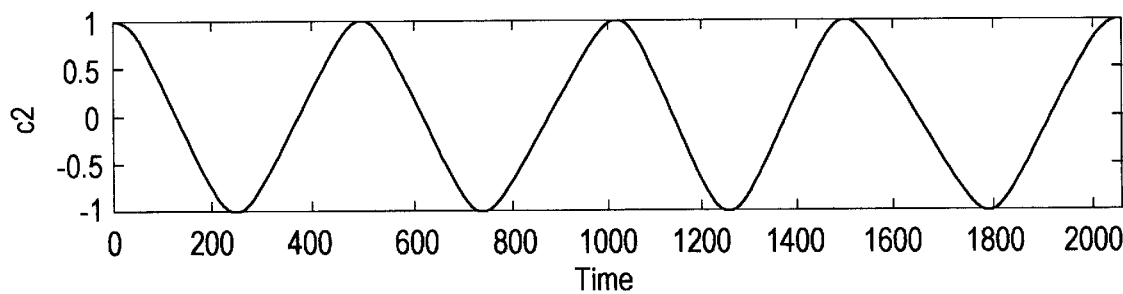
Figure 6C:
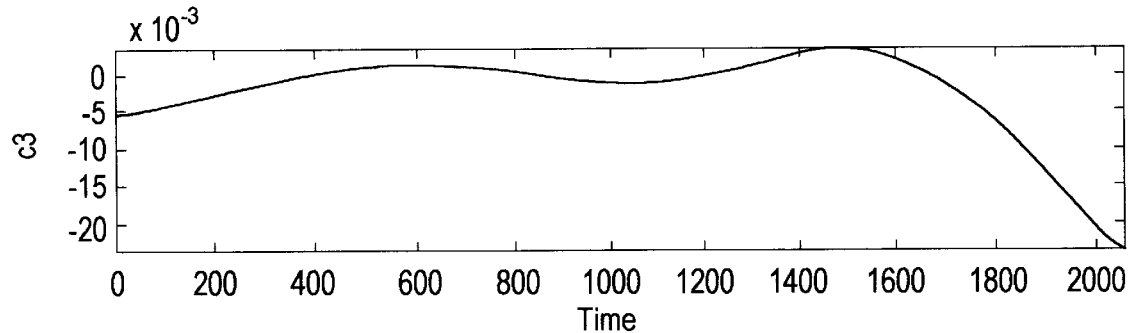

In contrast, the curvature extrema Sifting Process (with the optional intermittency test) is able to resolve both signals X1 and X2 by generating two meaningful IMF's c1 and c2 shown in FIGS. 6(a)–(b). A third IMF c3 is also generated but this is a residual error (FIG. 6(c)) that has such a small amplitude, on the order of $O(10^{-5})$, as to be negligible.

Before going further, a few words to differentiate the intermittency and curvature siftings are necessary. Both methods are designed to take certain anomalies out of the data. For intermittency sifting to work, the signals have to have waves in which the extrema will show up. In other words, the signal strength has to be strong. For curvature sifting to work, the signal strength does not have to be strong. Once the curvature computation reveals the hidden scales, as in FIGS. 4(d) and 4(e), the intermittency sifting may have to be invoked to separate this scale from that of the underlying longer waves. In summary, the intermittency and curvature are separate sifting options, which can be used separately or in conjunction to sort out signal anomalies.

Figure 7:
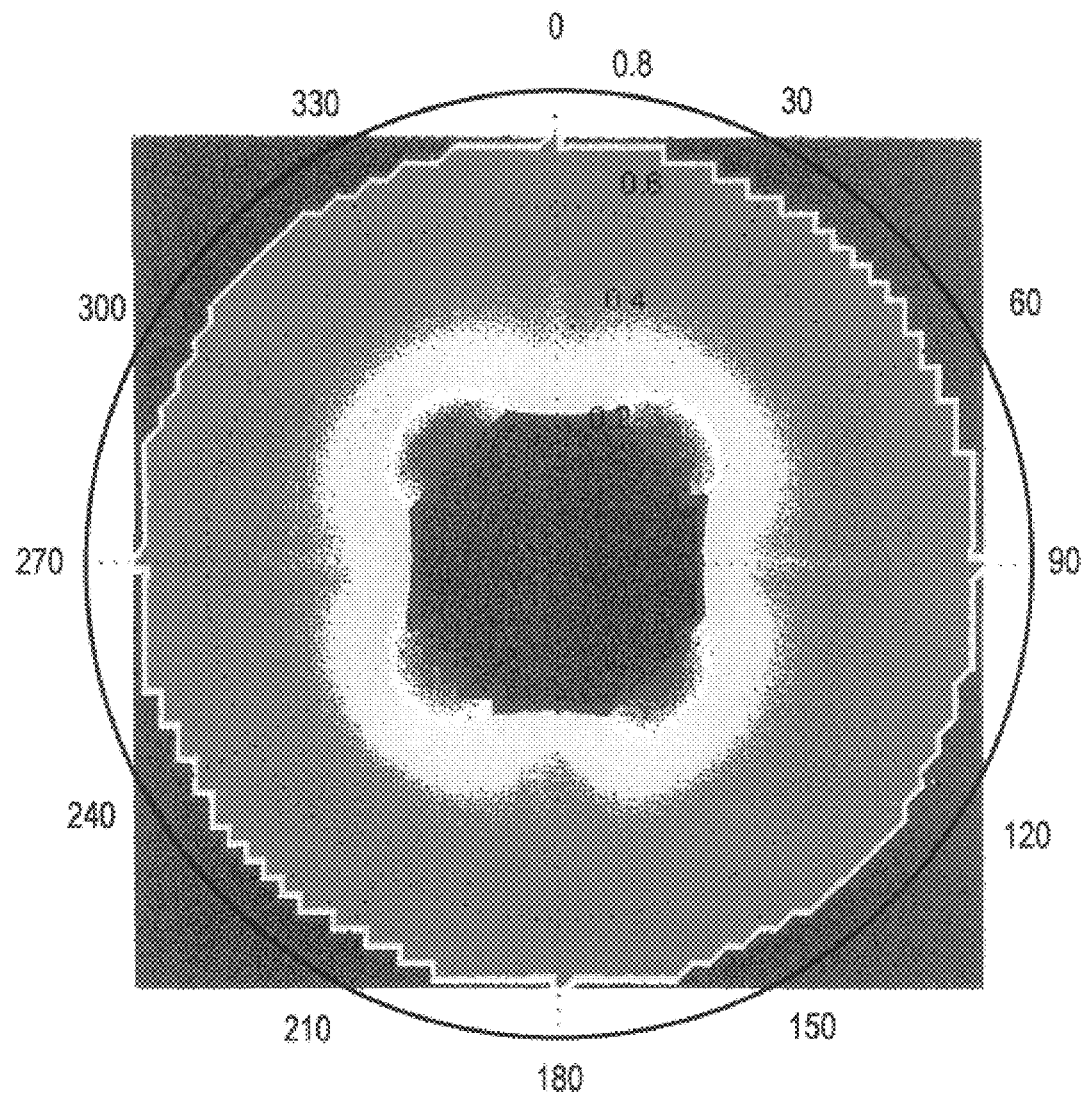
FIG. 7 illustrates an axial velocity field measured at eight different radii in the wake of a boded with a propeller for explaining the computer implemented Empirical Mode Decomposition method of the invention using curvature extrema.
Figure 8:
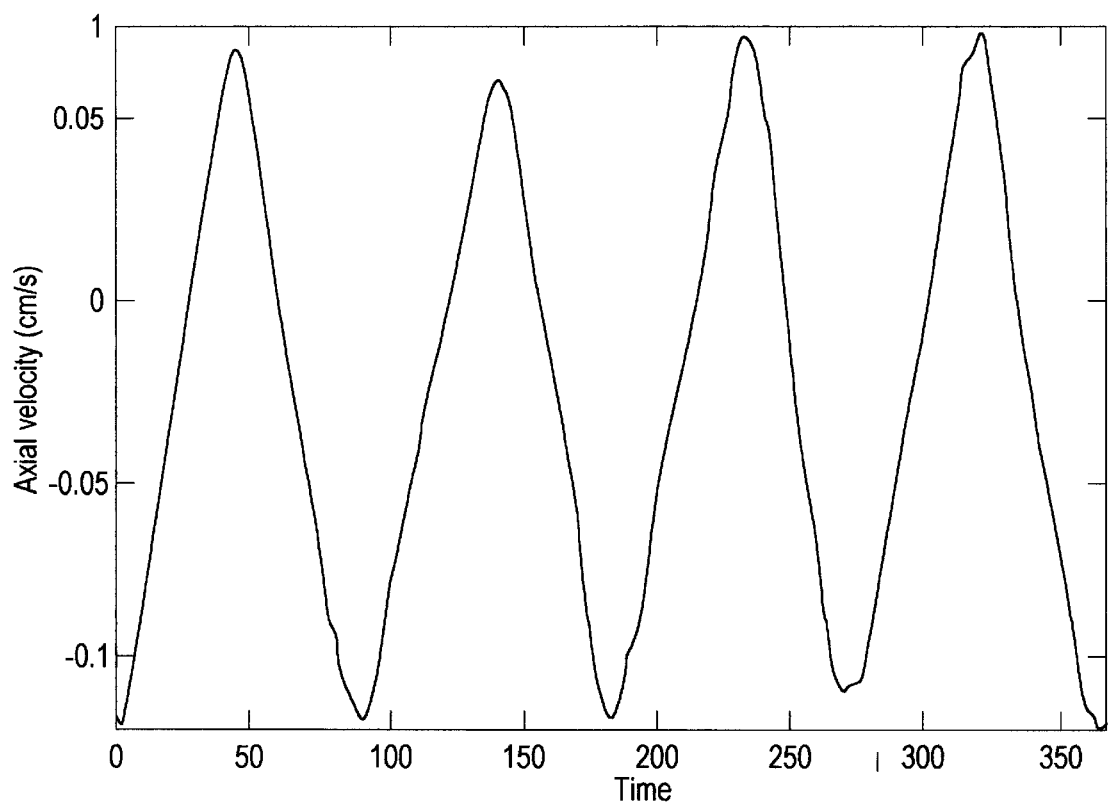
FIG. 8 illustrates a typical axial velocity measured at a fixed radius in the wake of a body with a propeller for explaining the computer implemented Empirical Mode Decomposition method of the invention using curvature extrema.
Figure 9A:
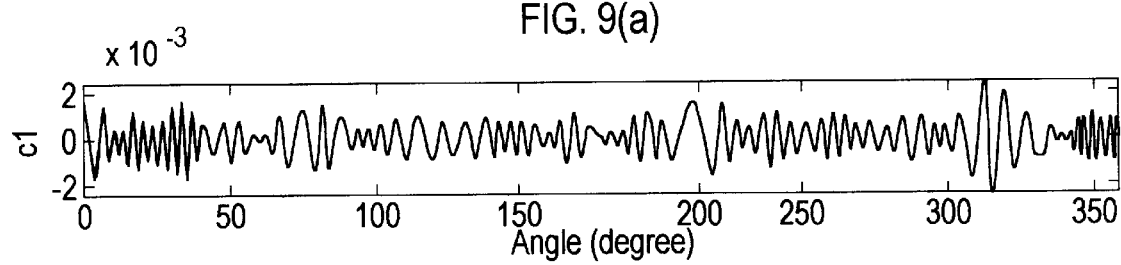
FIGS. 9(a)–(e) are graphs of the first, second, third, fourth and fifth intrinsic mode functions (c1, c2, c3, c4 and c5 respectively) when the local extrema Sifting Process is applied to the axial velocity signal FIG. 8.
Figure 9B:
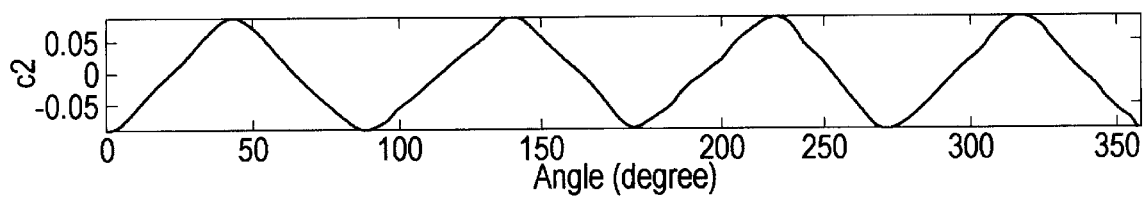
Figure 9C:
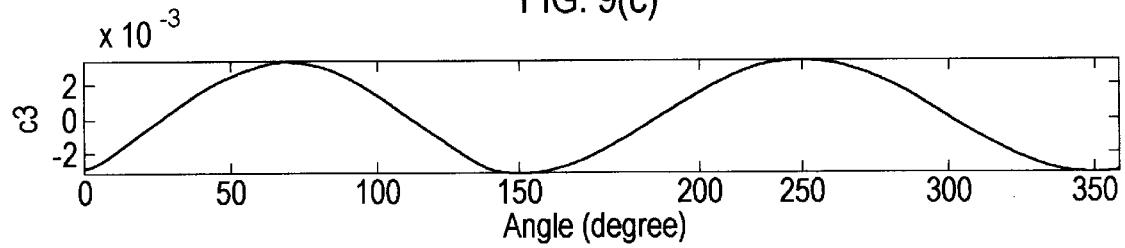
Figure 9D:
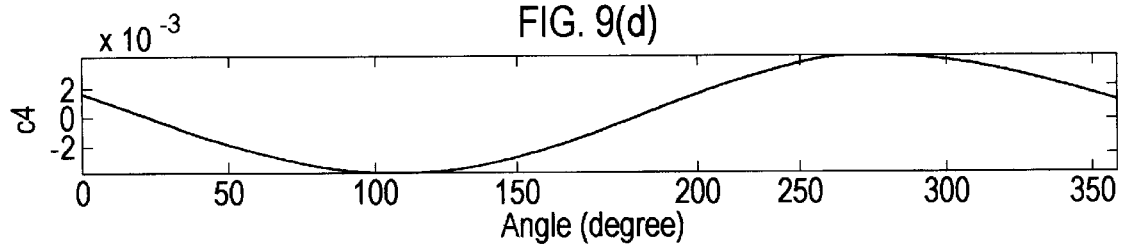
Figure 9E:
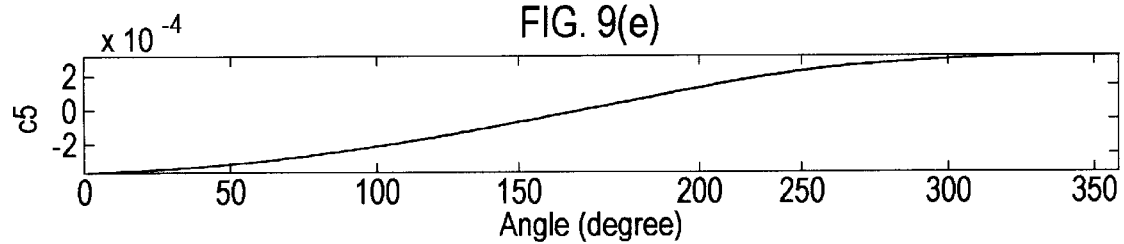
Figure 10A:
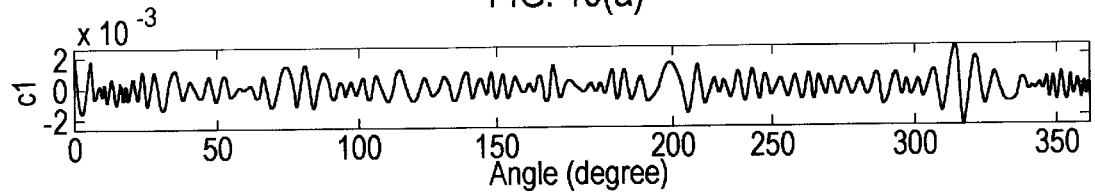
FIGS. 10(a)–(g) are graphs of the first, second, third, fourth, fifth, sixth and seventh intrinsic mode functions (c1, c2, c3, c4, c5, c6 and c7, respectively) when the curvature extrema Sifting Process is applied (with the intermittency test) to the axial velocity of FIG. 8(c) and illustrate the advantages of curvature extrema Sifting over local extrema Sifting Process.
Figure 10B:
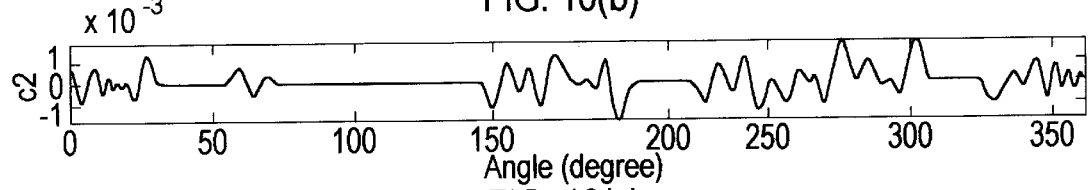
Figure 10C:
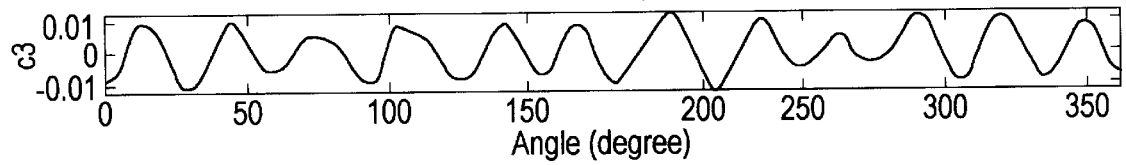
Figure 10D:
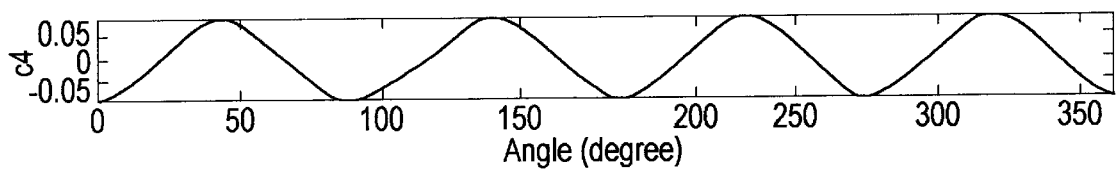
Figure 10E:
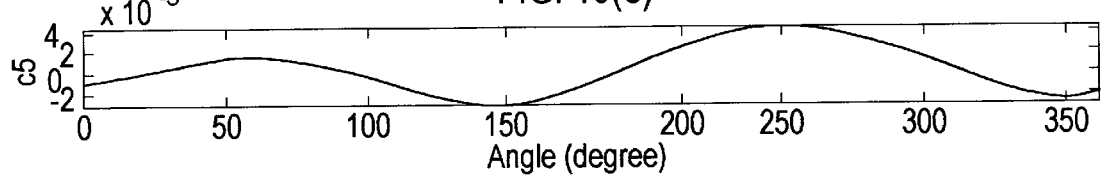
Figure 10F:
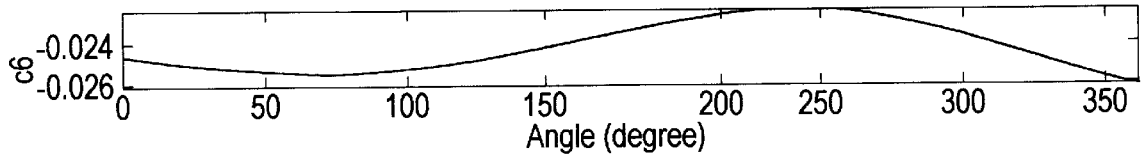
Figure 10G:
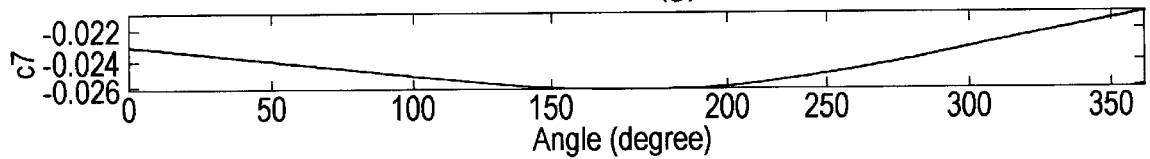

FIG. 7 provides a real fluid mechanics data set that further illustrates the advantages of the curvature extrema Sifting Process. The data set shown in FIG. 7 represents the axial velocity field in the wake of body with a propeller measured at eight different radii. The composite velocity field is shown in FIG. 7. FIG. 8 is a graph derived from FIG. 7 showing propeller axial velocity for a fixed radius against angle (degrees).

Applying the local extrema Sifting Process to the physical data set of FIG. 8 results in only five IMF's c1–c5 shown in FIGS. 9(a)–(e), respectively. The IMF component c2 clearly contains additional modes, as suggested by the visible variation of the data line. Since the sub-modes are all weak, it is impossible to extract them from the data by applying the local extrema Sifting Process.

In contrast, applying the curvature extrema Sifting Process to the physical data set of FIG. 8 results in seven IMF's c1–c7 shown in FIGS. 10(a)–(g). The low frequency components are about the same as those generated by the local extrema Sifting Process. The differences are the additional IMF's c2 and c3. One of the additional modes, c3, contains substantial amounts of energy. It contains 12 waves; therefore, it represents 12 modes. Furthermore, mode four is much cleaner in the curvature extrema Sifting (IMF c4 in FIG. 10(d)) than mode four in the local extrema Sifting Process (IMF c2 in FIG. 9(b)).

Figure 11A:
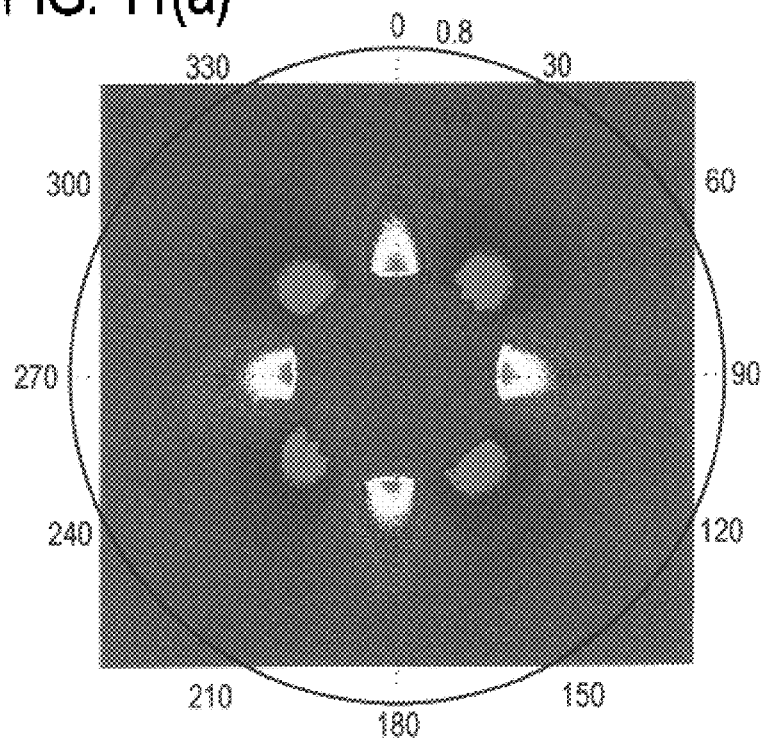
FIG. 11(a) is a reconstruction of the flow pattern generated from the first to fourth intrinsic mode functions produced by the local extrema Sifting Process.
Figure 11B:
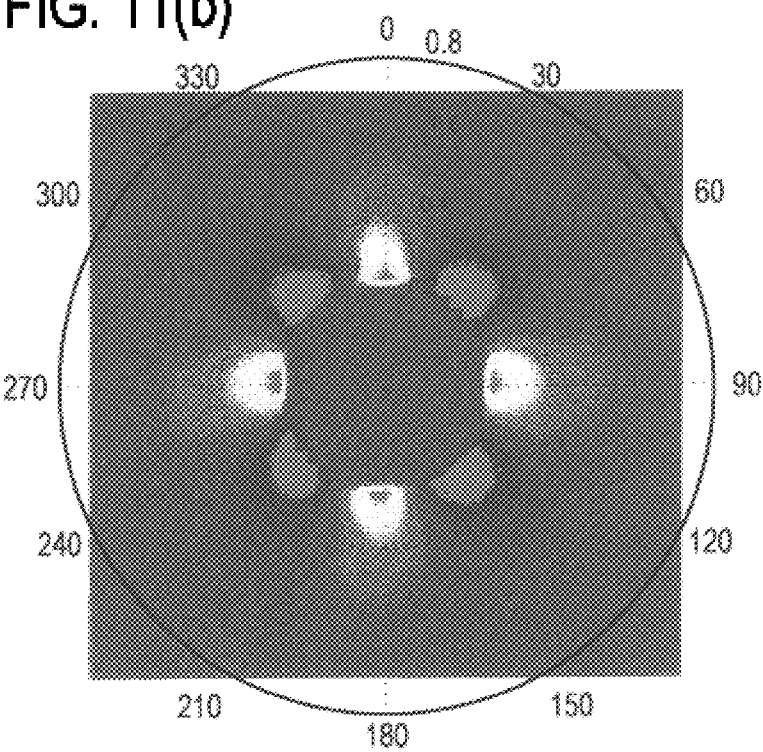
FIG. 11(b) is a reconstruction of the flow pattern from the first to fourth intrinsic mode functions from the curvature extrema Sifting Process.
Figure 12:
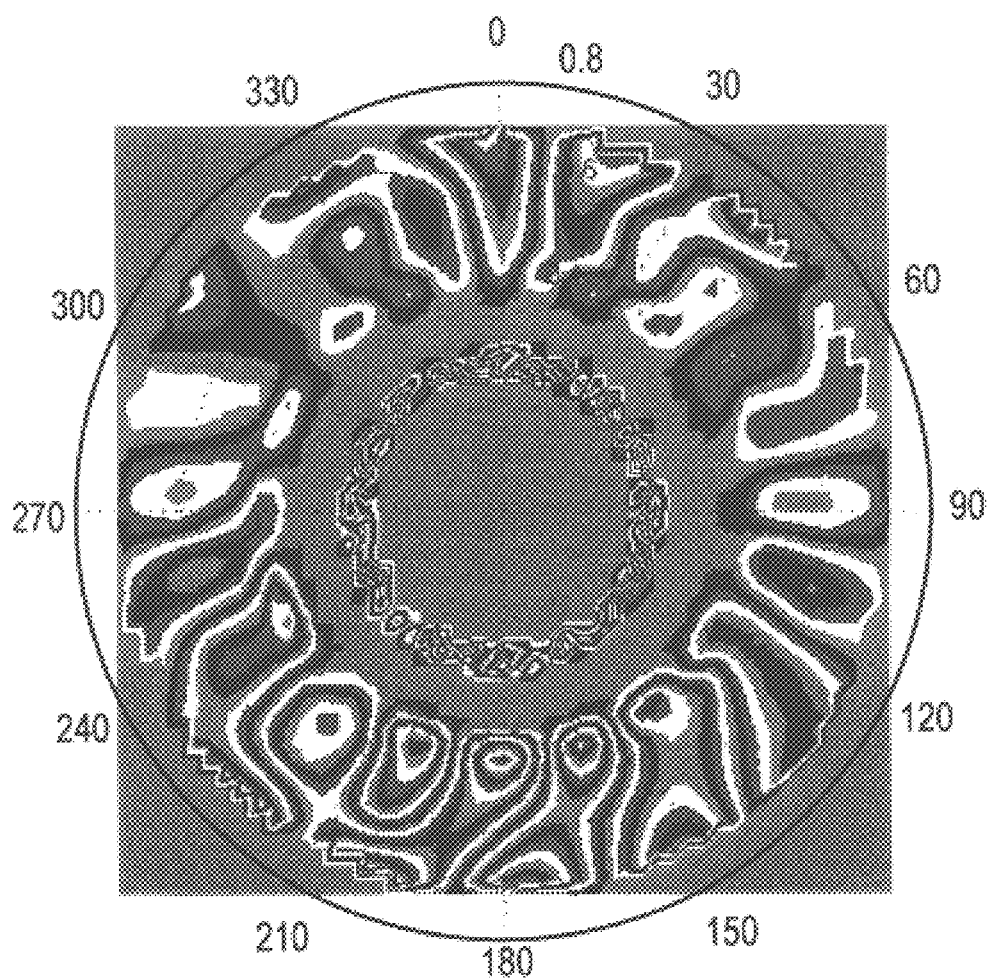
FIG. 12 is a reconstruction of the flow pattern generated from intrinsic mode functions produced by the curvature extrema Sifting Process.
Figure 13A:
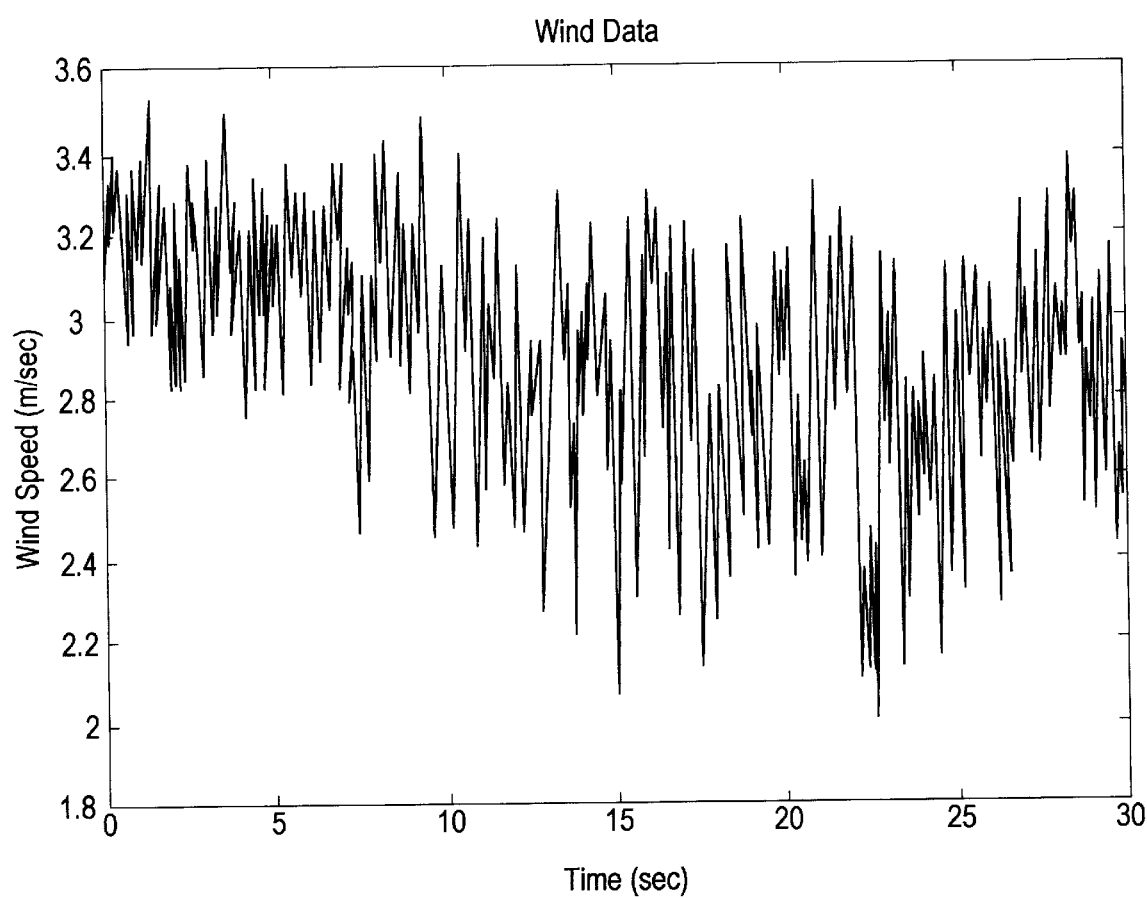
FIG. 13(a) is a graph of a wind speed signal which is for explaining the computer implemented Empirical Mode Decomposition method of the invention.
Figure 13B:
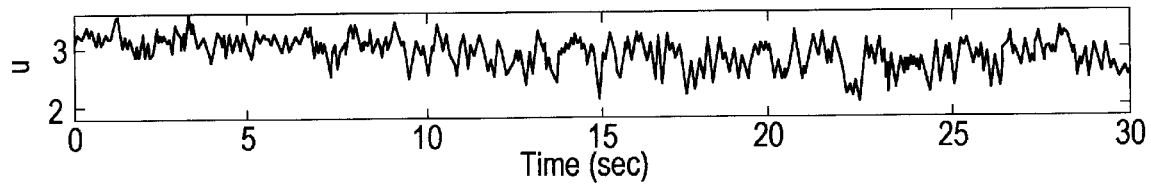
FIGS. 13(b)–(k) show the wind speed signal and the nine intrinsic mode functions which are extracted from the wind speed signal by the EMD method of the invention.
Figure 13C:
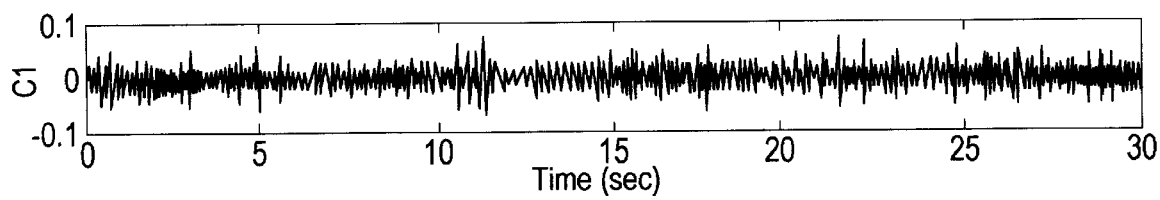
Figure 13D:
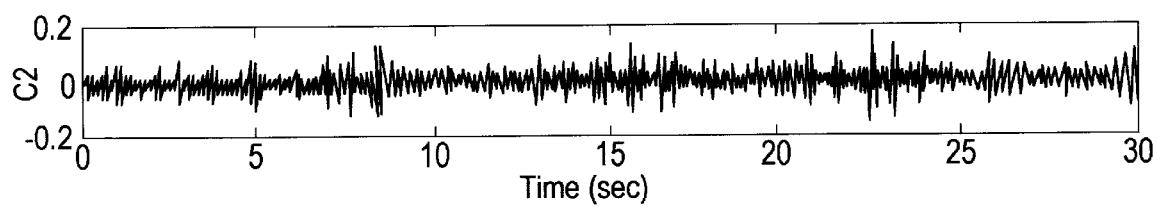
Figure 13E:
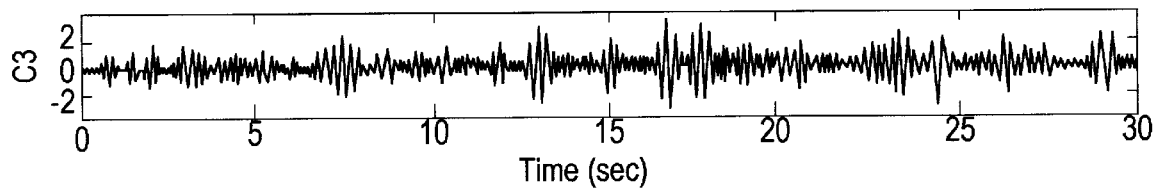
Figure 13F:
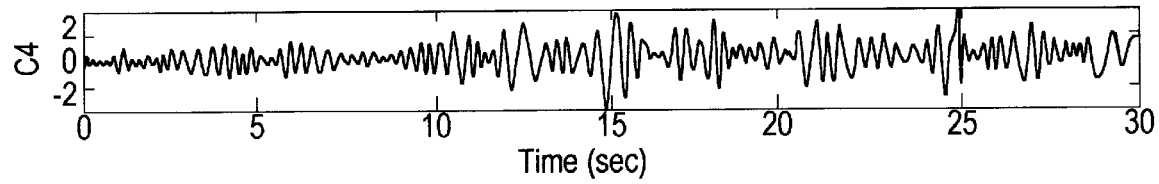
Figure 13G:
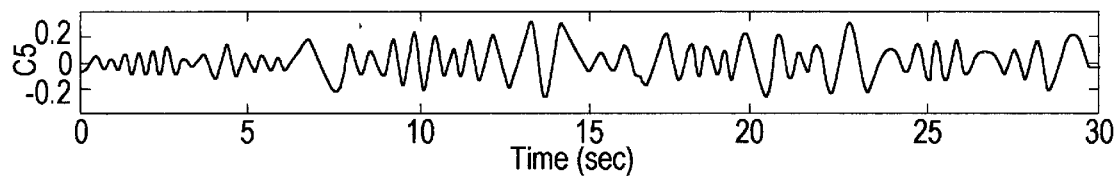
Figure 13H:
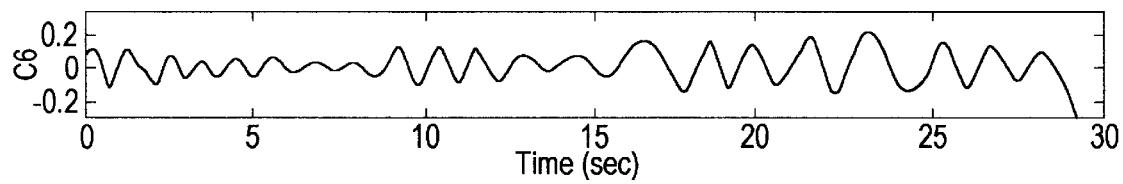
Figure 13I:
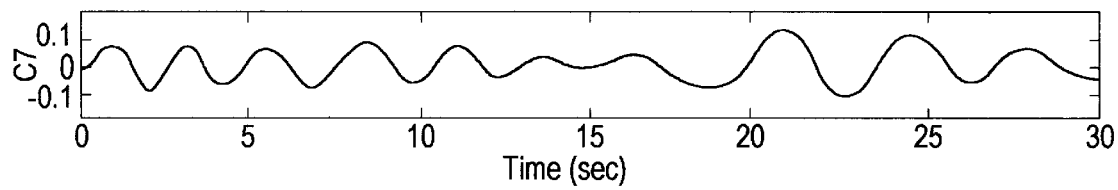
Figure 13J:
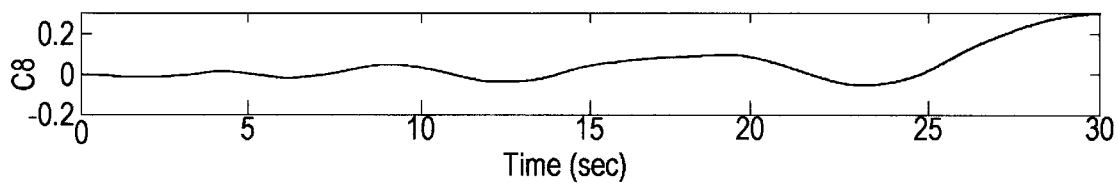
Figure 13K:
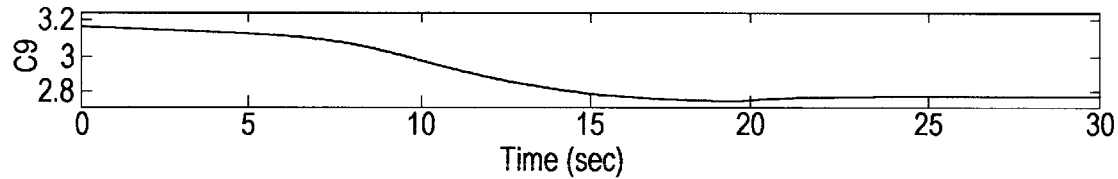

To further confirm the validity and accuracy of the curvature extrema Sifting Process, the flow pattern reconstructed from the fourth mode from both Sifting Processes (local extrema and curvature extrema) are shown in FIGS. 11(a)–(b), respectively. Overall, the reconstructions are very similar. On detailed examination, one can find the local extrema based sifting result in FIG. 11(a) is more irregular and asymmetric that the curvature extrema based sifting reconstruction shown in FIG. 11(b).

This indicates that the curvature extrema Sifting Process indeed can produce a clearer and purer mode than the local extrema Sifting Process. FIG. 10 illustrates the flow pattern of the additional 12 modes (c3 of the curvature extrema Sifting Process shown in FIG. 10(c)). Thus, the curvature extrema Sifting Process generates a more detailed result, in this and similar cases.

The above examples illustrate the value of the curvature extrema Sifting Process. In general, the intermittency test (steps 550–555) should be applied. Moreover, the curvature extrema Sifting Process usually generates more IMF's than the local extrema Sifting Process. Furthermore, the curvature extrema Sifting Process should be monitored carefully especially when the signal to noise ratio of the physical signal is low which could result in noise corruption and false readings.

As a general guide, the local extrema Sifting Process should be used first. If problems are detected in the results, the curvature extrema Sifting Process should be applied.

The Hilbert Spectrum

Having obtained the IMF's (through either the local extrema or curvature extrema Sifting Processes), the invention then applies the Hilbert Transform to each IMF to generate the Hilbert Spectrum. The Hilbert Spectrum permits one to analyze the IMF's in the frequency domain.

A brief tutorial on the Hilbert transform with emphasis on its physical interpretation can be found in Bendat and Piersol, 1986, *"Random Data: Analysis and Measurement Procedures"*, 2nd Ed., John Wiley & Sons, New York, N.Y.

Essentially, the Hilbert transform is the convolution of X(t) with 1/t. This convolution emphasizes the local properties of X(t). In more formal terms, given a time series X(t), the Hilbert Transform Y(t) can be expressed as $$Y(t) = \frac{1}{\pi} P \int_{-\infty}^{\infty} \frac{X(t')}{t - t'} dt' \tag{13}$$

where P indicates the Cauchy principal value.

With this definition, X(t) and Y(t) form a complex conjugate pair. This complex conjugate pair Z(t) may be expressed as:

$$Z(t) = X(t) + iY(t) = a(t)e^{i\theta(t)}, \tag{14}$$

in which $$a(t) = [X^2(t) + Y^2(t)]^{1/2}, \tag{15}$$

$$a(t) = [X^2(t) + Y^2(t)]^{\frac{1}{2}}, \tag{15}$$

$$\theta(t) = \arctan\frac{X(t)}{Y(t)} \tag{16}$$

After performing the Hilbert transform to each IMF component, we can express the time series data X(t) in the following form:

$$X(t) = \sum_{j=1}^{n} a_j(t) e^{i \int \omega_j(t) dt} \tag{17}$$

In Equation (17), the residue, $r_n$, is purposefully omitted, for it is either a monotonic function, or a constant. Although the Hilbert transform can treat the monotonic trend as part of a longer oscillation, the energy involved in the residual trend could be overpowering. In consideration of the uncertainty of the longer trend, and in the interest of information contained in the other low energy and higher frequency components, the final non-IMF component should be left out. It, however, could be included, if physical considerations justify its inclusion.

Note that Equation (17) gives both amplitude and frequency of each component as functions of time. It should be pointed out that no analytical method can generate the expression in Equation (17). Instead, all the components may be extracted only by a specially programmed computer applying the inventive Sifting Process and the Hilbert transform. The variable amplitude and frequency have not only greatly improved the efficiency of the expansion, but also enabled the expansion to accommodate nonstationary data. With IMF expansion, the amplitude and the frequency modulations are also clearly separated.

Equation (17) also enables the computer implemented method to represent the amplitude and frequency as functions of time in a three-dimensional plot, in which the amplitude can be contoured on the frequency-time plane. This frequency-time distribution of the amplitude is designated as the Hilbert Amplitude Spectrum, $H(\omega, t)$, or simply Hilbert Spectrum. Thus we have:

$$H(\omega, t) = \sum_{j=i}^{n} a_j(t) e^{i \int \omega_j(t) dt} \tag{18}$$

In which $H(\omega, t)$ is the Hilbert spectrum of the frequency ($\omega$) and time (t) and $a_j(t)$ is the j-th component of the IMF. In the presentation of the Hilbert Spectrum on a display, the amplitude (with or without smoothing) can be expressed in color maps, black-grey maps, or contour maps. Color maps, however, greatly increase the operator's ability to fully analyze the spectrum. In some cases, a color map will permit the operator to discern relationships and trends that would not be apparent in black-grey maps thereby making a color display a necessary component in some cases.

If amplitude squared is more desirable to represent energy density, then the squared values of amplitude can be substituted to produce a Hilbert Energy Spectrum just as well.

Figure 15A:
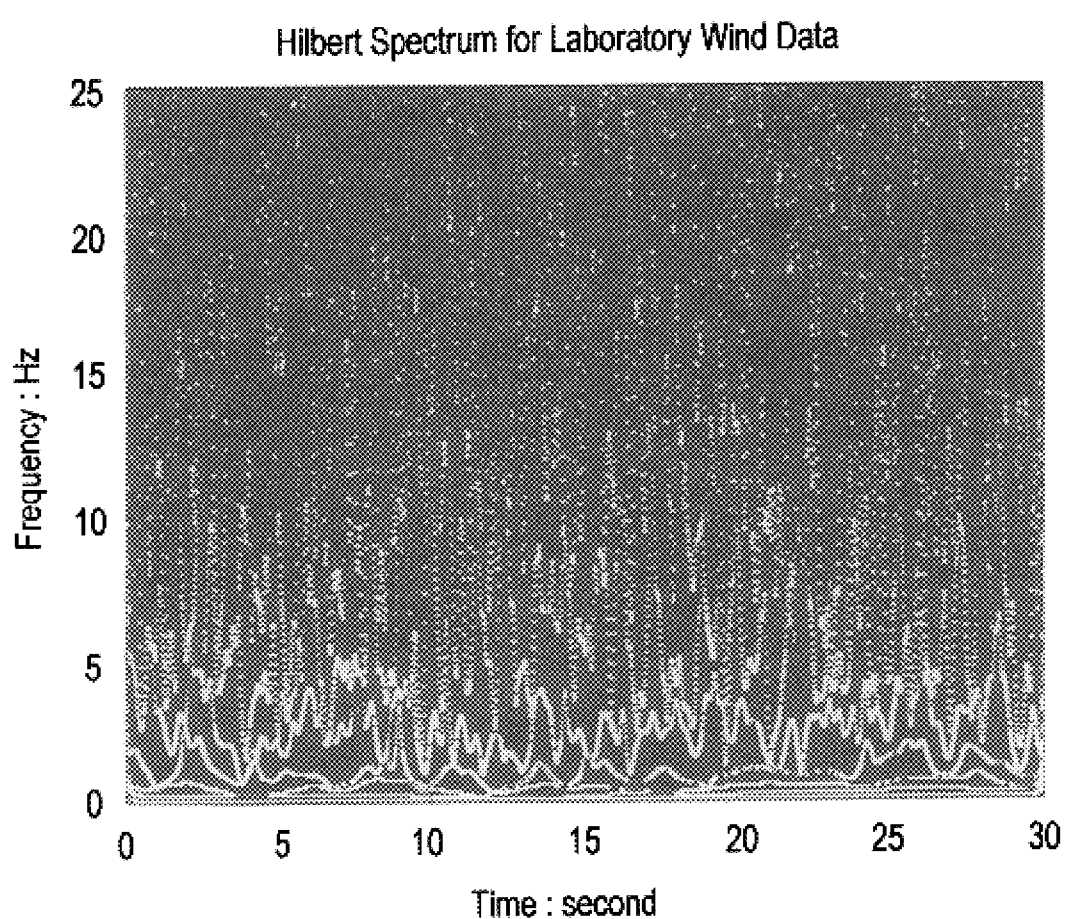
FIG. 15(a) is the Hilbert Spectrum generated by the invention from the wind speed data of FIG. 13(a)
Figure 15B:
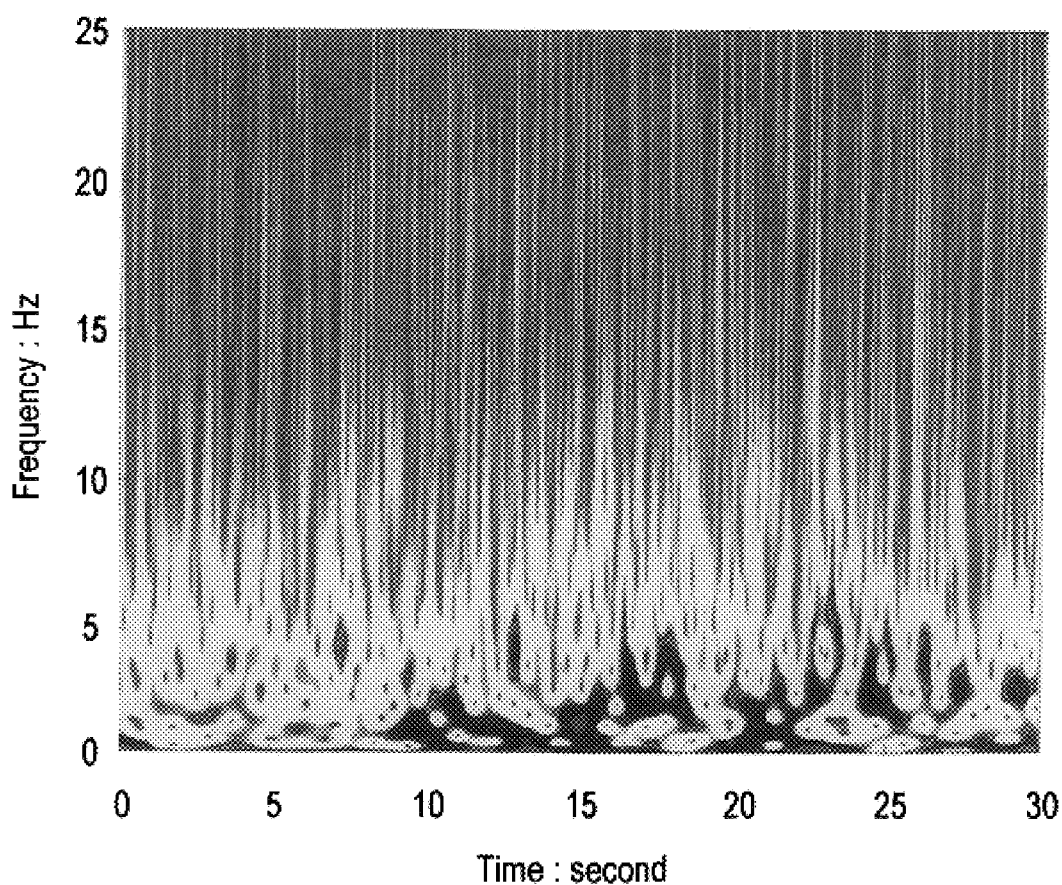
FIG. 15(b) is the conventional Morlet Wavelet spectrum generated from the wind speed data of FIG. 13(a)
Figure 15C:
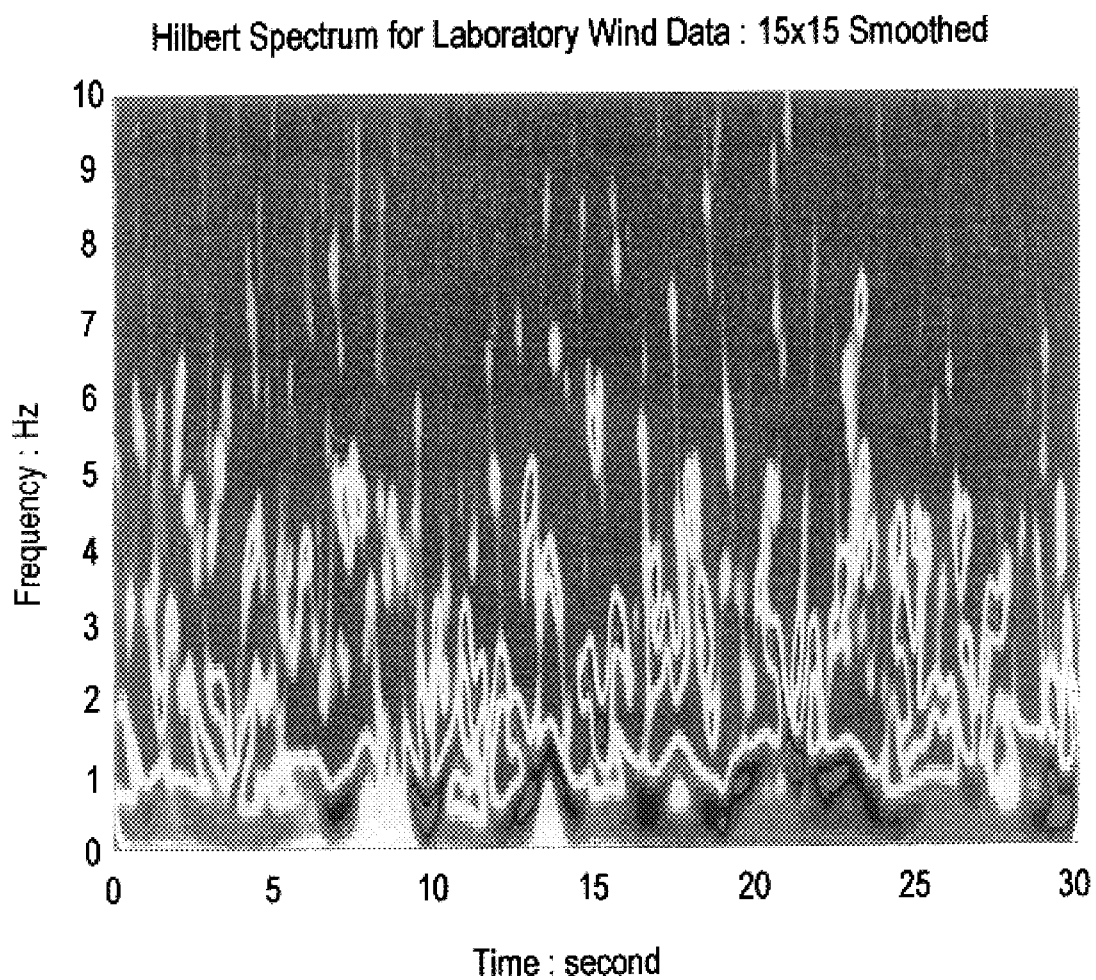
FIG. 15(c) shows the Hilbert Spectrum of FIG. 6(a) after smoothing by a 15×15 weighted Gaussian smoothing filter.

Various forms of Hilbert spectra presentations can be generated by the computer: both color coded maps and contour maps may be employed to present the Hilbert spectra with or without smoothing. The Hilbert Spectrum in the color map format for the wind data is shown in FIG. 15($a$). The Hilbert spectrum in FIG. 15($a$) gives a very different appearance when compared with the corresponding Wavelet spectrum shown in FIG. 15 ($b$). While the Hilbert Spectrum in FIG. 15($a$) appears only in the skeleton form with emphasis on the frequency variations of each IMF, the Wavelet analysis result gives a smoothed energy contour map with a rich distribution of higher harmonics that obscures the underlying physics.

If a more continuous form of the Hilbert Spectrum is preferred, a smoothing method can be optionally applied. The first type of a smoothing method which may be used in the invention is a weighted spatial filter which averages over a range of cells. For example, a known 15 by 15 weighted Gaussian filter may be employed to smooth this data. FIG. 15($c$) shows the result of applying the 15 by 15 weighted Gaussian filter.

Although smoothing degrades both frequency and time resolutions, the energy density and its trends of evolution as functions of frequency and time are easier to identify. In general, if more quantitative results are desired, the original skeleton presentation is better. If more qualitative results are desired, the smoothed presentation is better. As a guide, the first look of the data is better in the smoothed format.

The alternative of the spatial smoothing is to select a lower frequency resolution and leave the time axis undisturbed. The advantages of this approach are the preservation of events' locations and a more continuous frequency variation. Furthermore, a lower frequency resolution saves computation time for the computer implemented method.

To optimize such computation time, the optimal frequency resolution in the Hilbert spectrum can be computed as follows. Let the total data length be T, and the digitizing rate of the sensor be $\Delta t$. Then, the lowest frequency that can be extracted from the data is $1/T$ Hz, which is also the limit of frequency resolution for the data. The highest frequency that can be extracted from the data is $1/(n\Delta t)$ Hz, in which n represents the minimum number of $\Delta t$ needed to define the frequency accurately.

Because the Hilbert transform defines instantaneous frequency by differentiation, more data points are needed to define an oscillation. The absolute minimum number of data points is five for a whole sine wave. Although a whole sine wave is not needed to define its frequency, many points within any part of the wave are needed to find a stable derivative. Therefore, the maximum number of the frequency cells, N, of the Hilbert spectrum should be $$N = \frac{\frac{1}{n\Delta t}}{\frac{1}{T}} = \frac{T}{n\Delta t} \tag{19}$$

In order to make the derivative stable, the data is averaged over three adjacent cell values for the final presentation.

To illustrate, consider the wind data of FIG. 13($a$) which was digitized at a rate of 0.01 seconds and has a total length of 30 seconds. Therefore, the highest frequency that can be extracted is 25 Hz. The total cell size could be 600, but they have been averaged to 200 in FIG. 15($a$).

Two-Dimensional EMD

As mentioned above, to process two-dimensional signals the invention decomposes two-dimensional signals into a series of one-dimensional profiles in step 105 (FIG. 1($a$)). Formally speaking, a two-dimensional signal I(x,y) may be expressed as a collection of one dimensional profiles $P_i(y_i;x)$ for a fixed $y_i$ value. For a horizontally scanned image, the decomposition can be expressed as:

$$I(x, y) = \sum_{i=1}^{m} P_i(y_i; x) \tag{20}$$

Alternatively, for a vertically scanned image, the decomposition may be expressed as:

$$I(x, y) = \sum_{i=1}^{m} P_i(y; x_i) \tag{21}$$

in which $P_i(y;x_i)$ is the profile of the image for a fixed $x_i$ value. As mentioned above, the decomposition is not limited to the x or y directions and may be any arbitrary direction of mutually parallel lines traversing the two-dimensional signal.

If the local extrema Sifting Process is utilized in step 110, the invention then generates the first component signal $h_{i1}$ for the i-th profile signal in step 250 by subtracting the i-th envelope mean 40 from the i-th profile signal 10. This computer implemented step 250 may also be expressed as:

$$P_i(y_i;x) - m_{i1}(y_i;x) = h_{i1}(y_i;x) \tag{22}$$

Where the envelope mean of the i-th profile is $m_{i1}$ and the i-th profile is $P_i(y_i;x)$.

Ideally, the first component signal $h_{i1}$ should be an IMF, for the construction of $h_{i1}$ described above seems to have made $h_{i1}$ satisfy all the requirements of an IMF. In reality, however, the first component signal $h_{i1}$ is typically not an IMF. Therefore, the Sifting Process must be recursively applied until the j-th component signal of the i-th profile, $h_{ij}$, satisfies the test in step 260. When step 260 is satisfied, the component signal is an IMF as indicated by step 270.

If the test in step 260 is not satisfied, then step 265 is performed which treats the component signal as the profile in the next iteration. The next iteration is then performed by executing steps 200–240 (local extrema Sifting FIG. 1(b)) or by executing steps 500–570 (curvature extrema Sifting FIG. 1(d) and then step 250.

In step 250, the second component signal $h_{i11}$ of the i-th profile is generated by subtracting the i-th envelope mean from the i-th profile (in this iteration, the first component signal $h_{i1}$ is treated as the profile). In more formal terms:

$$h_{i1} - m_{i11} = h_{i11} \tag{23}$$

In general, for each of the i profiles, the Sifting Process is repeated at least 3 more times and, in general, k times to produce $h_{i1k}$. In formal terms:

$$h_{i1(k-1)} - m_{i1k} = h_{i1k} \tag{24}$$

If the test administered by step 260 is passed, then $h_{i1k}$ is an IMF. The resulting first IMF component of the i-th profile is ($c_{i1}$) of the i-th profile may be designated as such in step 270 and stored in step 275 in memory 415:

$$h_{i1k} = c_{i1} \tag{25}$$

As mentioned above, a stopping criterion is employed in step 260 to stop the generation of the next IMF component. Step 260 is a decision step that decides whether the stopping criteria has been satisfied.

The preferred stopping criteria determines whether the number of zero crossings is equal to the number of extrema and whether successive siftings do not produce additional numbers of extrema.

An alternative stopping criteria determines whether three successive component signals satisfy the definition of IMF. If three successive component signals all satisfy the definition of IMF, then the Sifting Process has arrived at an IMF for the current (i-th) profile and should be stopped by proceeding to step 270. If not, step 260 starts another iteration by proceeding to step 265 as described above.

Alternatively, another stopping criteria could be used in step 260 that determines whether successive component signals are substantially equal. If successive component signals are substantially equal, then the Sifting Process has arrived at an IMF and should be stopped by proceeding to step 270. If not, step 260 starts another iteration by proceeding to step 265 as described above.

Determining whether successive component signals are substantially equal in the alternative stopping criteria preferably limits the size of the standard deviation, sd, computed from the two consecutive sifting results as follows:

$$sd = \sum_{t=0}^{T} \left[ \frac{|(h_{i1(k-1)}(t) - h_{i1k}(t))|^2}{h_{i1(k-1)}^2(t)} \right] \tag{26}$$

A very rigorous and preferred value for sd is set between 0.2 and 0.3. Of course, if faster processing is desired, then a trade-off such as a less rigorous value for sd may be used.

Overall, the first IMF component $c_{i1}$ should contain the finest scale or the shortest period component of the i-th profile.

Before extracting the next IMF component, a test should be conducted to determine if the Sifting Process (local extrema or curvature extrema processes) should stop. The stopping criteria is shown in Step 300. Step 300 determines whether the component signal has more than 2 extrema. If yes, then additional IMF's may be extracted for the i-th profile by continuing the process in step 320. If not, all of the IMF's have been extracted for the i-th profile and the Sifting Process is stopped for the i-th profile by proceeding to step 305.

Step 270 recognizes that an IMF component has been successfully extracted by the Sifting Process by setting the component signal equal to an intrinsic mode function. More specifically, step 270 causes the computer 410 to store the component signal h1k as an intrinsic mode function in memory 415.

Then, the first IMF is separated from the i-th profile in step 290 to generate a residual signal ($r_{i1}$). In particular, a residual signal is generated by subtracting the intrinsic mode function from the profile. In formal terms:

$$P_i(y_i;x) - c_{i1}(y_i;x) = r_{i1}(y_i;x) \tag{27}$$

Because the residue, $r_{i1}$, of the i-th profile still includes information of longer period components, it is treated as the new i-th profile in the next iteration (i=i+1) and subjected to the same Sifting Process as the previous profile. Step 320 performs this function by treating the residual signal as the new i-th signal in the next iteration.

The Sifting Process is repeated for all the subsequent $r_j$'s of the i-th profile. This iterative procedure may be expressed as:

$$r_{i1} - c_{i2} = r_{i2}, \tag{28}$$

$$\ldots,$$

$$r_{in-1} - c_{in} = r_{in}.$$

Step 300 stops the Sifting Process for the current i-th profile by proceeding to step 305 if the residual signal $r_n$ has more than 2 extrema. Otherwise, the method proceeds to step 320.

Step 310 stops the local extrema Sifting Process for the i-th profile if the residual signal $r_{in}$ is monotonically increasing or decreasing. This stopping criterion is based on the fact that an IMF cannot be extracted from a monotonic function. If $r_{in}$ is not monotonically increasing/decreasing, then a next iteration for the i-th profile is performed beginning with step 320.

Even for data with zero mean, the final residue still can be different from zero. For data with a trend, the final residue should be that trend.

In summary, the Sifting Process extracts a series of intrinsic mode functions for each of the profiles $P_i(y_i;x)$ and a residue $r_{in}$ which may be expressed as:

$$P_i(y_i; x) = \sum_{j=1}^{n} c_{ij} + r_{ni} \tag{29}$$

In other words, the invention extracts a series of IMF's by sifting each of the profiles with a computer implemented Empirical Mode Decomposition method. This IMF series cannot be generated or derived by any analytic method. It can only be extracted by the invention through a specially programmed computer through the Sifting Process (local extrema or curvature extrema type).

This Sifting Process is then repeated for all of the profiles (see step 305 discussed above). The result is a collection of IMF's for all of the profiles. Collectively, the IMF components represent the intrinsic scales of the two-dimensional signal and may be expressed as:

$$I(x, y) = \sum_{i=1}^{m} \sum_{j=1}^{n} c_{ij}(y_i; x) \tag{30}$$

This expression is in the physical space, but it may be transformed into wave number space using the Hilbert Transform as discussed below.

In an alternative embodiment, the invention may extract the first IMF component(s) from all of the profiles instead of extracting all the IMF components for the i-th profile before proceeding to the next (i+1)-th profile. In this way, the highest frequency, shortest period IMF components may be extracted for all of the profiles that comprise the two-dimensional signal. This alternative is particularly useful when constructing a high pass filter according to the invention as further described below.

Analyzing IMF's from 2-D Signal

Having obtained the Intrinsic Mode Function components (through either the local extrema or curvature extrema Sifting Processes) for each of the profiles of the two-dimensional signal, the invention then proceeds to either analyze the IMF's in step 115 or manipulate the IMF's in step 150 (FIG. 1(*a*)).

Analyzing the IMF's may begin by proceeding to display IMF's step 140. As discussed above, the IMF's contain physically meaningful information that may be advantageously analyzed by displaying the IMF's on a conventional display device such as display 450 shown in FIG. 2. More particularly, the IMF's for each profiles may be individually displayed in step 140. Various other types of displays may be generated as further discussed below.

To analyze the IMF's in the frequency domain, the invention applies a Hilbert Transform in step 120. More particularly, the IMF's for each of the profiles are transformed by the Hilbert Transform in step 120. The Hilbert Transform and its application to one-dimensional data is described in detail above. Because the profiles are also one-dimensional data, the above description of the Hilbert Transform applies to the transformation of profiles. In this way, a Hilbert Spectrum is generated for each of the profiles.

When the Hilbert transform is applied to the profiles, the data may be expressed in the following form:

$$P_i(y_i; x) = \sum_{j=1}^{n} a_{ij}(y_i; x) e^{i\theta_{ij}(y_i; x)} \tag{31}$$

The Hilbert Spectra may be displayed in display step 145 by utilizing display 450. This display step shows the Hilbert Spectrum for each of the profiles as directed by the user and as further explained below in the Display of Selected Results section.

To transform the phase $\theta_{ij}(x)$ into wave number space $W_i(k)$, a Fourier transform is applied to any of the i components as follows:

$$W_i(k) = \int_{-\infty}^{\infty} a_{ij}(X) e^{i\theta_{ij}(x)} e^{-ik_{ij}x} dx \tag{32}$$

$$= \int_{-\infty}^{\infty} a_{ij}(y_i; x) e^{i(\theta_{ij}(x) - k_{ij}x)} dx \tag{33}$$

The maximum contribution to $W_i(k)$ is given by the wave number satisfying the following condition:

$$\frac{d}{dx}(\theta_{ij}(x) - k_{ij}x) = 0 \tag{34}$$

therefore, $$\frac{d\theta_{ij}(x)}{dx} = k_{ij}(x) \tag{35}$$

This provides a more accurate definition of the local wave number than the zero-crossing scale. Furthermore, it agrees with the definition of frequency for the classic wave theory.

In the above equations, the residue $r_{in}$ is purposefully omitted because it is either a monotonic function or a constant. Although the Hilbert Transform can treat the monotonic trend as part of a longer oscillation, the energy involved in the residual trend could be overpowering. In the interest of preserving the information contained in the other low energy, low frequency components, the final residue should be left out. However, the final residue could be included if physical considerations justify its inclusion.

The invention then proceeds to step 125 which collates the Hilbert Spectra for all of the profiles. Collation step 125 forms a four-dimensional function designated as the 2D Hilbert spectrum and expressed as:

$$H(x, y, k) = \sum_{i=1}^{m} \sum_{j=1}^{n} a_{ij}(y_i; x) e^{i \int k_{ij}(x) dx} \tag{36}$$

A surface of equal energy can then be found in the Hilbert Spectra for each profile. By selecting the axes as, for example, x,y for the horizontal plane and assigning k for the z-axis, then H is a value of the three variables of x,y,k at any point in the x-y-k space. By connecting the points of equal energy H for each profile, the invention forms an equal energy surface (isosurface) in step 130. The user can select the desired isosurface to be generated in step 130.

Then, the desired equal energy surface (isosurface) may be displayed in step 135.

Manipulating IMF's from 2-D Signals

Having obtained the IMF's for the profiles of the two-dimensional signal, the invention may then manipulate the IMF's as indicated by step 150 in FIG. 1(*a*).

One type of manipulation that may be performed by the invention is reconstitution of the original signal in step 155. Reconstitution of the original signal is performed by summing all of the component IMF's for each profile and then collating the summed IMF's. Much like the examples described above for one-dimensional signals, an accurate representation of the original two-dimensional may be created by reconstituting the original signal from the component IMF'S.

Another type of manipulation is filtering the two-dimensional signal as indicated by filter step 160. As set forth above, each IMF represents a separate mode, frequency or wave number of the original signal. By summing selected IMF's for each profile, a filtered version of the original two-dimensional signal may be created.

For example, low-pass filtering step 162 selects the last-generated IMF(s) for each profile. The last-generated IMF's refers to the fact that the invention first extracts the highest frequency IMF's from the signal and then progressively extracts lower frequency IMF's with each iteration of the recursive Sifting Process. Thus, one or more of the last-generated or lowest-frequency IMF's of each profile are selected by low-pass filtering step 162 and then summed. The summed IMF's are then collated to generate a low-pass filtered version of the original signal. In other words, the lowest frequency IMF's for a given profile are summed to generate a low-pass filtered IMF for that profile. This summing process is repeated for the other profiles and the results collated to form the low-pass filtered two-dimensional signal.

High-pass filtering step 166 selects the first-generated IMF(s) for each profile. More particularly, one or more of the first generated, highest frequency IMF(s) of each profile are selected by high-pass filtering step 166, summed, and then collated to generate a high-pass filtered version of the original signal. In other words, the highest frequency IMF's for a given profile are summed to generate a high-pass filtered IMF for that profile. This summing process is repeated for the other profiles and the results collated to form the high-pass filtered two-dimensional signal.

Furthermore, band-pass filtering step 164 may also be employed to generated a band-pass filtered two-dimensional signal. The user can select which IMF(s) should be utilized to generate the band-pass filtered signal. Furthermore, this selection is not limited to the middle-range of IMF's and may include a variety of IMF selections that result in a comb filter, notch filter, band stop filter, etc.

The filtered, two-dimensional signal(s) may also be displayed as indicated by step 180 on FIG. 1(*a*).

Other manipulations include adding, subtracting, and multiplying selected IMF's. For example, selected IMFs may be added together or subtracted from one another to product a manipulated display (step 180) after combining the selected, manipulated IMFs (step 175).

Furthermore, selected IMFs may be multiplied by a scale factor in step 170. Such scaling of selected IMFs may also be used in conjunction with adding IMFs. In this way, selected IMFs can be emphasized or deemphasized when combined with other selected IMFs. The results can then be displayed in step 180.

Illustrations of 2D Signal Processing

To illustrate 2D signal processing, a water surface wave pattern shown in FIG. 16 was processed by the invention. This water surface wave pattern image was obtained (step 100) with a two-dimensional slope gauge and shows a wave front that includes many short waves sw in front of a large wave lw and a gradual transition to the next wave nw.

A two-dimensional slope gauge is an apparatus that includes a light table with gradually varying brightness light source shining from the bottom of the table. When water waves propagate over this light pattern, the light will be refracted according to Snell's law. At the surface, the light will be refracted according to the slope of the free water surface. As the degree of refraction is proportional to the slope of the surface, the pattern and intensity of the brightness changes will be proportional to the slope variations. A CCD camera then images this light pattern. In this way, it is possible to obtain a measurement of the slope.

The water surface wave pattern image shown in FIG. 16 was then decomposed into 480 scanning lines (profiles) by step 105. Then, a local extrema Sifting Process was applied to the profiles in step 110 to extract the IMF's of each profile.

With the IMF's, a variety of analyzing and manipulating may be performed. For example, FIG. 17 shows the result of high pass filtering the water surface wave pattern according to the invention. More particularly, steps 150, 160, 166 and 180 were executed to generate the high pass filtered water surface wave pattern shown in FIG. 17. This high pass filtered water surface wave pattern is the result of summing the first two IMF's of each profile and then collating the summed IMF's.

Because the first two IMF's contain the highest wave number or highest frequency components of the water surface wave pattern, the high pass filtered version of this pattern shown in FIG. 17 depicts the finest scale (highest frequency) phenomena in the original water surface wave pattern. Indeed, a visual inspection of FIG. 17 reveals only the high frequency waves.

The wave patterns of FIG. 17 reveal a more detailed pattern than the original unprocessed image shown in FIG. 16: there are two sets of crossing patterns cp in the high pass filtered image (FIG. 17) which are not clearly visible in the original image (FIG. 16). Such a crossing pattern cp has long been suspected by researchers to exist according to the wind-wave interaction theory, but never before has such a clear image been obtained that demonstrates the existence of such patterns.

This pattern can be further revealed by employing a different filter according to the invention. For example, FIG. 18 illustrates a band pass filtered version of the water surface wave pattern shown in FIG. 16. FIG. 18 is the result of summing the first two (highest wave number components) and last two (lowest wave number components) IMF's of each profile and then collating the summed IMF's.

Comparing FIGS. 17 and 18 shows that the band pass filtered image with the high and low wave number components gives an even clearer pattern of the small waves sw and their locations relative to the underlying large wave structure lw. From FIG. 18 one can observe two types of crossing wave in the data cw1 and cw2. These crossing waves cw1 and cw2 are hardly visible in the original data of FIG. 16.

As explained in detail above, the 2D Hilbert Spectral Analysis can also be performed by the invention. FIGS. 19(*a*)–(*c*) illustrates the 2D Hilbert Spectra of the water surface wave pattern of FIG. 16. By extracting the IMF's of each profile (step 110), Hilbert transforming the IMF's (step 120) and then collating the transformed results (step 125) a three dimensional body with density variations results. Because this four dimensional result cannot be displayed on a conventional display, equal energy surfaces must be formed (step 130). These three dimensional equal energy surfaces may then be displayed (step 135).

In FIGS. 19(*a*)–(*c*), the horizontal plane is the physical x-y plane; the vertical axis indicates the wave number scale; and the isosurface indicates the energy density. FIGS. 19(*a*)–(*c*) show the isosurfaces at 11%, 6%, and 3% of the highest energy density point.

Figure 20:
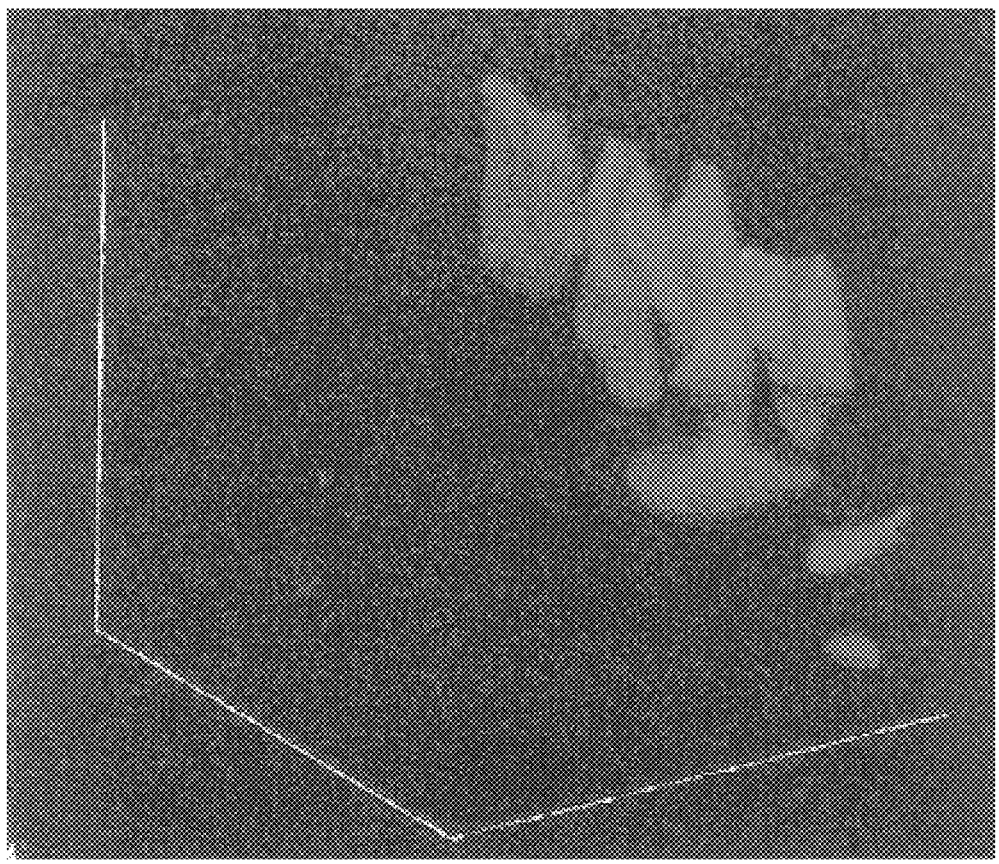
FIG. 20 shows a standard Morlet wavelet analysis of the water surface wave pattern.

To demonstrate the advantages of the invention over conventional techniques, the water surface wave pattern of FIG. 16 was processed with a conventional Morlet wavelet analysis technique. The result is shown in FIG. 20 which shows the 11% isosurface. Comparing the 11% isosurface generated by the Morlet wavelet analysis (FIG. 20) with the 11% isosurface generated by the invention (FIG. 19(a)) reveals that the wavelet result is corrupted by high frequency harmonics that are now present in the inventive result. Furthermore, the wavelet result fails to capture the higher energy near the initial line along the y axis.

Figure 21:
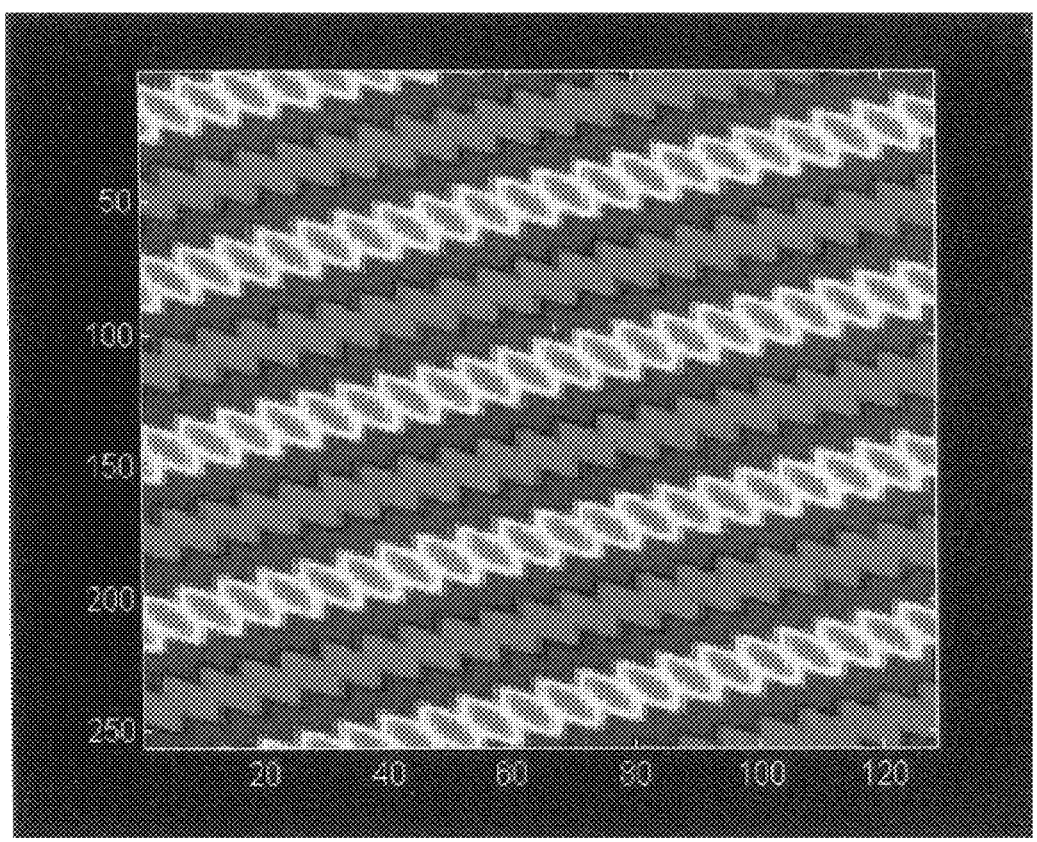
FIG. 21 is a two-dimensional signal created by two crossing sine waves having different wave numbers and directions.
Figure 22:
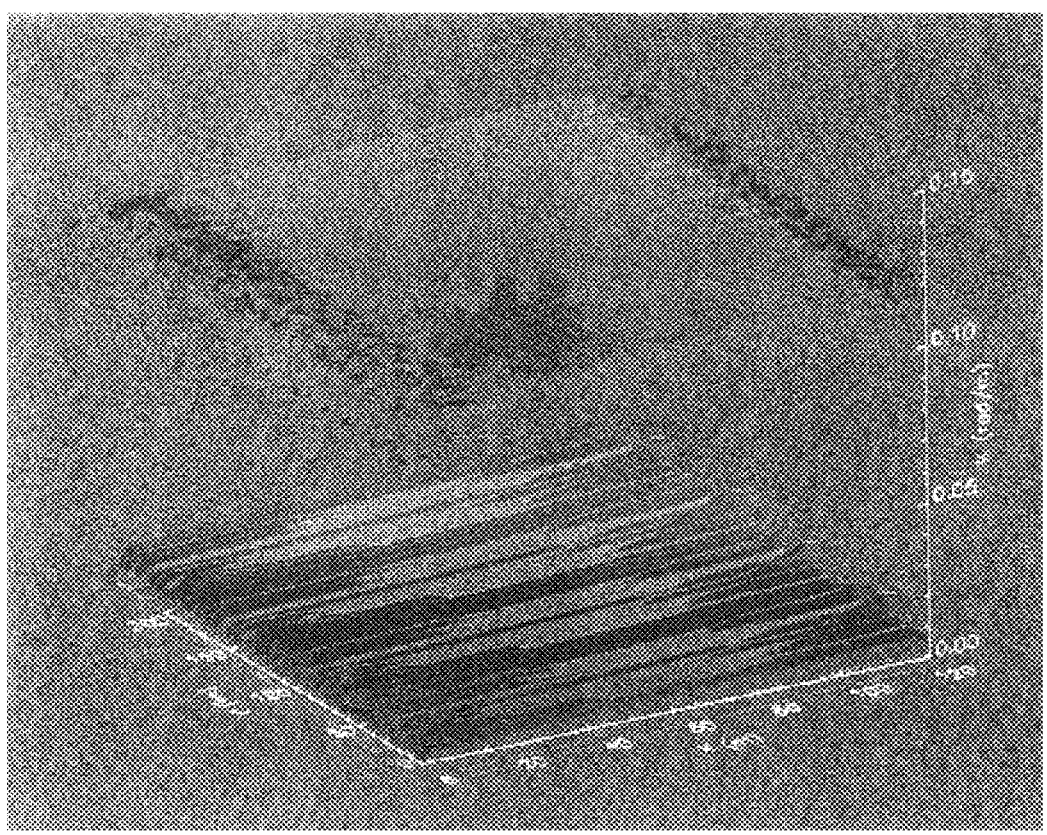
FIG. 22 is the EMD Hilbert Spectrum of the two crossing sine waves of FIG. 21.

To further demonstrate the advantages of the invention, the image shown in FIG. 21 was processed. FIG. 21 illustrates the two-dimensional pattern generated by two sine waves having different wave numbers and propagating in different directions. FIG. 22 shows the 2D Hilbert Spectrum generated by the invention from the wave pattern of FIG. 21. In FIG. 22 two thin layers indicate the different wave numbers of the two sine waves. The thinness of the layers further indicates that the wave number of each sine wave is constant.

Figure 23:
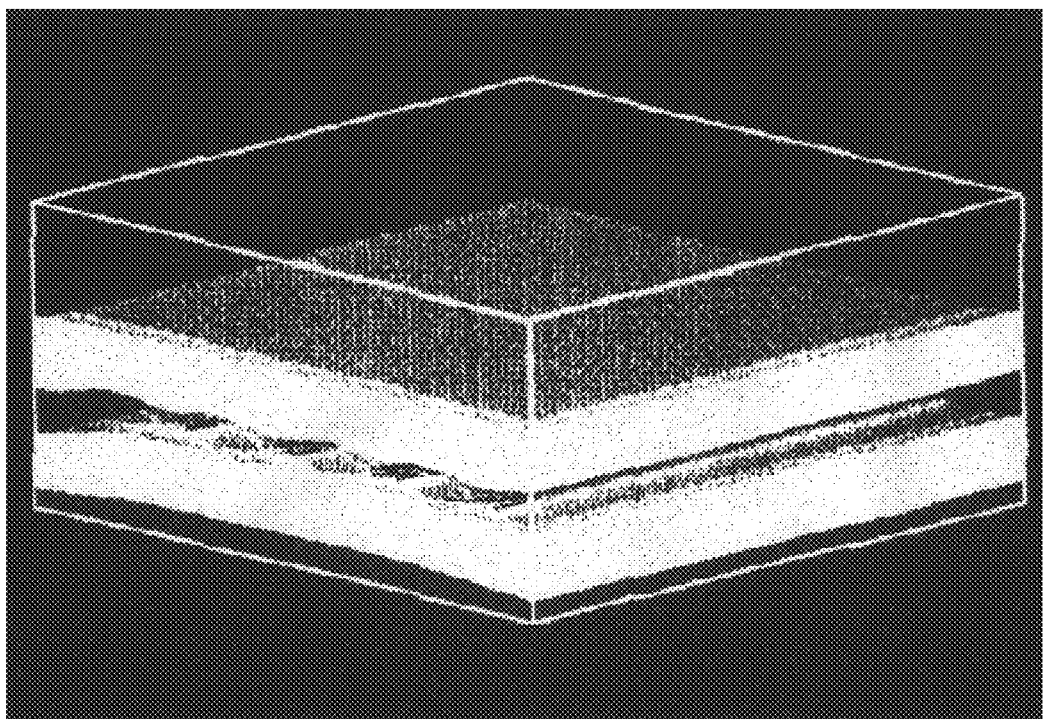
FIG. 23 is the standard Morlet wavelet analysis of the two crossing sine waves of FIG. 21.

FIG. 23 illustrates the conventional Wavelet processing of the two sine waves shown in FIG. 21. The wavelet result has two thick slabs corresponding to the frequency domain of the two sine waves. The thickness of these slabs indicates the poor frequency resolving power of the conventional wavelet techniques. Comparing the inventive results of FIG. 22 with the conventional results of FIG. 23 further illustrates the excellent frequency resolving power of the invention.

Figure 24:
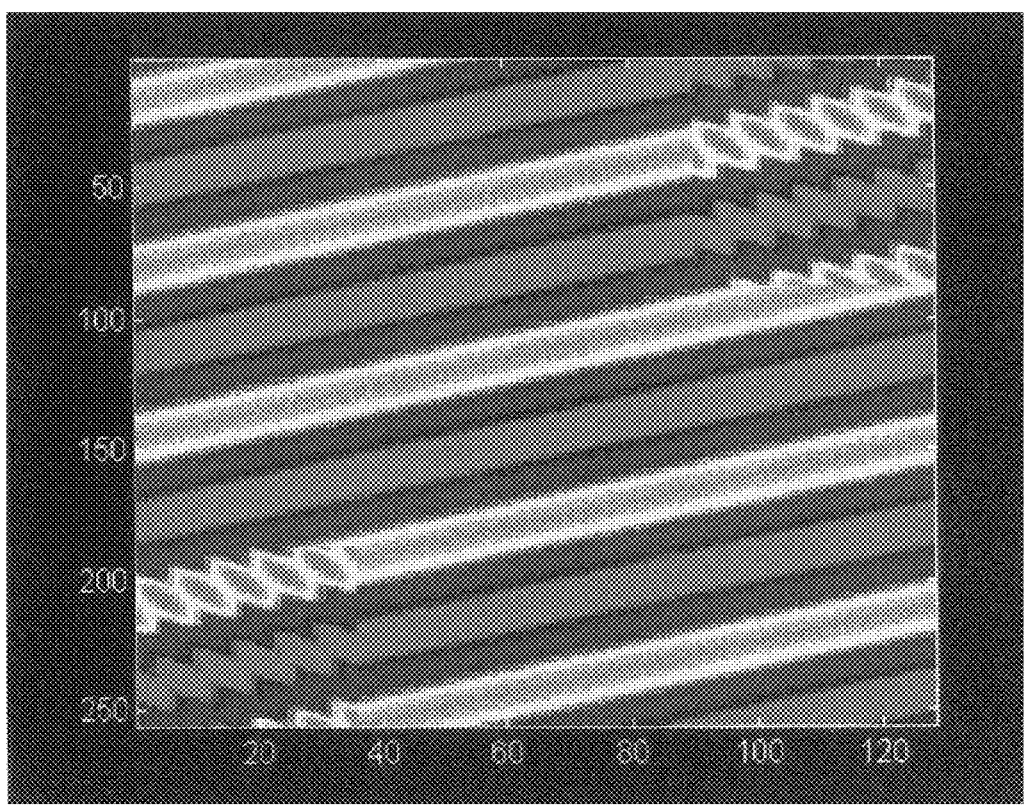
FIG. 24 is a two-dimensional signal having an abrupt change in wave number created by the super-position of a high-frequency, small-amplitude wave onto a low-frequency, large-amplitude wave.
Figure 25:
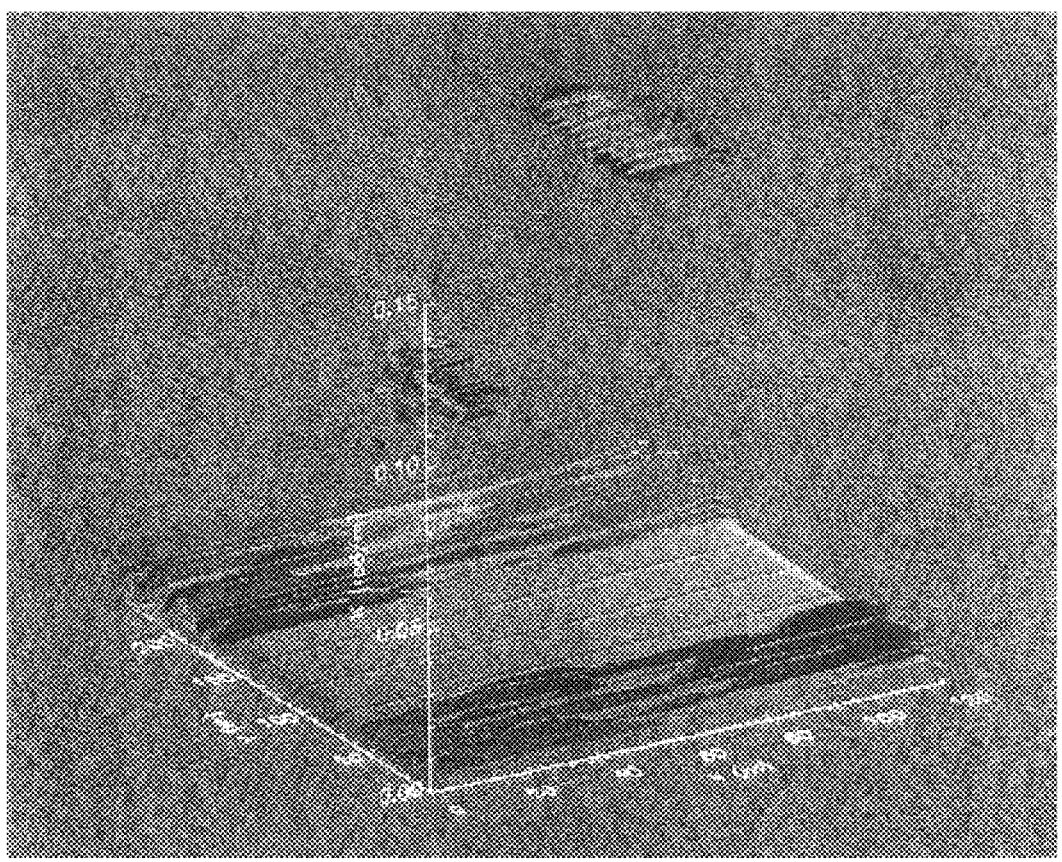
FIG. 25 is the EMD Hilbert Spectrum of the two-dimensional signal of FIG. 24.

FIGS. 24–25 further illustrate the advantages of the invention. FIG. 24 shows an abrupt change in wave number created by the super position of a high-frequency, small-amplitude wave onto a low-frequency, large-amplitude wave. FIG. 25 shows the 2D Hilbert Spectrum generated by the invention from the wave pattern image of FIG. 24. As shown in FIG. 25, the 2D Hilbert Spectrum provides a clear separation of the waves in the wave number space.

Because of the sudden change in wave number, the conventional wavelet result of the wave pattern image of FIG. 24 will only show the singularity properties at the boundaries along the changing wave numbers. The inventive methods, however, provide physically meaningful results (shown in FIG. 25) that avoid the singularity.

Figure 26:
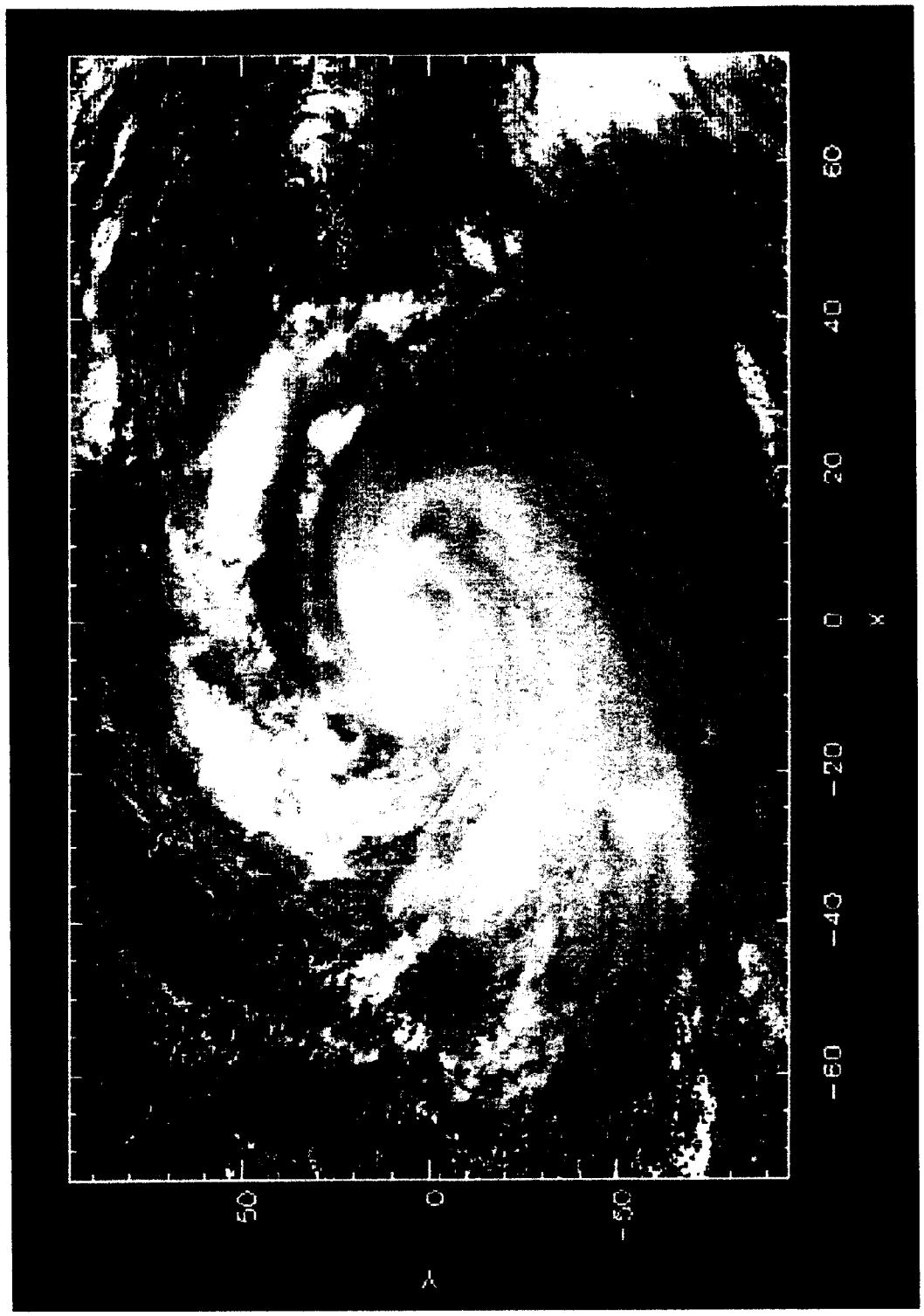
FIG. 26 is a two-dimensional infrared satellite image of Hurricane Gilbert.
Figure 27:
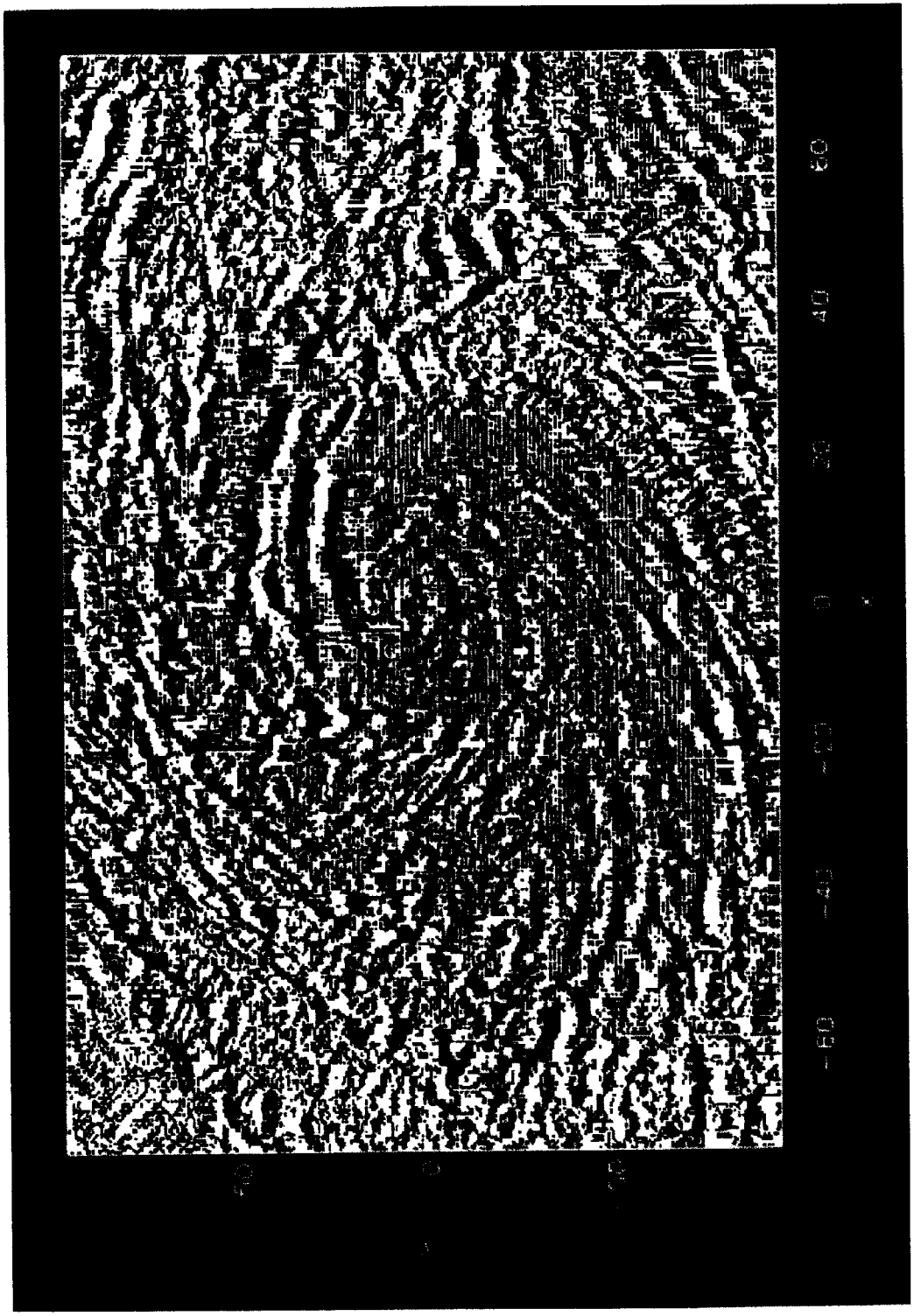
FIG. 27 is a high pass filtered version of Hurricane Gilbert created by the invention from the three highest frequency IMF's.

Final illustrations of the invention are provided in FIGS. 26–27. FIG. 26 is a satellite image of Hurricane Gilbert. Although the satellite image shows many details of the hurricane cloud formation, the contrast is not high enough to clearly define the detailed cloud swirl streaks.

To better analyze the Hurricane Gilbert image of FIG. 26, the inventive methods were applied. Particularly, the image was high pass filtered by summing the first three IMF components of each profile and then collating the summed IMF's. The result of such high pass filtering is shown in FIG. 27 in which the cloud swirl streak details are much clearer than the original image. The inventive band pass filtering result (the first three and last two IMF components) is shown in FIG. 28 and provides higher contrast and greater detail than the original image.

Display of Selected Results

The invention displays various results of the above-described computer implemented method in steps 140, 145, etc. These displays are extremely useful in analyzing the underlying physics of the physical phenomenon being studied as described above. Furthermore, particular examples of these displays and the increased understanding of the underlying physics which these displays permit are discussed in the following section.

For example, the invention generates various Hilbert spectra displays in the display step 145. As mentioned above, both color coded maps and contour maps may be employed to display the Hilbert spectra. In addition, the color coded maps convey information to the operator in a uniquely accessible way permitting a more thorough and deeper understanding of the physical phenomenon and may be considered as necessary to analyze some physical phenomena.

The displays generated by the invention in the various display steps are central to the invention because they allow an operator to analyze the underlying physics of the physical phenomenon being studied.

The display steps, such as display step 145, output displays to display 450. As mentioned above, display 450 includes devices such as a cathode ray tube and a flat panel display. As an alternative, display step 145 may generate a hard copy output by utilizing printer 460 or may send the generated display to output device 470.

Computer for Implementing Inventive Method

Figure 2:
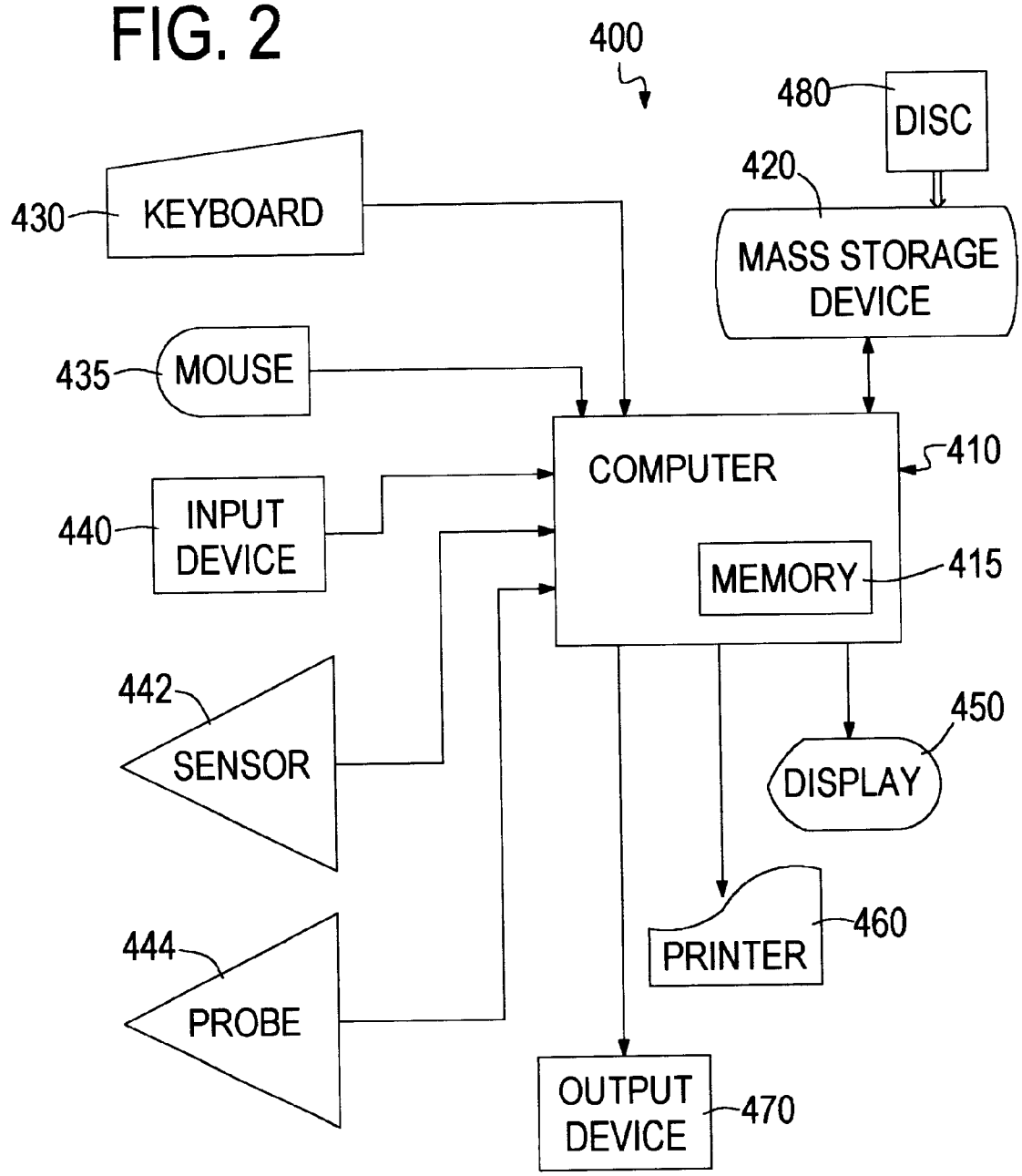
FIG. 2 is a high-level block diagram of a computer system which may be programmed with the inventive methods to create a special purpose machine.

A computer suitable for programming with the inventive method is diagrammatically shown in the block diagram of FIG. 2. The computer 410 is preferably part of a computer system 400. To allow human interaction with the computer 410, the computer system includes a keyboard 430 and mouse 435. The computer programmed with the inventive method is analogous to a mechanical sieve: it separates digital data into series of IMF's according to their time scales in a manner analogous to a mechanical sieve which separates aggregated sand according to their physical size.

Because the invention is applied to analyze physical signals, the computer system 400 also includes an input device 440 such as a digital camera, sensor 442 and/or probe 444 which are used to sample a physical phenomenon and generate a two-dimensional physical signal representative thereof.

To output the results of the computer implemented method, the computer system 400 also includes a display 450 such as a cathode ray tube or flat panel display, printer 460 and output device 470. Each of these outputs (450, 460, 470) should have the capability to generate color outputs because, for example, the Hilbert Spectrum may be in color.

Furthermore, the computer system 400 also includes a mass storage device 420. The mass storage device 420 may be a hard disk, floppy disc, optical disc, etc. The mass storage device 420 may be used to store a computer program which performs the invention when loaded into the computer 410. As an alternative, the input device 440 may be a network connection or off-line storage which supplies the computer program to the computer 410.

More particularly, the computer program embodiment of the invention may be loaded from the mass storage device 420 into the internal memory 415 of the computer 410. The result is that the general purpose computer 410 is transformed into a special purpose machine that implements the invention.

Even more particularly, each step of inventive method will transform at least a portion of the general purpose computer 410 into a special purpose computer module implementing that step. For example, when the sifting step 120 is implemented on the computer 410, the result is a computer implemented sifting apparatus (sifter) that performs the sifting functions of sifting step 120.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

Article of Manufacture

Still further, the invention disclosed herein may take the form of an article of manufacture. More specifically, the article of manufacture is a computer-usable medium, including a computer-readable program code embodied therein wherein the computer-readable code causes computer 410 to execute the inventive method.

A computer diskette such as disc 480 in FIG. 2 is an example of such a computer-usable medium. When the disc 480 is loaded into the mass storage device 480, the computer-readable program code stored therein is transferred into the computer 410. In this way, the computer 410 may be instructed to perform the inventive methods disclosed herein.

ALTERNATIVE EMBODIMENTS

As described above, the invention constructs upper and lower envelopes 20, 30 with a cubic spline in steps 210 and 230, respectively and in step 560. This cubic spline fitting, however, has both overshoot and undershoot problems. These problems can be alleviated by using more sophisticated spline methods, such as the taut spline in which the tension of the spline curve can be adjusted.

Another alternative is higher-order spline fitting. Although such higher-order spline fitting may be more accurate, it will, however, introduce more inflection points or extrema, and consume more computing time. Therefore, it is not recommended as a standard operation. In special cases, however, it may be useful.

As the spline fitting procedure is time consuming, more efficient methods can be devised by using simple mean values of successive extrema instead of computing the envelope-mean. In this way, only one spline fitting is required rather than two. Although this alternative is easier and faster to implement, the shortcomings are more severe amplitude averaging effects when the neighboring extrema are of different magnitudes. The successive-mean method will have a stronger forcing to reach uniform amplitudes, in which the true physics associated with amplitude will be destroyed. Therefore, the successive-mean method should only be applied where the amplitudes of the physical signal components are constants.

Either the envelope mean or the successive mean method, when applied with the requirement of absolute symmetry, will produce the absurd result of uniform amplitude IMF's. Therefore, the criteria in the Sifting Process should be chosen judiciously. One should avoid too stringent a criterion that we would extract uniform amplitude IMF's. On the other hand, one should also avoid too loose a criterion that would produce components that unacceptably deviate from IMF'S.

It is well known that the most serious problem of spline fitting is at the ends, where cubic splines can have wide swings if left unattended. As an alternative, the invention may utilize a method of adding characteristic waves at the ends of the data span. This confines the large swings successfully.

The method of adding characteristic waves is not conventional. In contrast, the conventional window that is often applied to fourier transform data results in loss of useful data. To avoid this data loss and to confine swings at the ends of the data span, the invention extends the data beyond the actual data span by adding three additional characteristic waves at each end of the data span.

The characteristic waves are defined by the last wave within the data span at the end of the data span. In other words, a characteristic wave is added to each end of the data span having an amplitude and period matching the last wave within the data span. This characteristic wave is a sinusoidal waveform that is extended three sinusoidal wave periods beyond the data span at each end. This process is repeated at the other end of the data span. In this way, spline fitting at the end of the data span, which can otherwise have a wide swing, is confined. In other words, by adding the extra characteristic waves at the ends beyond the data span, the spline curve will be tied down so that it will not have wild or excessive swings that would otherwise corrupt the data processing and analysis that utilizes these cubic splines.

Other than the spline fitting, the Hilbert transform may also have end effects. Because the first and the last points of the data are usually of different values, the Fourier transform will introduce additional components to bridge over the difference resulting in the well-known Gibbs phenomena. To eliminate it in the Fourier transform, various windows have been adopted (see, for example, Brigham, 1974, "*The fast Fourier Transform*", Prentice-Hall, Englewood Cliffs, N.J.).

Instead of a window which will eliminate some useful data at the end, the invention again adds two characteristic waves at either end. These waves all start from zero at the beginning, and end at zero at the end. Thus, the annoying Gibbs phenomena are greatly reduced.

Particular Limitations of the Invention

The dependence on the existence of scale for mode definition has one limitation: the decomposition method cannot separate signals when their frequencies are too close. In this case, there would not be any characteristic scale: therefore, physically they are identical. This may be the most severe limitation of the invention, but even here, the invented method can still work as well as the Fourier Analysis.

Particular Advantages of the Invention

The strength of the EMD method should be reiterated. EMD is built on the idea of identifying the various scales in the data which are quantities of great physical significance. Therefore, in the local extrema and curvature extrema Sifting Processes, orthogonality is not a consideration, but scales are. Since orthogonal decomposition is a characteristic for linear systems, violating this restriction is not a shortcoming but a breakthrough. Therefore, the decomposed IMF's may or may not be orthogonal. As such, this method can be applied to nonlinear data. Though the IMF's in most cases are practically orthogonal, it is a consequence rather than a requirement of the EMD.

Another advantage of the method is the effective use of all the data representing the physical phenomenon. In the Sifting Processes, the longest scale is defined by the full length of the data. As a result, EMD can define many long period oscillations. As is well known, the Hilbert transform without sifting tends to identify the highest frequency (Boashash, 1992, "*Estimating and Interpreting the Instantaneous Frequency of a Signal, Part I: Fundamentals*", Proc. IEEE, 80, 520–538.), the extraction of the long period components is indeed a new feature of the EMD.

Finally, though the EMD method will give IMF components, the individual component does not guarantee well-defined physical meaning. This is true for all decompositions, especially for methods with an a priori basis. In most cases, however, the IMF's do carry physical significance. Great caution should be exercised in making such attempts. The rule for interpreting the physical significance of the IMF's is that the scales should be clearly separated. Together with the Hilbert spectrum, the totality of the presentation should give a much more detailed representation of the physical processes than conventional methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer implemented method of processing a two-dimensional physical signal representative of a physical phenomenon, comprising the computer implemented steps of:

inputting the two-dimensional physical signal representative of the physical phenomenon;

decomposing the two-dimensional physical signal into one dimensional profiles; and recursively sifting the profiles via Empirical Mode Decomposition to extract an intrinsic mode function for each of the profiles indicative of an intrinsic oscillatory mode in the physical phenomenon.

2. The computer implemented method according to claim 1, said recursive sifting step performing the following substeps for each of the profiles:

identifying local maximum values in the profile, constructing an upper envelope of the profile from the identified local maximum values, identifying local minimum values in the profile, constructing a lower envelope of the profile from the identified local minimum values, determining an envelope mean from the upper and lower envelopes, generating a component signal by subtracting the envelope mean from the profile, treating the component signal as the profile during a next recursion of said sifting step, and recursively performing said sifting step.

3. The computer implemented method according to claim 2, said recursively performing substep recursively performing said sifting step until successive siftings do not produce additional local minimum or local maximum values and a number of zero crossings in the profile equals a total number of local minimum and local maximum values.

4. The computer implemented method according to claim 2, said recursively performing substep recursively performing said sifting step until successive component signals are substantially equal.

5. The computer implemented method according to claim 2, said recursively performing substep including the substep of testing the component signal against a definition of intrinsic mode functions, said sifting step being recursively performed until three successive component signals satisfy the definition of intrinsic mode functions.

6. The computer implemented method according to claim 2, said recursively performing substep including the substep of computing a standard deviation between successive component functions and comparing the standard deviation to a predetermined threshold value, said sifting step being recursively performed until the standard deviation exceeds the predetermined threshold value.

7. The computer implemented method according to claim 2, said recursive sifting step further including the substeps of:

testing the local scales between maximum values for an intermittency in the profile;

said constructing an upper envelope step treating local scales between maximum values failing said testing step as local scales between minimum values to construct the upper envelope of the profile;

said testing step testing the local scales between minimum values for an intermittency in the profile;

said constructing a lower envelope step treating local scales between minimum values failing said testing step as local scales between maximum values to construct the lower envelope of the profile.

8. The computer implemented method according to claim 1, further comprising the steps of:

generating a residual signal by subtracting the intrinsic mode function from the profile;

treating the residual signal as the profile during a next iteration of said recursive sifting step;

iterating said recursive sifting step to generate a second intrinsic mode function indicative of a second intrinsic oscillatory mode in the profile continuing to perform said iterating step to generate an n-th intrinsic mode function indicative of an n-th intrinsic oscillatory mode in the profile.

9. The computer implemented method according to claim 8, said continuing step continuing to perform said iterating step to generate an n-th intrinsic mode function indicative of an n-th intrinsic oscillatory mode in the profile until the residual signal has less than two extrema.

10. The computer implemented method according to claim 8, said continuing step continuing to perform said iterating step to generate an n-th intrinsic mode function indicative of an n-th intrinsic oscillatory mode in the profile until the residual signal is monotonically increasing or decreasing.

11. The computer implemented method according to claim 8, further comprising the step of:

applying a Hilbert transform to the intrinsic mode functions of each profile.

12. The computer implemented method according to claim 11, further comprising the step of:

collating the Hilbert transformed intrinsic mode functions of each profile;

connecting equal energy lines of the Hilbert transformed intrinsic mode functions of each profile to form equal energy surfaces;

displaying the equal energy surfaces.

13. The computer implemented method according to claim 8, further comprising the steps of:

selecting at least one intrinsic mode function for each of the profiles, generating a two-dimensional signal from the selected intrinsic mode functions.

14. The computer implemented method according to claim 13,
said selecting step selecting at least one of the first intrinsic mode functions extracted by said sifting step,
whereby said generating step generates a high-pass filtered version of the two-dimensional physical signal.

15. The computer implemented method according to claim 13,
said selecting step selecting at least one of the last intrinsic mode functions extracted by said sifting step,
whereby said generating step generates a low-pass filtered version of the two-dimensional physical signal.

16. The computer implemented method according to claim 13,
said selecting step selecting at least one of the intermediate intrinsic mode functions extracted by said sifting step,
whereby said generating step generates a band-pass filtered version of the two-dimensional physical signal.

17. The computer implemented method according to claim 8, further comprising the steps of:
selecting at least one intrinsic mode function for each of the profiles,
manipulating at least one of the selected intrinsic mode functions for each of the profiles, and
generating a two-dimensional signal from the manipulated intrinsic mode functions.

18. The computer implemented method according to claim 17,
said manipulating step multiplying at least one of the selected intrinsic mode functions for each profile by a scale factor.

19. The computer implemented method according to claim 8, further comprising the steps of:
selecting two intrinsic mode functions for each of the profiles,
subtracting one of the selected intrinsic mode functions from the other selected intrinsic mode function,
said subtracting step being performed for each of the profiles, and
generating a two-dimensional signal from the result of said subtracting step.

20. The computer implemented method according to claim 1, further comprising the steps of:
detecting the physical phenomenon with an imaging device to generate an image of the physical phenomenon, and
converting the image to a digital physical signal representative of the physical phenomenon,
wherein the digital physical signal is the two-dimensional physical signal.

21. The computer implemented method of according to claim 1,
said recursive sifting step identifying extrema in the profile from curvature extrema.

22. The computer implemented method of according to claim 21,
said recursive sifting step identifying curvature extrema in the profile by calculating a curvature function of the profile, finding extrema in the curvature function, and determining corresponding curvature extrema in the profile corresponding to the extrema in the curvature function.

23. The computer implemented method according to claim 22,
said recursive sifting step identifying extrema in the profile from curvature extrema and local extrema during a first recursion of said recursive sifting step and from local extrema during subsequent recursions of said recursive sifting step.

24. The computer implemented method according to claim 23,
said recursive sifting step including the substeps of:
identifying extrema in the profile,
constructing upper and lower envelopes of the profile from the respective maxima and minima of the identified extrema,
determining an envelope mean from the upper and lower envelopes,
generating a component signal by subtracting the envelope mean from the profile, and
treating the component signal as the profile.

25. The computer implemented method according to claim 24,
said recursively performing substep recursively performing said sifting step until successive siftings do not produce additional local minimum or local maximum values and a number of zero crossings in the profile equals a total number of local minimum and local maximum values.

26. The computer implemented method according to claim 24,
said recursive sifting step being recursively performed until successive component signals are substantially equal.

27. The computer implemented method according to claim 24, further comprising the step of:
testing the component signal against a definition of intrinsic mode functions,
said recursive sifting step being recursively performed until said testing step determines that three successive component signals satisfy the definition of intrinsic mode functions.

28. The computer implemented method according to claim 24, further comprising the steps of:
computing a standard deviation between successive component functions,
comparing the standard deviation to a predetermined threshold value,
said sifting step being recursively performed until said comparing step determines that the standard deviation exceeds the predetermined threshold value.

29. The computer implemented method according to claim 21, further comprising the steps of:
generating a residual signal by subtracting the intrinsic mode function from the profile;
treating the residual signal as the profile during a next iteration of said recursive sifting step;
identifying extrema in the profile from curvature extrema and local extrema at each iteration of said recursive sifting step and from local extrema at each recursion of said recursive sifting step,
iterating said recursive sifting step to generate a second intrinsic mode function indicative of a second intrinsic oscillatory mode in the profile, and
continuing to perform said iterating step to generate an n-th intrinsic mode function indicative of an n-th intrinsic oscillatory mode in the profile.

30. The computer implemented method according to claim 29,
said continuing step continuing to perform said iterating step to generate an n-th intrinsic mode function indicative of an n-th intrinsic oscillatory mode in the profile until the residual signal has less than two extrema.

31. The computer implemented method according to claim 29,
said continuing step continuing to perform said iterating step to generate an n-th intrinsic mode function indicative of an n-th intrinsic oscillatory mode in the profile until the residual signal is monotonically increasing or decreasing.

32. An apparatus for processing a two-dimensional physical signal representative of a physical phenomenon, comprising:
an input device inputting the two-dimensional physical signal representative of the physical phenomenon;
a decomposer decomposing the two-dimensional physical signal into one dimensional profiles; and
a sifter recursively performing a Sifting Process on the profiles using Empirical Mode Decomposition to extract an intrinsic mode function for each of the profiles indicative of an intrinsic oscillatory mode in the physical phenomenon.

33. The apparatus according to claim 32, said sifter including:
a local maximum identifier identifying local maximum values in the profile,
an upper envelope constructor constructing an upper envelope of the profile from the identified local maximum values,
a local minimum identifier identifying local minimum values in the profile,
a lower envelope constructor constructing a lower envelope of the profile from the identified local minimum values,
an envelope mean determiner determining an envelope mean from the upper and lower envelopes,
a component signal generator generating a component signal by subtracting the envelope mean from the profile,
wherein the component signal is treated as the profile during said sifters next recursive Sifting Process, and
wherein said sifter recursively performs the Sifting Process.

34. The apparatus according to claim 33,
said sifter recursively performing the Sifting Process until successive siftings do not produce additional local minimum or local maximum values and a number of zero crossings in the profile equals a total number of local minimum and local maximum values.

35. The apparatus according to claim 33, further comprising:
a comparator comparing successive component signals,
said sifter recursively performing the Sifting Process until said comparator determines that successive component signals are substantially equal.

36. The apparatus according to claim 33, further comprising:
a comparator comparing the component signal against a definition of intrinsic mode functions,
said sifter recursively performing the Sifting Process until said comparator determines that three successive component signals satisfy the definition of intrinsic mode functions.

37. The apparatus according to claim 33, further comprising:
a standard deviation calculator calculating a standard deviation between successive component functions,
a comparator comparing the standard deviation to a predetermined threshold value,
said sifter recursively performing the Sifting Process until the standard deviation exceeds the predetermined threshold value.

38. The apparatus according to claim 33,
a tester testing the local scales between maximum values for an intermittency in the profile;
said upper envelope constructor constructing an upper envelope step by treating local scales between maximum values failing said tester as local scales between minimum values to construct the upper envelope of the profile;
said tester testing the local scales between minimum values for an intermittency in the profile;
said lower envelope constructor constructing a lower envelope by treating local scales between minimum values failing said tester as local scales between maximum values to construct the lower envelope of the profile.

39. The apparatus according to claim 32, further comprising:
a residual signal generator generating a residual signal by subtracting the intrinsic mode function from the profile;
wherein the residual signal is treated as the profile during a next iteration of the Sifting Process performed by said sifter;
an iterator iterating the Sifting Process performed by said sifter to generate a second intrinsic mode function indicative of a second intrinsic oscillatory mode in the physical phenomenon;
wherein said iterator continues to perform said iterating step to generate an n-th intrinsic mode function indicative of an n-th intrinsic oscillatory mode in the profile.

40. The apparatus according to claim 39,
wherein said sifter continues to perform said Sifting Process to generate an n-th intrinsic mode function indicative of an n-th intrinsic oscillatory mode in the profile until the residual signal has less than two local extrema.

41. The apparatus according to claim 39,
wherein said sifter continues to perform said Sifting Process to generate an n-th intrinsic mode function indicative of an n-th intrinsic oscillatory mode in the profile until the residual signal is monotonically increasing or decreasing.

42. The apparatus according to claim 39, further comprising:
a Hilbert Spectrum generator applying a Hilbert transform to the intrinsic mode functions of each profile.

43. The apparatus according to claim 42, further comprising:
a collator collating the Hilbert transformed intrinsic mode functions of each profile;
an equal energy surface display generator for connecting equal energy lines of the Hilbert transformed intrinsic mode functions of each profile to form equal energy surfaces; and
a display for displaying the equal energy surfaces.

44. The apparatus according to claim 39, further comprising the steps of:
- a selector for selecting at least one intrinsic mode function for each of the profiles,
- a filter generating a two-dimensional signal from the intrinsic mode functions selected by said selector.

45. The apparatus according to claim 44,
said selector selecting at least one of the first intrinsic mode functions extracted by said sifter,
whereby said filter generates a high-pass filtered version of the two-dimensional physical signal.

46. The apparatus according to claim 44,
said selector selecting at least one of the last intrinsic mode functions extracted by said sifter,
whereby said filter generates a low-pass filtered version of the two-dimensional physical signal.

47. The apparatus according to claim 44,
said selector selecting at least one of the intermediate intrinsic mode functions extracted by said sifter,
whereby said filter generates a band-pass filtered version of the two-dimensional physical signal.

48. The apparatus according to claim 39, further comprising:
- a selector for selecting at least one intrinsic mode function for each of the profiles,
- a manipulator for manipulating at least one of the intrinsic mode functions selected by said selector for each of the profiles,
- a generator for generating a two-dimensional signal from the manipulated intrinsic mode functions manipulated by said manipulator.

49. The apparatus according to claim 48,
said manipulator multiplying at least one of the selected intrinsic mode functions for each profile by a scale factor.

50. The apparatus according to claim 39, further comprising:
- a selector for selecting two intrinsic mode functions for each of the profiles,
- a subtractor for subtracting a selected intrinsic mode function from the other selected intrinsic mode function for each of the profiles, and
- a generator for generating a two-dimensional signal from the output of said subtractor.

51. The apparatus according to claim 32, further comprising:
- an imaging device detecting the physical phenomenon to generate an image of the physical phenomenon, and
- and A/D converter converting the image to a digital physical signal representative of the physical phenomenon,
- wherein the digital physical signal is the two-dimensional physical signal.

52. The apparatus according to claim 32,
said sifter identifying extrema in the profile from curvature extrema.

53. The apparatus according to claim 52,
said sifter identifying curvature extrema in the profile by calculating a curvature function of the profile, finding extrema in the curvature function, and determining corresponding curvature extrema in the profile corresponding to the extrema in the curvature function.

54. The apparatus according to claim 53,
said sifter identifying extrema in the profile from curvature extrema and local extrema during a first recursion of the Sifting Process and from local extrema during subsequent recursions of said recursive Sifting Process.

55. The apparatus according to claim 54,
said sifter including:
- an extrema identifier identifying extrema in the profile,
- an envelope constructor constructing upper and lower envelopes of the profile from the respective maxima and minima of the identified extrema,
- an envelope mean determiner determining an envelope mean from the upper and lower envelopes, and
- a component signal generator generating a component signal by subtracting the envelope mean from the profile,
- wherein the component signal is treated as the profile during said sifters next recursive Sifting Process, and
- wherein said sifter recursively performs the Sifting Process.

56. The apparatus according to claim 55, further comprising:
said sifter recursively performing the Sifting Process until successive siftings do not produce additional local minimum or local maximum values and a number of zero crossings in the profile equals a total number of local minimum and local maximum values.

57. The apparatus according to claim 55, further comprising:
- a tester testing the component signal against a definition of intrinsic mode functions,
- said sifter recursively performing the Sifting Process until said tester determines that three successive component signals satisfy the definition of intrinsic mode functions.

58. The apparatus according to claim 55, further comprising:
- a standard deviation calculator computing a standard deviation between successive component functions of the profile,
- a comparator comparing the standard deviation to a predetermined threshold value,
- said sifter recursively performing the Sifting Process for the profile until said comparator determines that the standard deviation exceeds the predetermined threshold value.

59. The apparatus according to claim 52, further comprising:
- a residual signal generator generating a residual signal by subtracting the intrinsic mode function from the profile;
- wherein the residual signal is treated as the profile during a next iteration of the recursive Sifting Process by said sifter;
- an extrema identifier identifying extrema in the physical signal from curvature extrema and local extrema at each iteration of the recursive Sifting Process and from local extrema at each recursion of the recursive Sifting Process,
- wherein said sifter iterates the recursive Sifting Process to generate a second intrinsic mode function indicative of a second intrinsic oscillatory mode in the profile,
- wherein said sifter continues to perform the iteration of the recursive Sifting Process to generate an n-th intrinsic mode function indicative of an n-th intrinsic oscillatory mode in the profile.

60. The apparatus according to claim 59,
said sifter continuing to iterate the Sifting Process to generate an n-th intrinsic mode function indicative of an n-th intrinsic oscillatory mode in the profile until the residual signal has less than two extrema.

61. The apparatus according to claim 59,
said sifter continuing to iterate the Sifting Process to generate an n-th intrinsic mode function indicative of an n-th intrinsic oscillatory mode in the profile until the residual signal is monotonically increasing or decreasing.

62. An article of manufacture, comprising:
a computer-usable medium including computer-readable program code means, embodied therein, for causing a computer to process a two-dimensional physical signal representative of a physical phenomenon, the computer-readable program code means comprising:
computer-readable program code means for inputting the two-dimensional physical signal representative of the physical phenomenon;
computer-readable program code means for decomposing the two-dimensional physical signal into one dimensional profiles; and
computer-readable program code means for recursively sifting the profiles via Empirical Mode Decomposition to extract an intrinsic mode function for each of the profiles indicative of an intrinsic oscillatory mode in the physical phenomenon.

63. The article of manufacture according to claim 62,
said computer-readable program code means for recursive sifting means including
computer-readable program code means for identifying local maximum values in the profile,
computer-readable program code means for constructing an upper envelope of the profile from the identified local maximum values,
computer-readable program code means for identifying local minimum values in the profile,
computer-readable program code means for constructing a lower envelope of the profile from the identified local minimum values,
computer-readable program code means for determining an envelope mean from the upper and lower envelopes,
computer-readable program code means for generating a component signal by subtracting the envelope mean from the profile,
computer-readable program code means for treating the component signal as the profile during a next recursion of the operations performed by said recursive sifting means, and
computer-readable program code means for recursively performing the operations of said recursive sifting means,
wherein said recursive sifting means repeats the Sifting Process for each of the profiles.

64. The article of manufacture according to claim 63,
said recursively performing means recursively performing the functions of said recursive sifting means until successive siftings do not produce additional local minimum or local maximum values and a number of zero crossings in the profile equals a total number of local minimum and local maximum values.

65. The article of manufacture according to claim 63,
said recursively performing means recursively performing the functions of said recursive sifting means until successive component signals are substantially equal.

66. The article of manufacture according to claim 63,
said recursively performing means including computer-readable program code means for testing the component signal against a definition of intrinsic mode functions,
said recursively performing means recursively performing the operations of said recursive sifting means until three successive component signals satisfy the definition of intrinsic mode functions.

67. The article of manufacture according to claim 63,
said recursively performing means including computer-readable program code means for computing a standard deviation between successive component functions and comparing the standard deviation to a predetermined threshold value,
said recursively performing means recursively performing the operations of said recursive sifting means until the standard deviation exceeds the predetermined threshold value.

68. The article of manufacture according to claim 63, said recursive sifting means further including:
computer-readable program code means for testing the local scales between maximum values for an intermittency in the profile;
said constructing an upper envelope means treating local scales between maximum values failing said testing means as local scales between minimum values to construct the upper envelope of the profile;
said testing means testing the local scales between minimum values for an intermittency in the profile;
said constructing a lower envelope means treating local scales between minimum values failing said testing step as local scales between maximum values to construct the lower envelope of the profile.

69. The article of manufacture according to claim 62, further comprising:
computer-readable program code means for generating a residual signal by subtracting the intrinsic mode function from the profile;
computer-readable program code means for treating the residual signal as the profile during a next iteration of said recursive sifting means;
computer-readable program code means for iterating the operations performed by said recursive sifting means to generate a second intrinsic mode function indicative of a second intrinsic oscillatory mode in the profile
computer-readable program code means for continuing to perform said iterating means to generate an n-th intrinsic mode function indicative of an n-th intrinsic oscillatory mode in the profile.

70. The article of manufacture according to claim 69,
said continuing means continuing to perform the operations of said iterating means to generate an n-th intrinsic mode function indicative of an n-th intrinsic oscillatory mode in the profile until the residual signal has less than two extrema.

71. The article of manufacture according to claim 69,
said continuing means continuing to perform said iterating step to generate an n-th intrinsic mode function indicative of an n-th intrinsic oscillatory mode in the profile until the residual signal is monotonically increasing or decreasing.

72. The article of manufacture according to claim 69, further comprising:
computer-readable program code means for applying a Hilbert transform to the intrinsic mode functions of each profile.

73. The article of manufacture according to claim 72, further comprising:
  computer-readable program code means for collating the Hilbert transformed intrinsic mode functions of each profile;
  computer-readable program code means for connecting equal energy lines of the Hilbert transformed intrinsic mode functions of each profile to form equal energy surfaces;
  computer-readable program code means for displaying the equal energy surfaces.

74. The article of manufacture according to claim 69, further comprising:
  computer-readable program code means for selecting at least one intrinsic mode function for each of the profiles,
  computer-readable program code means for generating a two-dimensional signal from the selected intrinsic mode functions.

75. The article of manufacture according to claim 74,
  said selecting means selecting at least one of the first intrinsic mode functions extracted by said recursive sifting means,
  whereby said generating means generates a high-pass filtered version of the two-dimensional physical signal.

76. The article of manufacture according to claim 74,
  said selecting means selecting at least one of the last intrinsic mode functions extracted by said recursive sifting means,
  whereby said generating means generates a low-pass filtered version of the two-dimensional physical signal.

77. The article of manufacture according to claim 74,
  said selecting means selecting at least one of the intermediate intrinsic mode functions extracted by said sifting step,
  whereby said generating means generates a band-pass filtered version of the two-dimensional physical signal.

78. The article of manufacture according to claim 69, further comprising:
  computer-readable program code means for selecting at least one intrinsic mode function for each of the profiles,
  computer-readable program code means for manipulating at least one of the selected intrinsic mode functions for each of the profiles, and
  computer-readable program code means for generating a two-dimensional signal from the manipulated intrinsic mode functions.

79. The article of manufacture according to claim 78,
  said manipulating means multiplying at least one of the selected intrinsic mode functions for each profile by a scale factor.

80. The article of manufacture according to claim 69, further comprising:
  computer-readable program code means for selecting two intrinsic mode functions for each of the profiles,
  computer-readable program code means for subtracting one of the selected intrinsic mode functions from the other selected intrinsic mode function,
  said subtracting means performing subtraction for each of the profiles, and
  computer-readable program code means for generating a two-dimensional signal from the result of said subtracting means.

81. The article of manufacture according to claim 62, further comprising:
  computer-readable program code means for detecting the physical phenomenon with an imaging device to generate an image of the physical phenomenon, and
  computer-readable program code means for converting the image to a digital physical signal representative of the physical phenomenon,
  wherein the digital physical signal is the two-dimensional physical signal.

82. The article of manufacture of according to claim 62,
  said recursive sifting means identifying extrema in the profile from curvature extrema.

83. The article of manufacture of according to claim 82,
  said recursive sifting means identifying curvature extrema in the profile by calculating a curvature function of the profile, finding extrema in the curvature function, and determining corresponding curvature extrema in the profile corresponding to the extrema in the curvature function.

84. The article of manufacture according to claim 83,
  said recursive sifting means identifying extrema in the profile from curvature extrema and local extrema during a first recursion of said recursive sifting means and from local extrema during subsequent recursions of said recursive sifting means.

85. The article of manufacture according to claim 84,
  said recursive sifting means including:
    computer-readable program code means for identifying extrema in the profile, computer-readable program code means for constructing upper and lower envelopes of the profile from the respective maxima and minima of the identified extrema,
    computer-readable program code means for determining an envelope mean from the upper and lower envelopes,
    computer-readable program code means for generating a component signal by subtracting the envelope mean from the profile, and
    computer-readable program code means for treating the component signal as the profile.

86. The article of manufacture according to claim 85,
  said recursive sifting means recursively performing the Sifting Process until successive siftings do not produce additional local minimum or local maximum values and a number of zero crossings in the profile equals a total number of local minimum and local maximum values.

87. The article of manufacture according to claim 85,
  said recursive sifting means recursively performing the Sifting Process until successive component signals are substantially equal.

88. The article of manufacture according to claim 85, further comprising:
  computer-readable program code means for testing the component signal against a definition of intrinsic mode functions,
  said recursive sifting means recursively performing the Sifting Process until said testing means determines that three successive component signals satisfy the definition of intrinsic mode functions.

89. The article of manufacture according to claim 85, further comprising:
  computer-readable program code means for computing a standard deviation between successive component functions, computer-readable program code means for comparing the standard deviation to a predetermined threshold value, said recursive sifting means recursively performing the Sifting Process until said comparing means determines that the standard deviation exceeds the predetermined threshold value.

90. The article of manufacture according to claim 82, further comprising:

computer-readable program code means for generating a residual signal by subtracting the intrinsic mode function from the profile;

computer-readable program code means for treating the residual signal as the profile during a next iteration of said recursive sifting step;

computer-readable program code means for identifying extrema in the profile signal from curvature extrema and local extrema at each iteration of said recursive sifting step and from local extrema at each recursion of said recursive sifting step, computer-readable program code means for iterating the Sifting Process performed by said recursive sifting means to generate a second intrinsic mode function indicative of a second intrinsic oscillatory mode in the profile, and computer-readable program code means for continuing to perform the operations of said iterating means to generate an n-th intrinsic mode function indicative of an n-th intrinsic oscillatory mode in the profile.

91. The article of manufacture according to claim 90, further comprising:

said continuing means continuing to perform the operations of said iterating means to generate an n-th intrinsic mode function indicative of an n-th intrinsic oscillatory mode in the profile until the residual signal has less than two extrema.

92. The article of manufacture according to claim 90, said continuing means continuing to perform the operations of said iterating means to generate an n-th intrinsic mode function indicative of an n-th intrinsic oscillatory mode in the profile until the residual signal is monotonically increasing or decreasing.

* * * * *